US012641051B2

(12) United States Patent
Chitrakar et al.

(10) Patent No.: US 12,641,051 B2
(45) Date of Patent: May 26, 2026

(54) COMMUNICATION APPARATUS AND COMMUNICATION METHOD FOR MULTI-LINK ADDRESS RESOLUTION

(71) Applicant: Panasonic Intellectual Property Corporation of America, Torrance, CA (US)

(72) Inventors: Rojan Chitrakar, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 364 days.

(21) Appl. No.: 18/264,057

(22) PCT Filed: Dec. 6, 2021

(86) PCT No.: PCT/SG2021/050759
§ 371 (c)(1),
(2) Date: Aug. 2, 2023

(87) PCT Pub. No.: WO2022/169409
PCT Pub. Date: Aug. 11, 2022

(65) Prior Publication Data
US 2024/0129271 A1 Apr. 18, 2024

(30) Foreign Application Priority Data
Feb. 5, 2021 (SG) ............................ 10202101271R

(51) Int. Cl.
*H04L 61/103* (2022.01)
*H04L 101/622* (2022.01)
(52) U.S. Cl.
CPC ...... *H04L 61/103* (2013.01); *H04L 2101/622* (2022.05)

(58) Field of Classification Search
CPC ......................... H04L 61/103; H04L 2101/622
See application file for complete search history.

(56) References Cited

U.S. PATENT DOCUMENTS

2021/0314292 A1* 10/2021 Seok ........................ H04W 8/24

FOREIGN PATENT DOCUMENTS

WO WO-2022103155 A1 * 5/2022 ............ H04W 84/12

OTHER PUBLICATIONS

International Search Report, mailed Mar. 4, 2022, for PCT Patent Application No. PCT/SG2021/050759. (3 pages).
(Continued)

*Primary Examiner* — Saad A. Waqas
(74) *Attorney, Agent, or Firm* — Seed Intellectual Property Law Group LLP

(57) ABSTRACT

The present disclosure provides communication apparatuses and methods for multi-link address resolution, the communication apparatus being a communication apparatus of a plurality of communication apparatuses affiliated with a first multi-link device (MLD) comprising: a receiver, which in operation, receives, from a requesting communication apparatus, a first data frame carrying an address resolution request, the address resolution request carrying an internet protocol address of the first MLD; circuitry, which in operation, determines whether or not the requesting communication apparatus is affiliated with a second MLD; and generates a second data frame carrying an address resolution response, the address resolution response carrying a media access control (MAC) address of the communication apparatus in response to determining that the requesting communication apparatus is not affiliated with the second MLD, or a MLD MAC address of the first MLD in response to determining that the requesting communication apparatus is affiliated with the second MLD.

16 Claims, 33 Drawing Sheets

(56)         References Cited

OTHER PUBLICATIONS

Patil et al., "TDLS Handling in MLO," Qualcomm Inc., IEEE 802.11-20/1692r2, Oct. 12, 2020. (25 pages).

Seok et al., "Proxy ARP Service in MLO", MediaTek Inc., IEEE 802.11-20/1750r0, Oct. 28, 2020. (7 pages).

T. Narten et al., "Neighbor Discovery for IP version 6 (IPv6)," IETF, Network Working 4 Group, Request for Comments: 4861, Sep. 2007. (97 pages).

* cited by examiner

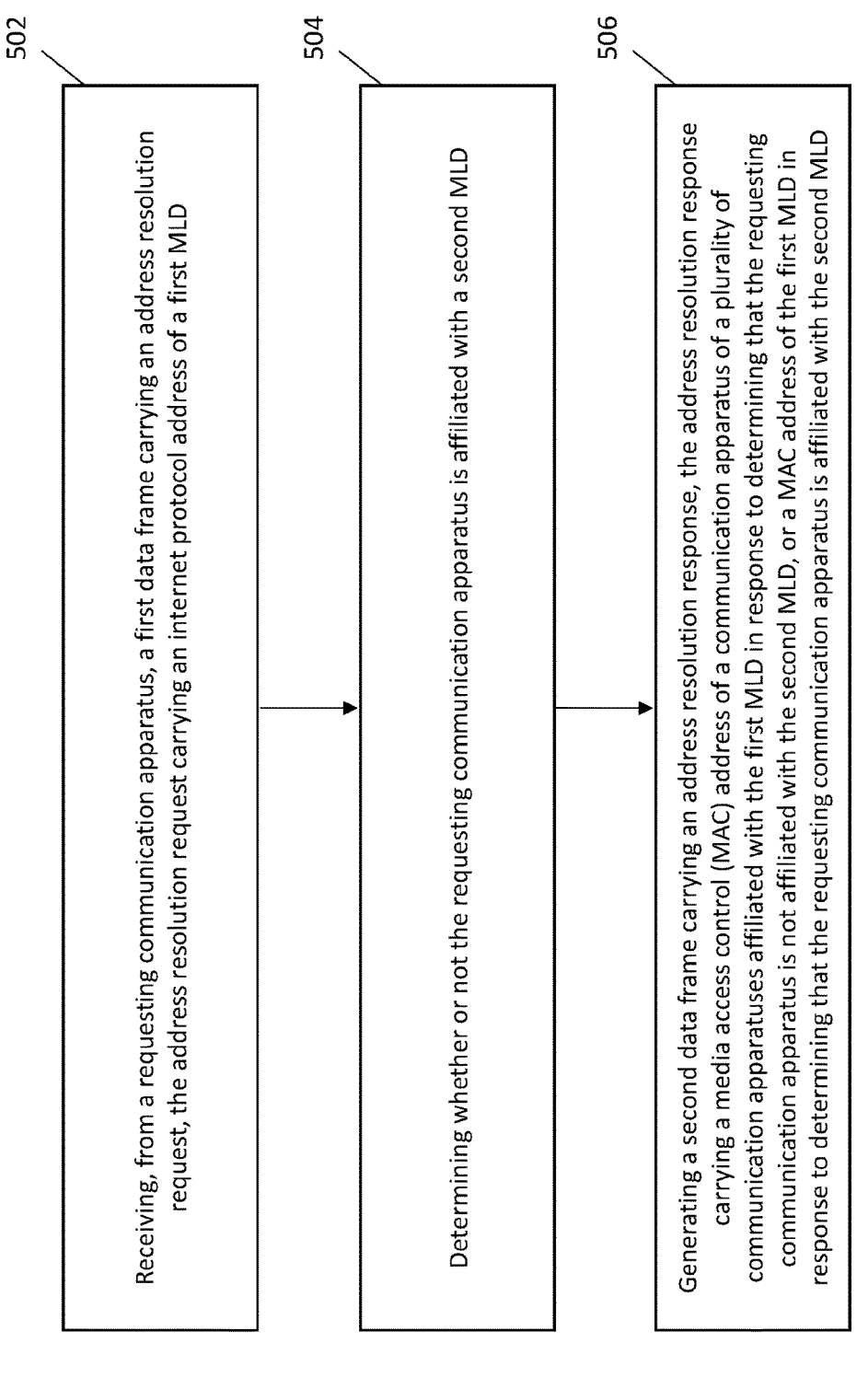

502

Receiving, from a requesting communication apparatus, a first data frame carrying an address resolution request, the address resolution request carrying an internet protocol address of a first MLD

504

Determining whether or not the requesting communication apparatus is affiliated with a second MLD

506

Generating a second data frame carrying an address resolution response, the address resolution response carrying a media access control (MAC) address of a communication apparatus of a plurality of communication apparatuses affiliated with the first MLD in response to determining that the requesting communication apparatus is not affiliated with the second MLD, or a MAC address of the first MLD in response to determining that the requesting communication apparatus is affiliated with the second MLD

COMMUNICATION APPARATUS AND COMMUNICATION METHOD FOR MULTI-LINK ADDRESS RESOLUTION

BACKGROUND

1. Technical Field

The present embodiments generally relate to communication apparatuses, and more particularly relate to methods and apparatuses for multi-link address resolution.

2. Description of the Related Art

In today's world, communication devices are expected to wirelessly operate with the same capabilities as wired computing devices. For example, a user expects to be able to seamlessly watch a high definition movie streamed to the user's wireless communication device. This presents challenges for communication devices as well as the access points to which the communication devices wirelessly connect.

The Institute of Electrical and Electronics Engineers (IEEE) 802.11 group has recently formed the 802.11 Task Group (TG) to address these challenges. Multi-link operation in the 2.4 GHz, 5 GHz and 6 GHz frequency bands has been identified as a key candidate technology for such communication. Multi-channel aggregation over multiple links is a natural way to create multi-fold increase in communication data throughput.

In order to enable such multi-link operations between an access point (AP) multi-link device (MLD) and a non-AP MLD, multi-link setup may be performed over one of the supported links to establish association for affiliated stations (STAs) in one or more links.

However, there has been no discussion so far concerning multi-link address resolution supporting legacy STAs to resolve a peer device's link layer address (e.g. MAC address) from a given Internet layer address (e.g. IP address) in a context of a MLD.

There is thus a need for a communication apparatus and a communication method that can solve the above-mentioned issues. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for multi-link address resolution.

In a first aspect, the present disclosure provides a communication apparatus of a plurality of communication apparatuses affiliated with a first multi-link device (MLD), the communication apparatus comprising: a receiver, which in operation, receives, from a requesting communication apparatus, a first data frame carrying an address resolution request, the address resolution request carrying an internet protocol (IP) address of the first MLD; circuitry, which in operation, determines whether or not the requesting communication apparatus is affiliated with a second MLD; and generates a second data frame carrying an address resolution response, the address resolution response carrying a media access control (MAC) address of the communication apparatus in response to determining that the requesting communication apparatus is not affiliated with the second MLD, or a MLD MAC address of the first MLD in response to determining that the requesting communication apparatus is affiliated with the second MLD.

In a second aspect, the present disclosure provides an Access Point (AP) of a plurality of APs affiliated with an AP MLD, the AP comprising: a receiver, which in operation, receives, from a requesting communication apparatus, a first data frame carrying an address resolution request, the address resolution request carrying an IP address of a first MLD associated with the AP MLD, the first MLD comprising a plurality of communication apparatuses; circuitry, which in operation, determines whether or not the requesting communication apparatus is affiliated with a second MLD associated with the AP MLD; and generates a second data frame carrying an address resolution response, the address resolution response carrying a MAC address of a communication apparatus of the plurality of communication apparatuses affiliated with the first MLD in response to determining that the requesting communication apparatus is not affiliated with the second MLD, or a MLD MAC address of the first MLD in response to determining that the requesting communication apparatus is affiliated with the second MLD.

In a third aspect, the present disclosure provides a communication method comprising: receiving, from a requesting communication apparatus, a first data frame carrying an address resolution request, the address resolution request carrying an IP address of a first MLD; determining whether or not the requesting communication apparatus is affiliated with a second MLD; and generating a second data frame carrying an address resolution response, the address resolution response carrying a MAC address of a communication apparatus of a plurality of communication apparatuses affiliated with the first MLD in response to determining that the requesting communication apparatus is not affiliated with the second MLD, or a MLD MAC address of the first MLD in response to determining that the requesting communication apparatus is affiliated with the second MLD.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 5 shows a flow chart 500 illustrating a communication method in accordance with the present disclosure.

Figure 1:
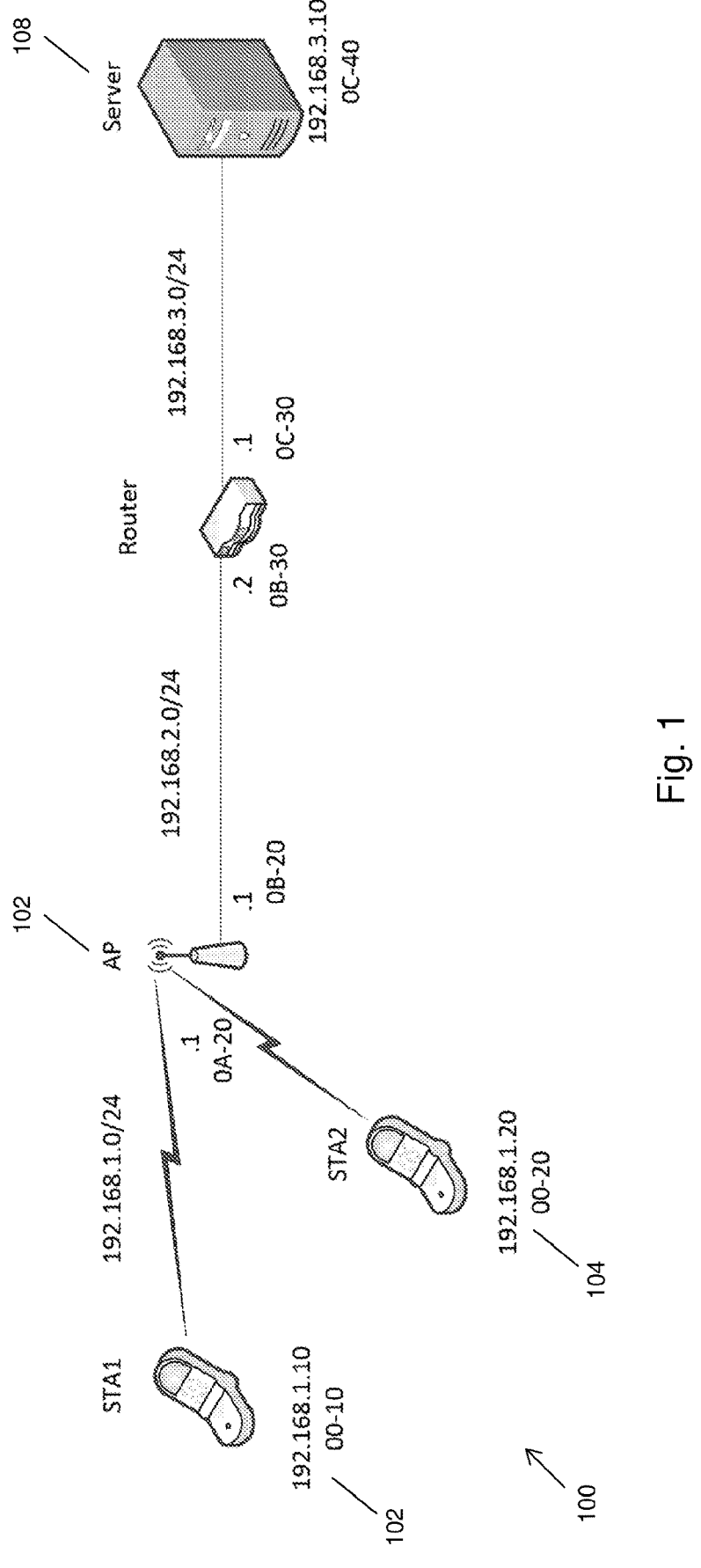
FIG. 1 shows a schematic diagram illustrating proxy ARP features of an access point (AP).

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

The following detailed description is merely exemplary in nature and is not intended to limit the embodiments or the application and uses of the embodiments. Furthermore, there is no intention to be bound by any theory presented in the preceding Background or this Detailed Description. Furthermore, other desirable features and characteristics will become apparent from the subsequent detailed description and the appended claims, taken in conjunction with the accompanying drawings and this background of the disclosure.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

Address resolution protocol (ARP) is used to discover a peer device's link layer address (e.g. MAC address) when its Internet layer (e.g. IP address) is known. Each device maintains a temporary "ARP Cache" of a mapping between such discovered IPv4 address and MAC address. The following steps are carried out in an ARP:

1. Source Device Checks Cache: The source device will first check its cache to determine if it already has a resolution of the destination device. If so, it can skip to the last step of this process, step #9.

2. Source Device Generates ARP Request Message: The source device generates an ARP Request message. It puts its own data link layer address as the Sender Hardware Address (SHA) and its own IP address as the Sender Protocol Address (SPA). It fills in the IP address of the destination as the Target Protocol Address. (It must leave the Target Hardware Address blank, since that it is what it is trying to determine!)

3. Source Device Broadcasts ARP Request Message: The source broadcasts the ARP Request message on the local network.

4. Local Devices Process ARP Request Message: The message is received by each device on the local network. It is processed, with each device looking for a match on the Target Protocol Address. Those that do not match will drop the message and take no further action.

5. Destination Device Generates ARP Reply Message (unicast): The one device whose IP address matches the contents of the Target Protocol Address of the message will generate an ARP Reply message. It takes the Sender Hardware Address and Sender Protocol Address fields from the ARP Request message and uses these as the values for the Target Hardware Address and Target Protocol Address of the reply. It then fills in its own layer two address as the Sender Hardware Address and its IP address as the Sender Protocol Address.

6. Destination Device Updates ARP Cache: If the source needs to send an IP datagram to the destination now, it makes sense that the destination will probably need to send a response to the source at some point soon. (After all, most communication on a network is bidirectional.) As an optimization, then, the destination device will add an entry to its own ARP cache containing the hardware and IP addresses of the source that sent the ARP Request. This saves the destination from needing to do an unnecessary resolution cycle later on. This may be referred to as an Opportunistic ARP Cache update.

7. Destination Device Sends ARP Reply Message: The destination device sends the ARP reply message. This reply is, however, sent unicast to the source device, as there is no need to broadcast it.

8. Source Device Processes ARP Reply Message: The source device processes the reply from the destination. It stores the Sender Hardware Address as the layer two address of the destination, to use for sending its IP datagram.

9. Source Device Updates ARP Cache: The source device uses the Sender Protocol Address and Sender Hardware Address to update its ARP cache for use in the future when transmitting to this device.

An ARP probe is an ARP request constructed with an all-zero SPA. Before beginning to use an IPv4 address (whether received from manual configuration, DHCP, or some other means), a host implementing this specification must test to see if the address is already in use, by broadcasting ARP probe packets. Target IP Address is set to the IP address being probed. If an ARP Reply is received, the IP address is already in use by another device.

Neighbor Discovery (ND) may be used to achieve similar results as ARP but for IPv6 Address and MAC Address mapping. ND messages are carried in ICMP packets.

Address resolution in IPv6 is still dynamic and is based on the use of a cache table that maintains pairings of IPv6 addresses and hardware addresses. Each device on a physical network keeps track of this information for its neighbors. When a source device needs to send an IPv6 datagram to a local network neighbor but doesn't have its hardware address (E.g. MAC address), it initiates the address resolution process.

For example, device A is the soliciting device trying to send to device B. Instead of sending an ARP Request message (Internet Control Message Protocol (ICMP) type=135), device A generating an ND Neighbor Solicitation message. If the underlying data link protocol supports multicasting, like Ethernet does, the Neighbor Solicitation message is not broadcast. Instead, it is sent to the solicited-node address of the device whose IPv6 address we are trying to resolve. Device A does not broadcast the message, but instead, it will multicast it to device B's solicited-node multicast address. The ND Neighbor Solicitation message may indicate an ICMP type of 135, the IP address of Device B (device to be resolved) in a target address field and the L2 address (e.g. MAC address) of the sender, i.e. Device A.

Device B will receive the ND Neighbor Solicitation message and respond back to device A (unicast) with a Neighbor Advertisement message (ICMP type=136). This is analogous to the ARP reply/response frame and tells device A the physical address of B. Device A then adds device B's information to its neighbor cache. For efficiency, cross-resolution is supported as in IPv4 address resolution. This is done by having Device A include its own layer two (L2) address in the Neighbor Solicitation message, assuming it knows it. Device B will record this along with A's IP address in B's neighbor cache.

The solicited-node multicast address is a special mapping that each device on a multicast-capable network creates from its unicast address. The solicited-node address isn't unique for every IPv6 address, but the odds of any two neighbors on a given network having the same one are small. Each device that receives a multicasted Neighbor Solicitation message must still check to make sure it is the device whose address the source is trying to resolve. (This is similar to how multicast is handled in IPv4, with 32 different IP addresses potentially sharing a multicast MAC address.)

In addition, proxy ARP feature is an optional wireless network management (WNM) feature that allows an AP to respond to ARP request (IPv4) or Neighbor Solicitation messages (IPv6) on behalf of associated STAs, where the AP maintains a hardware address (e.g. MAC address) to internet address (e.g. internet protocol (IP) address) for each associated station.

FIG. 1 shows a schematic diagram 100 illustrating proxy ARP features of an access point (AP) 102. An AP 102 receives an ARP request from one associated STA (e.g. STA1 104) or from the distribution system (DS) 106 with a target IP address that corresponds to another associated STA (e.g. STA2 108). If the target IP address to be resolved is an IPv4 address of the other associated STA (e.g. STA2 108), upon receiving an ARP request packet, the AP 102 shall generate an ARP response packet and insert the MAC address of the other associated STA (e.g. STA2 108) as the Sender's MAC address in the ARP response packet. Similarly, when the target IP address to be resolved is an IPv6 address of the another associated STA (e.g. STA2 108), upon receiving a Neighbor Solicitation message, the AP 102 shall respond with a Neighbor Advertisement message (section 4.4 of IETF RFC (Internet Engineering Task Force Request for Comments) 4861) carrying the MAC address of the another associated STA (e.g. STA2 108) as the Sender's MAC address on behalf of the another associated STA (e.g. STA2 108)

ARP Request packets and Neighbor Solicitation messages are typically broadcasted across entire layer 2 (L2) domain. With proxy ARP feature, it advantageously reduces the number of broadcast frames in a basic service set (BSS).

Notably, due to assumptions about how the ARP/ND operations on MLDs, there are address mismatch issues during tunneled direct link setup (TDLS) and TDLS direct link communication. According to an IEEE 802.11 submission (IEEE 802.11-2/1692r2) submission, to address the address mismatch issues during TDLS setup and TDLS direct path communication, the following solutions are proposed:

setting transmitter address (TA) field to non-AP MLD's MAC address for frames sent directly to a TDLS peer STA;

using MLD MAC addresses in the link identifier element; and using MLD MAC address during TDLS PeerKey (TPK) handshake.

Figure 2:
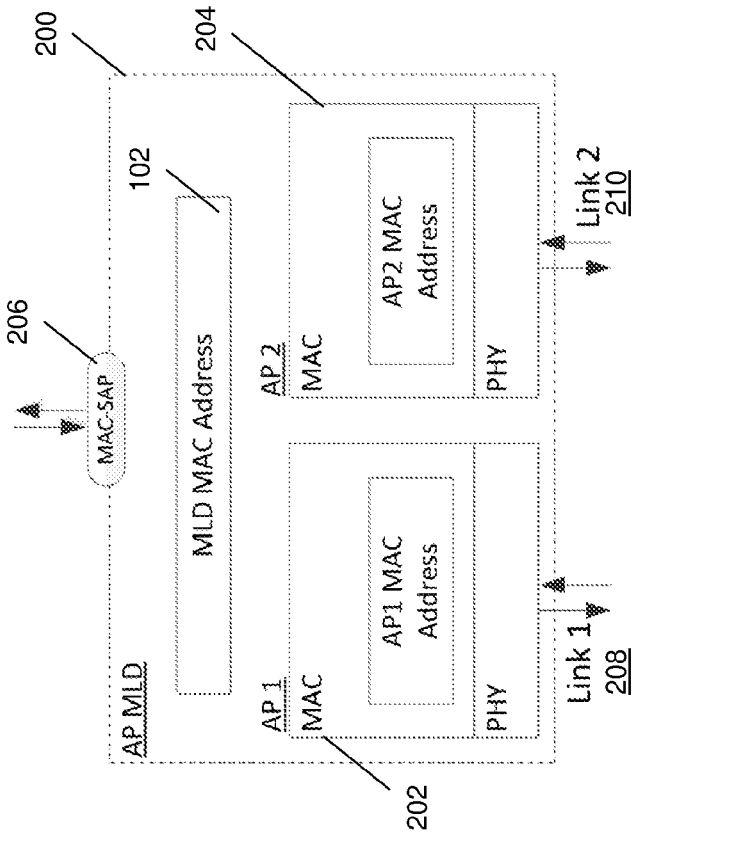
FIG. 2 shows a configuration of an MLD.

FIG. 2 shows a configuration of an MLD 200. According to 802.11be document 0.3 (D0.3) specification, it is stated that a multi-link device (MLD) (e.g. AP MLD 200) is a device that has more than one affiliated AP (or STA) (e.g. AP1 202 and AP2 204) and has a single MAC SAP 206 to logical link control (LLC), which includes one MAC data service. The value of the address 2 (transmitted address (TA)) field in the MAC header of a frame sent over-the-air by an AP shall be the MAC address of the transmitting AP (e.g. AP1 202 and AP2 204) affiliated with the MLD 200 corresponding to that link (e.g. Link 1 208, Link 2 210) except the Individual/Group bit, which is set to 1 when the TA field value is a bandwidth signaling TA and otherwise set to 0. Similarly the value of Address 1 (recipient address (RA)) field in the MAC header of an individually addressed frame sent over-the-air to an AP shall be the MAC address of the receiving AP (e.g. AP1 202 and AP2 204) affiliated with the MLD corresponding to that link (e.g. Link 1 208, Link 2 210).

However, the above definition/addressing rules are for EHT MLDs. However, an EHT AP is also a high efficiency (HE)/very high throughput (VHT)/high throughput (HT) AP and needs to support legacy STAs (HE/VHT/HT STAs). Legacy STAs do not understand the concept of MLD MAC address. Instead, they will only be aware of the BSSID (i.e. L2 MAC address) of the AP with which they are associated. This may also be true for non-MLD EHT STAs that are EHT STAs not affiliated with an MLD.

Figure 3:
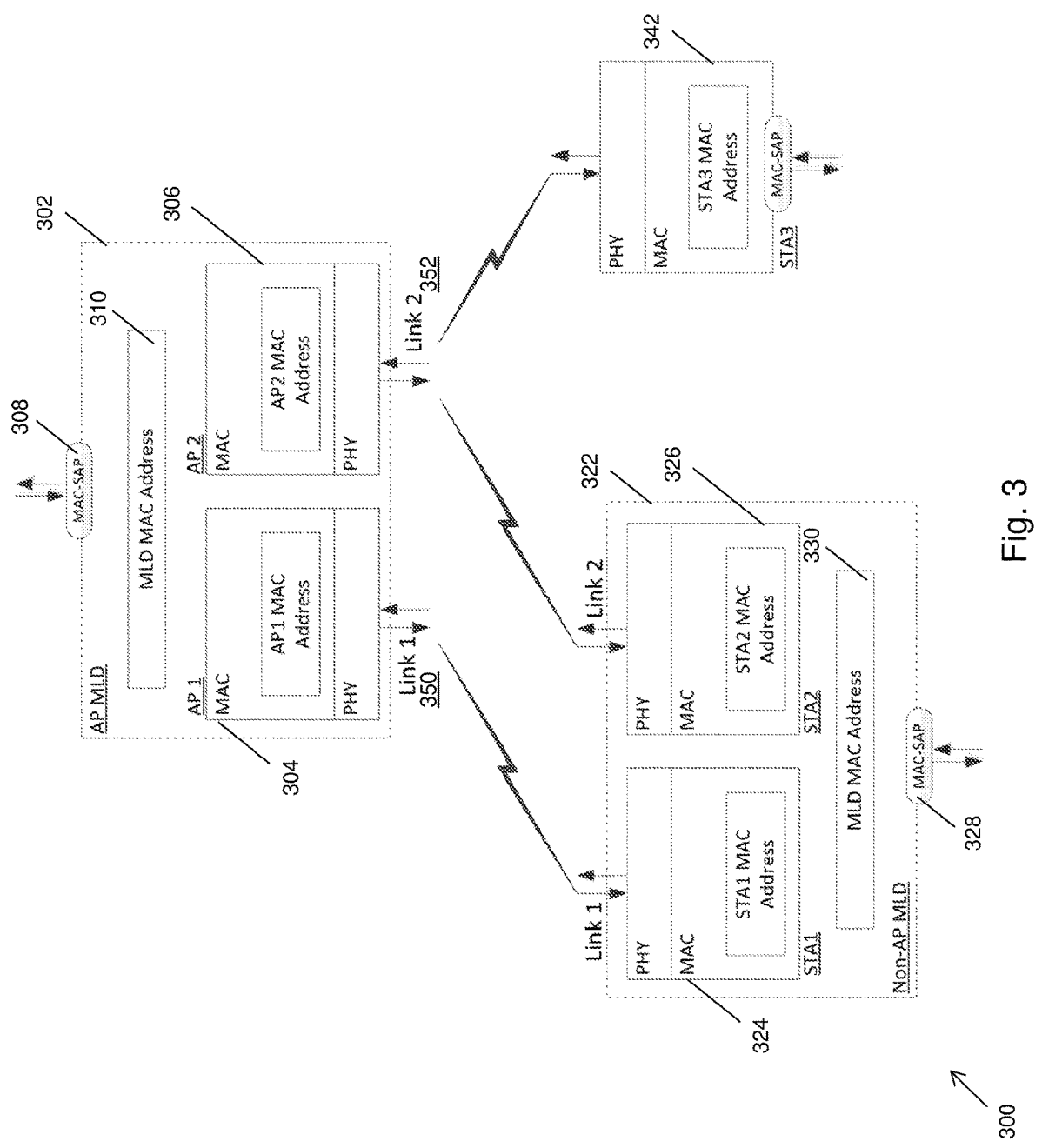
FIG. 3 shows a schematic diagram illustrating direct link communications of an AP of an AP-MLD with a STA with or without affiliation with a non-AP MLD.

FIG. 3 shows a schematic diagram 300 illustrating communications between APs 304, 306 affiliated with an AP-MLD 302 and a non-MLD STA 342 and STAs 324, 326 affiliated with a non-AP MLD 322. Each MLD, i.e. AP MLD 302 or non-AP MLD 322, has a single MAC SAP 308, 328, if the MAC SAPs 308, 328 are tied to their respective MLD MAC addresses 310, 330, their IP addresses will be mapped to the MLD MAC addresses correspondingly. Here, it is assumed that the non-AP MLD 322 is associated with the AP MLD 302 and the non-MLD STA 342 is associated with the AP 306.

In other words, the APs 304, 306 of the AP MLD 302 may communicate with STAs 324, 326 of non-AP MLD 322 directly via Link 1 350 and Link 2 352 respectively, while AP2 306 may also communicate with a legacy STA 342 directly via Link 2 352. ARP/ND may be initiated by a source device to discover the MAC address of a destination device through ARP/ND queries and messages exchange before direct link communication or for communication via the AP. However, as the IP address included in the ARP/ND queries will be mapped to the MLD MAC address, only the MLD MAC address will be returned to all ARP/ND queries by default, and not the AP or STA MAC address. As such, the MLD MAC address will be indicated in the RA field of frames transmitted on a direct link between STAs 326 and 342 but the STAs may identify that they are not the intended recipients of the frames (since they expect their STA MAC Addresses to be indicated in the RA field), and as a result, cause the frames transmitted on the direct link to be dropped.

Hence, there is thus a need for communication apparatuses and methods that provide feasible technical solutions for multi-link address resolution to address one or more of the above challenges. In various embodiments below, the communication apparatuses and methods seek to address how a MLD should perform ARP and handle address resolution from legacy STAs.

In various embodiments of the present disclosure, a multi-link device (MLD) may refer to a device that operates in two or more frequency bands or links (2.4 GHz, 5 GHz or 6 GHz). The MLD may comprise two or more communication apparatus corresponding to the two or more links, each operating in a specific frequency band or link. For the sake of simplicity, each link of a MLD shown in the present disclosure relates to one of many communication apparatuses affiliated with the MLD which is primarily configured to operate in a specific frequency band (2.4 GHz, 5 GHz or 6 GHz) to transmit/receive signals to/from another communication apparatus that is not affiliated with the MLD operating also in that specific frequency band.

In various embodiments of the present disclosure, a non-MLD STA may refer to a legacy (HE/VHT/HT) STA or EHT STA that is not affiliated with an MLD. Similarly, a non-MLD AP may refer to an EHT AP that is not affiliated with an MLD.

In various embodiments of the present disclosure, the term "L2 MAC address" refers to the MAC address of a transmitting/receiving STA or AP; whereas the term "MLD MAC address" refers to the MAC address that represents the MLD. For the sake of simplicity, a letter "M" may be appended to a device name (e.g. STA, AP or MLD) to denote as the MAC address of the device. For example, the MLD MAC addresses of an AP MLD and a non-AP MLD are denoted as "AP-MLD-M" and "STA-MLD-M" respectively. When there are two non-AP MLDs named under "non-AP MLD1" and "non-AP MLD2", their MLD MAC addresses will be denoted as "STA-MLD1-M" and "STA-MLD2-M" respectively. Similarly, the MAC addresses of an AP and a STA are denoted as "AP-M" and "STA-M" respectively. When there are two APs and two STAs named under "AP1", "AP2", "STA1" and "STA2", their MAC addresses will be denoted as "AP1-M", "AP2-M", "STA1-M" and "STA2-M" respectively.

A similar denotation is applied to IP addresses in the present disclosure. In particular, letters "IP" are appended to a device name (e.g. STA, AP or MLD) to denote as the IP address of the device. For example, the IP addresses of an AP MLD and a non-AP MLD are denoted as "AP-MLD-IP" and "STA-MLD-IP" respectively. When there are two non-AP MLDs named under "non-AP MLD1" and "non-AP MLD2", their IP addresses will be denoted as "STA-MLD1-IP" and "STA-MLD2-IP" respectively. Similarly, the IP addresses of an AP and a STA (whether affiliated with a MLD or not) are denoted as "AP-IP" and "STA-IP" respectively. When there are two APs and two STAs named under "AP1", "AP2", "STA1" and "STA2", their IP addresses will be denoted as "AP1-IP", "AP2-IP", "STA1-IP" and "STA2-IP" respectively.

In various embodiments of the present disclosure, a data frame may be used and exchanged between STAs and APs to resolve ARP/ND queries. A data frame may comprise a Recipient Address (RA) field, a Transmitter Address (TA) field, a Destination Address (DA) field and/or a Source Address (SA) field. The RA field states the MAC address of the next immediate recipient the data frame is being sent to. The TA field states the MAC address of the immediate sender that transmits the data frame. The DA field states the MAC address of the destination of the data frame. The SA field states the MAC address of the original sender of the data frame.

To resolve an ARP query, the data frame may further carry an ARP message (ARP Request or ARP Reply) comprising a Source Hardware (Src. Hw.) field, a Source IP (Src. IP) field, a Target Hardware (Hw) field and a Target IP field. The Source Hardware field states the MAC address of the sender that transmits the message. The Source IP field states the IP address of the sender that transmits the message. The Target Hardware field states the MAC address of the recipient the message is being transmitted to. The Target IP field states the IP address of the recipient the message is being transmitted to.

To resolve a ND query, the data frame may further carry an ND message (Neighbor Solicitation Message or Neighbor Advertisement Message). A Neighbor Solicitation Message comprises a Type field with a value of 135, a Target Address field and a Source L2 Address field indicating the L2 MAC address of the sender that transmits the message. A Neighbor Advertisement Message comprises a Type field with a value of 136, a Target Address field and a Target L2 Address field indicating the L2 MAC address of the recipient the message is being transmitted to.

In the following paragraphs, certain exemplifying embodiments are explained with reference to multi-link address resolution in an AP multi-link device (MLD), a non-AP MLD and/or a non-MLD STA in the context of EHT MLD and a legacy (HE/VHT/HT) STA.

Figure 4:
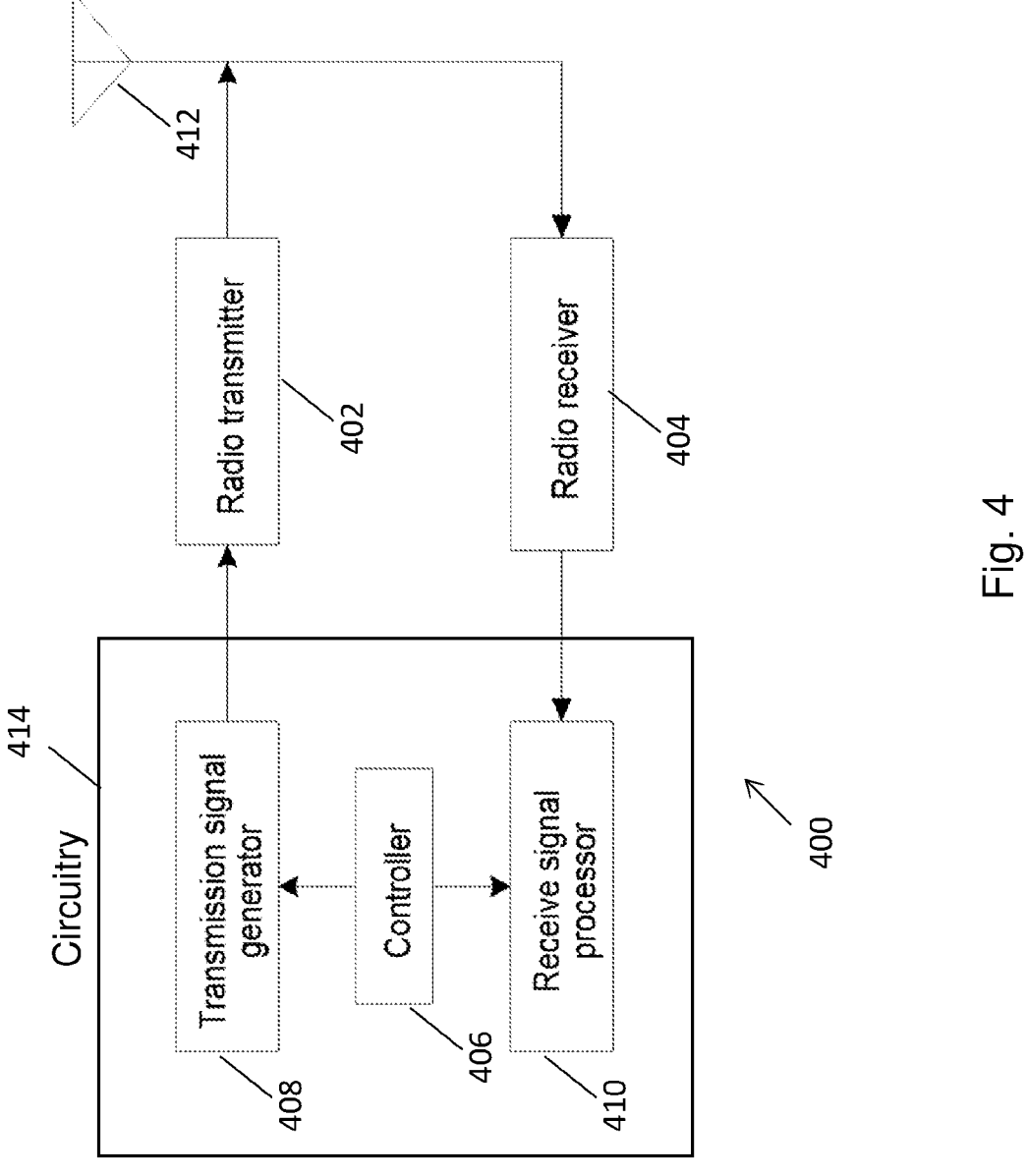
FIG. 4 shows an example configuration of a communication apparatus in accordance with the present disclosure. The communication apparatus may be implemented as an access point (AP) and a station (STA) and configured for multi-link address resolution in accordance with the present disclosure.

FIG. 4 shows an example configuration of a communication apparatus in accordance with the present disclosure.

The communication apparatus may be implemented as an AP and a STA and configured for multi-link address resolution in accordance with the present disclosure. As shown in FIG. 4, the communication apparatus 400 may include circuitry 414, at least one radio transmitter 402, at least one radio receiver 404, and at least one antenna 412 (for the sake of simplicity, only one antenna is depicted in FIG. 4 for illustration purposes). The circuitry 414 may include at least one controller 406 for use in software and hardware aided execution of tasks that the at least one controller 406 is designed to perform, including control of communications with one or more other communication apparatuses in a multiple input and multiple output (MIMO) wireless network. The circuitry 414 may furthermore include at least one transmission signal generator 408 and at least one receive signal processor 410. The at least one controller 406 may control the at least one transmission signal generator 408 for generating MAC frames (for example Data frames, Management frame and Action frames) to be sent through the at least one radio transmitter 402 and the at least one receive signal processors 410 for processing MAC frames (for example Data frames, Management frame and Action frames) received through the at least one radio receiver 404 from the one or more other communication apparatuses. The at least one transmission signal generator 408 and the at least one receive signal processor 410 may be stand-alone modules of the communication apparatus 400 that communicate with the at least one controller 406 for the above-mentioned functions, as shown in FIG. 4. Alternatively, the at least one transmission signal generator 408 and the at least one receive signal processor 410 may be included in the at least one controller 406. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 402, at least one radio receiver 404, and at least one antenna 412 may be controlled by the at least one controller 406.

The communication apparatus 400, when in operation, provides functions required for multi-link address resolution. For example, the communication apparatus 400 may be a STA affiliated with a first MLD, and the at least one radio receiver 404 of the communication apparatus 400 may, in operation, receive from a requesting communication apparatus (e.g. a non-MLD STA or a STA of a non-AP MLD), a first data frame carrying an address resolution request, the address resolution request carrying an internet protocol (IP) address of the first MLD. The circuitry 414 (for example the at least one receive signal processor 410 of the circuitry 414) may, in operation, process the first data frame and determine whether or not the requesting communication is affiliated with a second MLD. The circuitry (for example the at least one transmission signal generator 408 of the circuitry 414) may, in operation, generate a second data frame carrying an address resolution response, the address resolution response carrying either (i) a media access control (MAC) address of the communication apparatus 400 in response to determining that the request communication apparatus is not affiliated with the second MLD, or (ii) a MAC address of the first MLD in response to determining that the request communication apparatus is affiliated with the second MLD. The radio transmitter 402 may in operation, transmit the second data frame, for example to the requesting communication apparatus.

For example, the communication apparatus 400 may be an AP affiliated with an AP MLD equipped with proxy ARP features to respond to an ARP request on behalf of an associated STA (e.g. a non-MLD STA or a STA of a first non-AP MLD associated with the AP MLD). The at least one radio receiver 404 of the communication apparatus 400 may, in operation, receive from a requesting communication apparatus (e.g. a non-MLD STA or a STA of a second non-AP MLD), a first data frame carrying an address resolution request, the address resolution request carrying an IP address of a first MLD associated with the AP MLD. The circuitry 414 (for example the at least one receive signal processor 410 of the circuitry 414) may, in operation, process the first data frame and determine whether or not the requesting communication is affiliated with a second MLD. The circuitry (for example the at least one transmission signal generator 408 of the circuitry 414) may, in operation, generate a second data frame carrying an address resolution response, the address resolution response carrying either (i) a MAC address of the associated STA in response to determining that the request communication apparatus is not affiliated with the second MLD, or (ii) a MAC address of the first MLD with which the associated STA is affiliated in response to determining that the request communication apparatus is affiliated with the second MLD. The radio transmitter 402 may in operation, transmit the second data frame, for example to the requesting communication apparatus.

FIG. 5 shows a flow chart 500 illustrating a communication method in accordance with the present disclosure. In step 502, a step of receiving, from a requesting communication apparatus, a first data frame carrying an address resolution request, the address resolution request carrying an IP address of a first MLD is carried out. In step 504, a step of determining whether or not the requesting communication apparatus is affiliated with a second MLD is carried out. In step 506, a step of generating a second data frame carrying an address resolution response is carried out. The address resolution response may carry either (i) a MAC address of a communication apparatus of a plurality of a communication apparatuses affiliated with the first MLD in response to determining that the requesting communication apparatus is not affiliated with the second MLD, or (ii) a MAC address of the first MLD in response to determining that the request communication apparatus is affiliated with the second MLD.

In the following paragraphs, a first embodiment of the present disclosure is explained with reference to multi-link address resolution in an AP MLD, a non-AP MLD and/or a non-MLD STA where the AP MLD and non-AP MLD uses a same MAC SAP for both MLD and non-MLD connections.

Figures 6A, 6B:
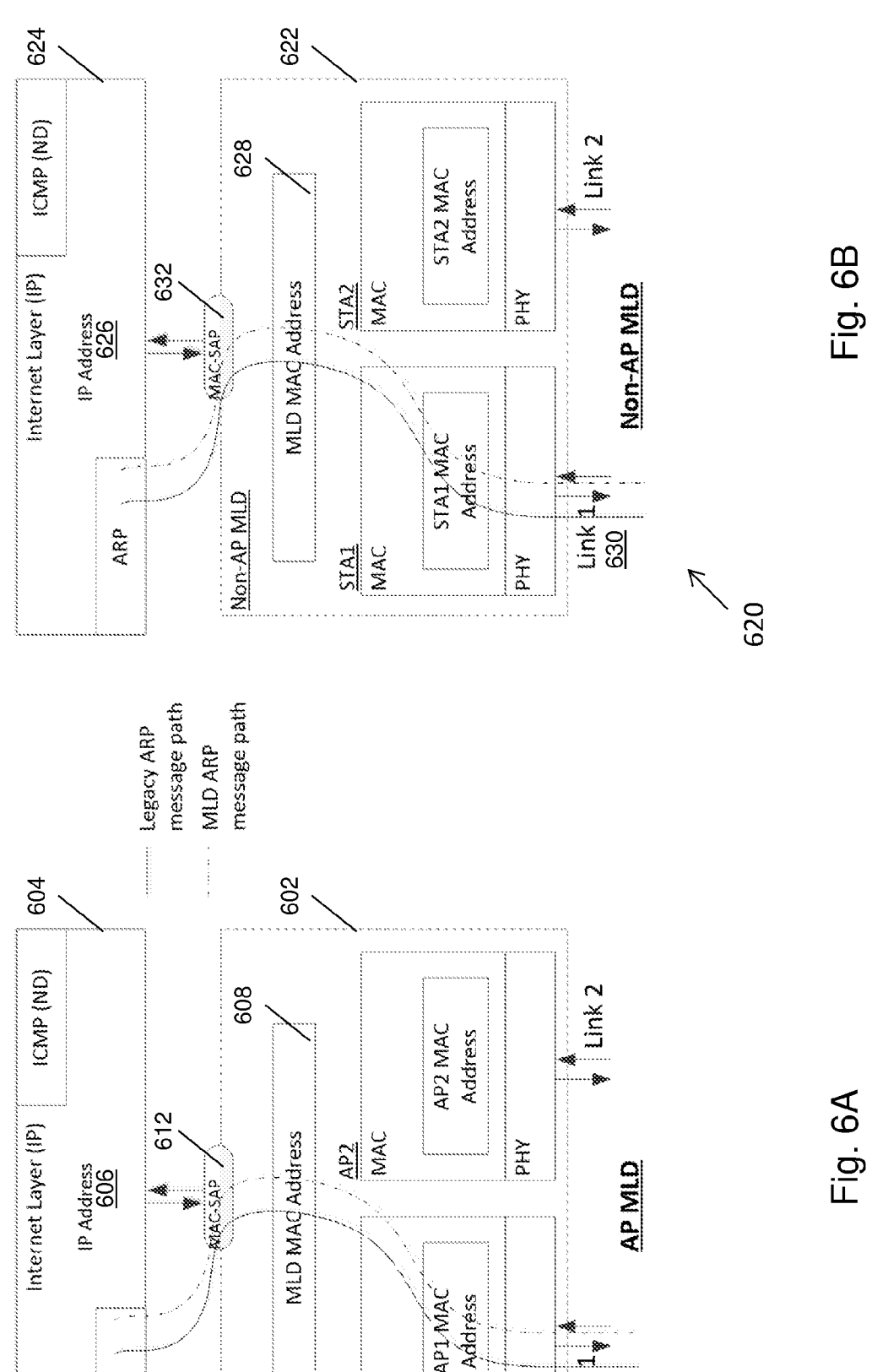
FIG. 6A shows a schematic diagram illustrating an example configuration of an AP MLD and communications of a network interface layer of the AP MLD with its internet layer for multi-link address resolution according to a first embodiment of the present disclosure.
FIG. 6B shows a schematic diagram illustrating an example configuration of a non-AP MLD communications of a network interface layer of a non-AP MLD with its internet layer for multi-link address resolution according to a first embodiment of the present disclosure.

In the first embodiment of the present disclosure, an MLD uses a same MAC SAP for both MLD and non-MLD connection. FIGS. 6A and 6B show schematic diagrams 600, 620 illustrating example configurations of an AP MLD 602 and a non-AP MLD 622 and communications of respective network interface layers with their respective internet layer 604, 624 for multi-link address resolution according to the first embodiment of the present disclosure. The AP MLD 602 and the non-AP MLD 622 each maintains a single IP address 606, 626 that is mapped to a MLD MAC address 608, 628. All ARP and ND messages, for example received from a link 610, 630 by the AP MLD 602 and the non-AP MLD 632, either through a legacy ARP message path or a MLD ARP message path, are routed through the MAC SAPs 612, 632 of the MLDs 602, 622, respectively. As a result, the MLDs 602, 622 will always return their respective MLD MAC address 608, 628 as their hardware/L2 MAC addresses.

Figure 7:
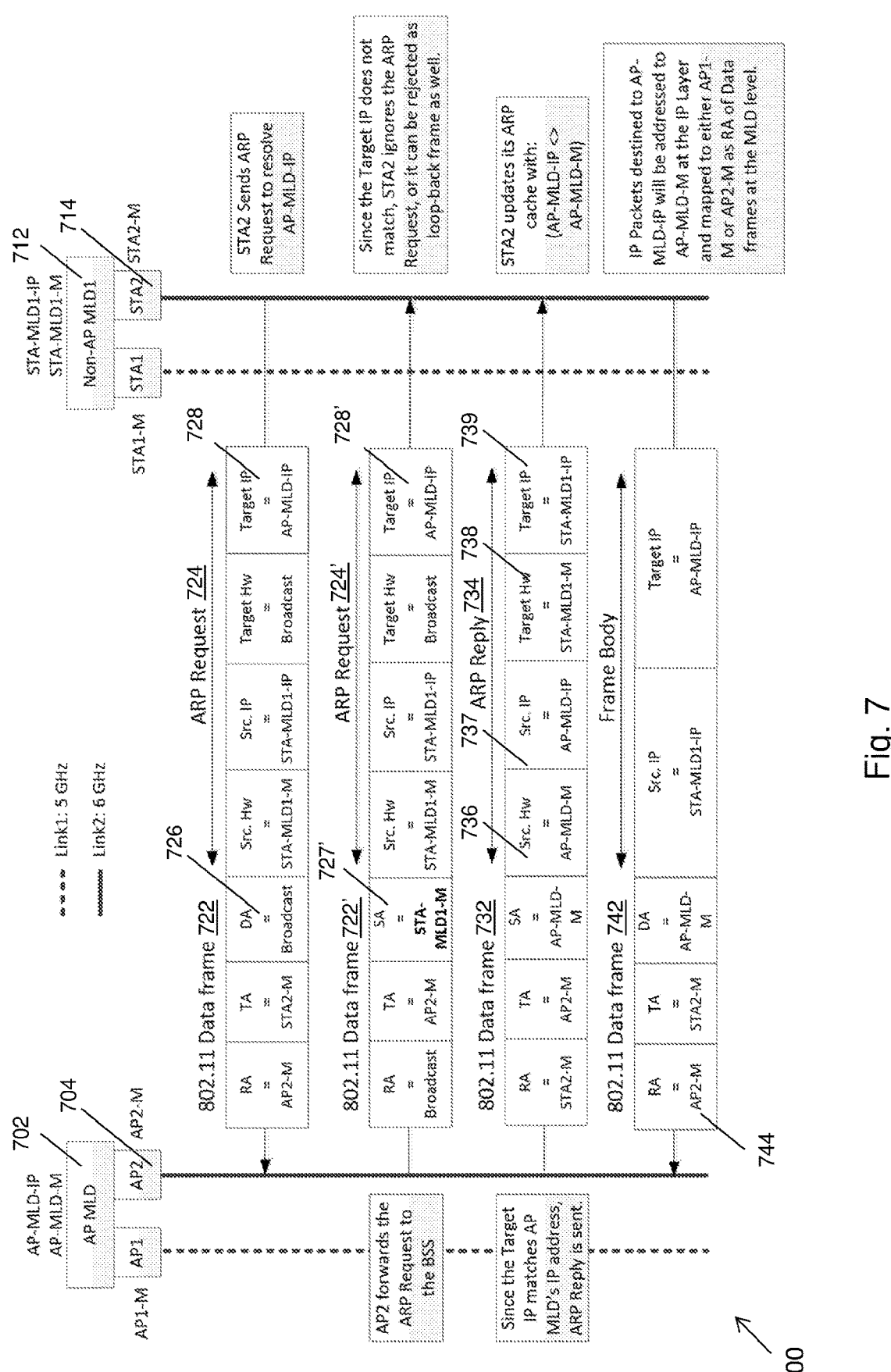
FIG. 7 shows a flow chart illustrating communications between an AP MLD and a non-AP MLD for multi-link address resolution according to the first embodiment of the present disclosure.

FIG. 7 shows a flow chart 700 illustrating communications between an AP MLD 702 and a non-AP MLD 712 for multi-link address resolution according to the first embodiment of the present disclosure. AP MLD 702 is affiliated with two APs (AP1, AP2 704) operating on 5 GHz and 6 GHz frequency bands respectively. AP MLD 702 is associated with non-AP MLD1 712 which is affiliated with two STAs (STA1, STA2 714) operating on 5 GHz and 6 GHz frequency bands respectively.

In this example, a non-AP MLD (e.g. non-AP MLD1 712) resolving an IP address of an associated AP MLD (e.g. AP MLD 702) is illustrated. STA2 714 of non-AP MLD1 712 may initiate a ARP query by generating and transmitting, to AP MLD 702 on the 6 GHz link (frequency band), a first data frame 722 carrying a broadcast address in its DA field 726 and an address resolution request (ARP Request) 724. A broadcast address in the DA field 726 indicates that the first data frame 722 is meant to be broadcasted to all STAs and non-AP MLDs associated with the AP MLD 702. The ARP request 724 carries the IP address of AP MLD 702 in the Target IP field 728 indicating that non-AP MLD1 712 is trying to resolve the IP address to obtain the corresponding MAC address of the AP MLD 702.

Next, AP2 704 of AP MLD 702, which receives the first data frame 722 on the 6 GHz link with the DA field set to broadcast address, forwards the first data frame 722' carrying the ARP Request 724' to all associated STAs and/or non-AP MLDs in the basic service set (BSS) including non-AP MLD1 712. The AP2 704 sets the SA field 727' to the MAC address of non-AP MLD1 712 indicating that the original sender of the first data frame 722' is non-AP MLD1 712. Since the target IP address carried in the Target IP field 728' of the ARP Request 724' received by STA2 714 does not match with its MLD's IP address, STA2 714 ignores the ARP Request 724' or reject the ARP Request 724' as loop-back frame.

On the other hand, since the target IP address carried in the Target IP field 728 of the ARP Request 724 received by AP2 704 matches its AP MLD's IP address, AP2 704 may generate and transmit, to non-AP MLD1 712 via the 6 GHZ link, a second data frame 732 carrying an address resolution response (ARP Reply) 734. The AP MLD 702 provides its AP MLD's MAC address in the Source Hardware field 736 of the ARP Reply 734. The ARP Reply 734 also carries the MAC address and the IP address of non-AP MLD1 respectively in the Target Hardware field 738 and Target IP field 739 indicating non-AP MLD1 712 as the target recipient of the ARP Reply 734.

Since the target IP address carried in the Target IP field 739 of the ARP Reply 734 received by STA2 714 matches with its MLD's IP address, STA2 714 may process the second data frame 732 and update its ARP cache to map the AP MLD's IP address (AP-MLD-IP) in the in the Source IP field 737 to the AP MLD's MAC address (AP-MLD-M) and the Source Hardware field 736 of the ARP Reply 734. As a result, the ARP query is resolved.

Subsequently, non-AP MLD 712 may transmit a subsequent data frame (IP Packet) 742 to AP MLD 702. The IP Packet destined to AP-MLD-IP will be addressed to AP-MLD-M at the IP layer, but since the non-AP MLD 712 is associated with the AP-MLD, it knows all the AP MAC Addresses of the AP MLD and hence will set the RA field 744 of the Data frame carrying the IP Packet 742 to the MAC address of one of the APs (in this case, AP2 704) of the AP MLD 702. As we see, the address resolution works well in this case.

Figure 8:
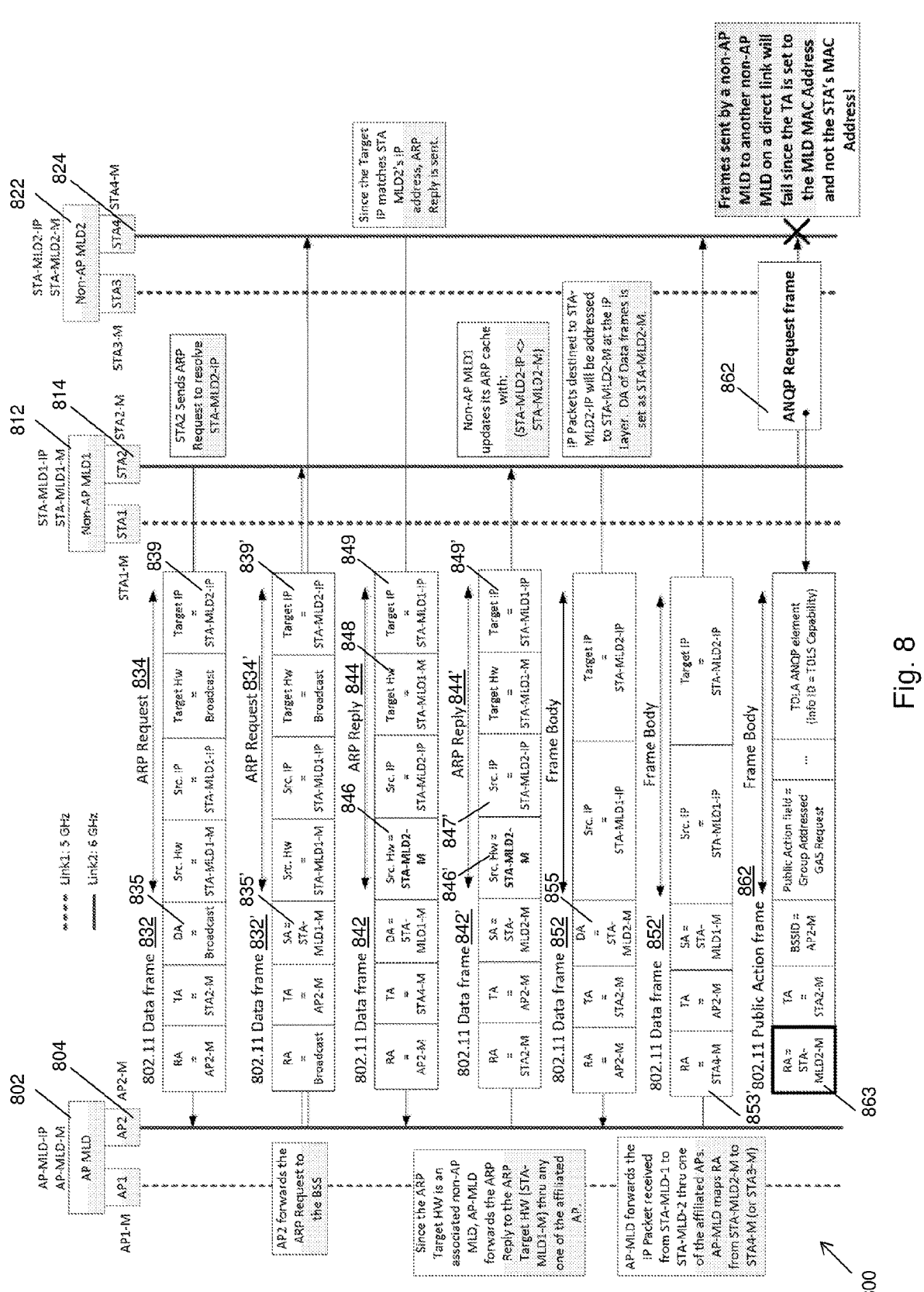
FIG. 8 shows a flow chart illustrating communications among between two non-AP MLDs via an AP MLD for multi-link address resolution according to the first embodiment of the present disclosure.

FIG. 8 shows a flow chart illustrating communications 800 between two non-AP MLDs 812, 822 via the AP MLD 802 for multi-link address resolution according to the first embodiment of the present disclosure. The AP MLD 802 is affiliated with two APs (AP1, AP2 804) operating on 5 GHz and 6 GHz frequency bands respectively. AP MLD 802 is associated with non-AP MLD1 814 and non-AP MLD2 816. Non-AP MLD1 814 is affiliated with two STAs (STA1, STA2 814) operating on 5 GHz and 6 GHz frequency bands respectively; and non-AP MLD2 822 is affiliated with two STAs (STA3, STA4 824) operating on 5 GHz and 6 GHz frequency bands respectively.

In this example, a non-AP MLD (e.g. non-AP MLD1 812) resolving an IP address of another non-AP MLD (e.g. non-AP MLD2 822) is illustrated. STA2 814 of non-AP MLD1 812 may initiate an ARP query by generating and transmitting, to AP MLD 802 in a 6 GHz link (frequency band), a first data frame 832 carrying a broadcast address in its DA field 835 and an address resolution request (ARP Request) 834. A broadcast address in the DA field 835 indicates that the first data frame 832 is being broadcasted to all associated STAs and non-AP MLDs. The ARP request 834 carries the IP address of non-AP MLD2 812 in the Target IP field 839 indicating that non-AP MLD1 812 is trying to resolve the IP address to obtain the corresponding MAC address of non-AP MLD2 822.

Next, AP2 804 of AP MLD 802, which receives the first data frame 832 on the 6 GHz link, forwards the first data frame 832' carrying the ARP Request 834' to all associated STAs and/or non-AP MLDs in the basic service set (BSS) including non-AP MLD1 812 and non-AP MLD2 822. The SA field 835' carries the MAC address of non-AP MLD1 812 indicating that the original sender of the first data frame 832' is non-AP MLD1 812. Since the target IP address carried in the Target IP field 839' of the ARP Request 834' received by STA2 814 and AP2 804 does not match with their respective MLD's IP addresses, STA2 814 and AP2 804 ignore the ARP Request 834' or reject the ARP Request 834' as a loop-back frame.

On the other hand, since the target IP address carried in the Target IP field 838' of the ARP Request 834' received by STA4 824 matches its non-AP MLD2's IP address (STA-MLD2-IP), STA4 824 may generate and transmit, to AP MLD 802, a second data frame 842 carrying an address resolution response (ARP Reply) 844 via the 6 GHZ link. Non-AP MLD2 822 provides its non-AP MLD2's MAC address (STA-MLD2-M) in the Source Hardware field 846 of the ARP Reply 844. The ARP Reply 844 also carries the MAC address and the IP address of non-AP MLD1 812 (STA-MLD1-M and STA-MLD1-IP) respectively in the Target Hardware field 848 and Target IP field 849 indicating non-AP MLD1 812 as the target recipient of the ARP Reply 844.

AP MLD 802, which receives the second data frame 842, identifies that the ARP Reply 844 carried in the second data frame 842 is directed to an associated non-AP MLD (in this case, non-AP MLD1 based on the MAC address (STA-MLD1-M) in the DA field), and forwards the second data frame 842' carrying the ARP Reply 844' to non-AP MLD1 812, through any one of the affiliated AP (in this case, AP2 804 to STA2 814 via the 6 GHz link).

Since the target IP address carried in the Target IP field 849' of the ARP Reply 844' received by STA2 814 matches with its MLD's IP address (STA-MLD1-IP), non-AP MLD1

812 may then process the second data frame 842' and update its ARP cache to map the non-AP MLD2's IP address (STA-MLD2-IP) in the in the Source IP field 847' to the non-AP MLD2's MAC address (STA-MLD2-M) in the Source Hardware field 846' of the ARP Reply 844'. As a result, the ARP query is resolved.

Subsequently, non-AP MLD1 812 may transmit a subsequent data frame (IP Packet) 852 to non-AP-MLD2 822 through AP MLD 802. The IP Packet destined to STA-MLD2-IP will be addressed to STA-MLD2-M at the IP layer with the DA field 855 of the subsequent data frame 852 set to the MLD MAC address of non-AP MLD2 822 (STA-MLD2-M) at the MLD level based on the record in its ARP Cache.

AP MLD 802, which receives the IP Packet 852, identifies that the IP Packet 852 is directed to an associated non-AP MLD (in this case, non-AP MLD2 based on the DA field 855 (STA-MLD2-M)), and forwards IP Packet 852' to non-AP MLD2 822 through any one of the affiliated AP (in this case, AP2 804 to STA4 824 via the 6 GHz link). Noting that as non-AP MLD2 822 is associated with AP MLD 802, and thus the L2 MAC address of STA4 824 is known to AP MLD 802, AP MLD 802 is able to translate the non-AP MLD2's MLD address (STA-MLD2-M) to the STA4's MAC address (STA4-M) in the RA field 853' when forwarding the IP Packet 852' to STA4 824. As such, the IP Packet 852' will be correctly received by STA4 824, and there will be no issue with the frames transmitted via AP-MLD 802.

However, for the ARP carried out under this first embodiment of the present disclosure, frames transmitted by a non-AP MLD (e.g. non-AP MLD1) to another non-AP MLD (e.g. non-AP MLD2) on a direct link (not via AP-MLD 802) will fail since the RA field is set to the MLD MAC address and not the STA's L2 MAC address. Returning to the example illustrated in FIG. 8, after the ARP query has been resolved, non-AP MLD1 812 may wish to transmit a Public Action frame (Access Network Query Protocol (ANQP) Request frame) 862 to non-AP ML2 822 on a direct link. Noting that non-AP MLD1 812 is not associated with non-AP MLD2 822, and thus the L2 MAC address of STA4 824 may not be known to non-AP MLD1 812, the RA field 863 of the ANQP Request frame 862 is set to non-AP MLD2's MLD MAC address (STA-MLD2-M) rather than the STA4's L2 MAC address. This will cause the ANQP Request frame 862 transmitted on the direct link to be dropped or ignored by STA4 824.

Figure 9:
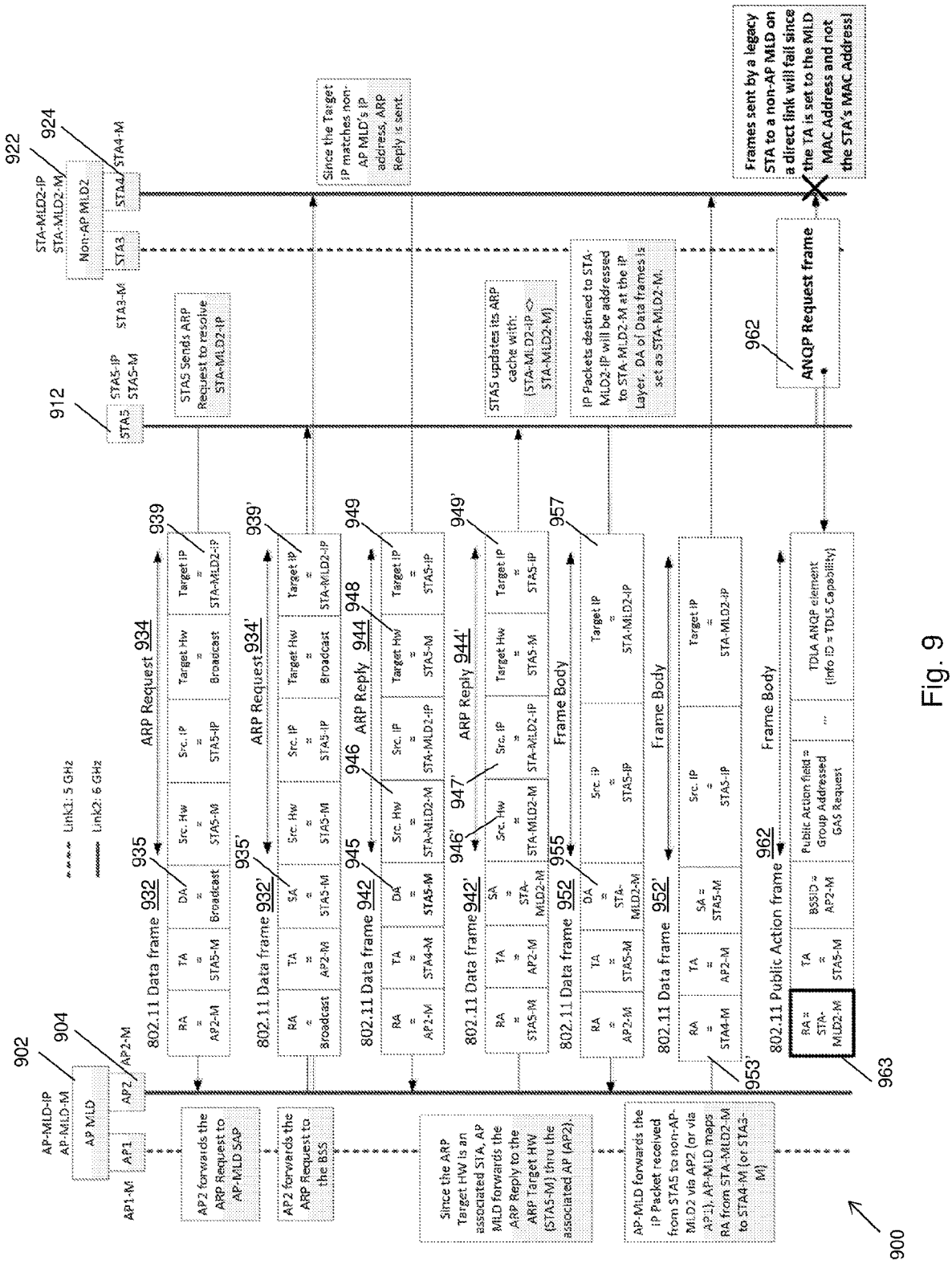
FIGS. 9 and 10 show two flow charts illustrating communications between a non-AP MLD and a non-MLD STA via an AP MLD for multi-link address resolution according to the first embodiment of the present disclosure.

FIG. 9 shows a flow chart 900 illustrating communications between a non-AP MLDs 922 and a legacy STA 912 via AP MLD 902 for multi-link address resolution according to the first embodiment of the present disclosure. The AP MLD 902 is affiliated with two APs (AP1, AP2 904) operating on 5 GHz and 6 GHz frequency bands respectively. AP MLD 902 is associated with STA5 912 and non-AP MLD2 922. Non-AP MLD2 922 is affiliated with two STAs (STA3, STA4 924) operating on 5 GHz and 6 GHz frequency bands respectively. STA5 912 is operating on the 6 GHz frequency band.

In this example, a legacy STA (e.g. STA5 912) resolving an IP address of a non-AP MLD (e.g. non-AP MLD2 922) is illustrated. STA5 912 may initiate an ARP query by generating and transmitting, to AP MLD 902 on the 6 GHz link (frequency band), a first data frame 932 carrying a broadcast address in its DA field 935 and an address resolution request (ARP Request) 934. A broadcast address in the DA field 935 indicates that the first data frame 932 is being broadcasted to all associated STAs and non-AP MLDs. The ARP request 934 carries the IP address of non-AP MLD2 924 in the Target IP field 939 indicating that STA5 912 is trying to resolve the IP address to obtain the corresponding MAC address of non-AP MLD2 924.

Next, AP2 904 of AP MLD 902, which receives the first data frame 932 on the 6 GHz link, forwards the first data frame 932' carrying the ARP Request 934' to all associated STAs and/or non-AP MLDs in the basic service set (BSS) including STA5 912 and non-AP MLD2 924. The SA field 935' carries the MAC address of STA5 912 indicating that the original sender of the first data frame 932' is STA5 912. Since the target IP address carried in the Target IP field 939' of the ARP Request 934' received by STA5 912 and AP2 904 does not match with their respective L2 and MLD MAC IP addresses, STA5 912 and AP2 904 ignore the ARP Request 934' or reject the ARP Request 934' as loop-back frame.

On the other hand, since the target IP address carried in the Target IP field 939' of the ARP Request 934' received by STA4 924 matches its non-AP MLD2's IP address (STA-MLD2-IP), STA4 924 may generate and transmit, to AP MLD 902, a second data frame 942 carrying an address resolution response (ARP Reply) 944 via the 6 GHz link. Non-AP MLD2 924 provides its non-AP MLD2's MAC address (STA-MLD2-M) in the Source Hardware field 946 of the ARP Reply 944. The ARP Reply 944 also carries the MAC address and the IP address of STA5 912 (STA5-M and STA5-IP) respectively in the Target Hardware field 948 and Target IP field 949 indicating STA5 912 as the target recipient of the ARP Reply 944.

AP MLD 902, which receives the second data frame 942, identifies that the ARP Reply 944 carried in the second data frame 942 is directed to an associated STA (in this case, STA5 912 based on the MAC address (STA5-M) in the DA field 945), and forwards the second data frame 942' carrying the ARP Reply 944' to STA5 912, through the affiliated AP in the 6 GHz band (in this case, AP2 904 via the 6 GHz link).

Since the target IP address carried in the Target IP field 949' of the ARP Reply 944' received by STA5 912 matches with its IP address (STA5-IP), STA5 912 may then process the second data frame 942' and update its ARP cache to map the non-AP MLD's IP address (STA-MLD2-IP) in the Source IP field 947' to the AP MLD's MAC address (STA-MLD2-M) in the Source Hardware field 946' of the ARP Reply 944'. As a result, the ARP query is resolved.

Subsequently, STA5 912 may transmit a subsequent data frame (IP Packet) 952 to non-AP-MLD2 922 through AP MLD 902. The IP Packet destined to STA-MLD2-IP will be addressed to STA-MLD2-M at the IP layer with the DA field 955 of the IP Packet 962 set to the MLD MAC address of non-AP MLD2 922 (STA-MLD2-M).

AP MLD 902, which receives the IP Packet 952, identifies that the IP Packet 952 is directed to an associated non-AP MLD (in this case, non-AP MLD2 922 based on the IP address (STA-MLD2-IP) in the Target IP field 957), and forwards IP Packet 952' to the target hardware, i.e. non-AP MLD2 922, through any one of the affiliated AP (in this case, AP2 904 to STA4 924 via the 6 GHz link). Noting that as non-AP MLD2 922 is associated with AP MLD 902, and thus the L2 MAC address of STA4 924 is known to AP MLD 902, AP MLD 902 is able to translate the non-AP MLD2's MLD address (STA-MLD2-M) to the STA4's MAC address (STA4-M) in the RA field 953' when forwarding the IP Packet 952' to STA4 924. As such, IP Packet 952' will be correctly received by STA4 924, and there will be no issue with the frames transmitted via AP-MLD 902.

However, for the ARP carried out under this first embodiment of the present disclosure, frames transmitted by a legacy STA (e.g. STA5 912) to a non-AP MLD (e.g. non-AP MLD2 922) on a direct link (not via AP-MLD 902) will fail since the RA field is set to the MLD MAC address and not the STA's L2 MAC address. Returning to the example illustrated in FIG. 9, after the ARP query has been resolved, STA5 912 may wish to transmit a Public Action frame (ANQP Request frame) 962 to non-AP ML2 922 on a direct link. Noting that STA5 912 is not associated with non-AP MLD2 922, and thus the L2 MAC address of STA4 924 may not be known to STA5 912, the RA field 963 of the ANQP Request frame 962 is set to non-AP MLD2's MLD MAC address (STA-MLD2-M) rather than the STA4's L2 MAC address. This will cause the ANQP Request frame 962 transmitted on the direct link to be dropped or ignored by STA4 924.

Figure 10:
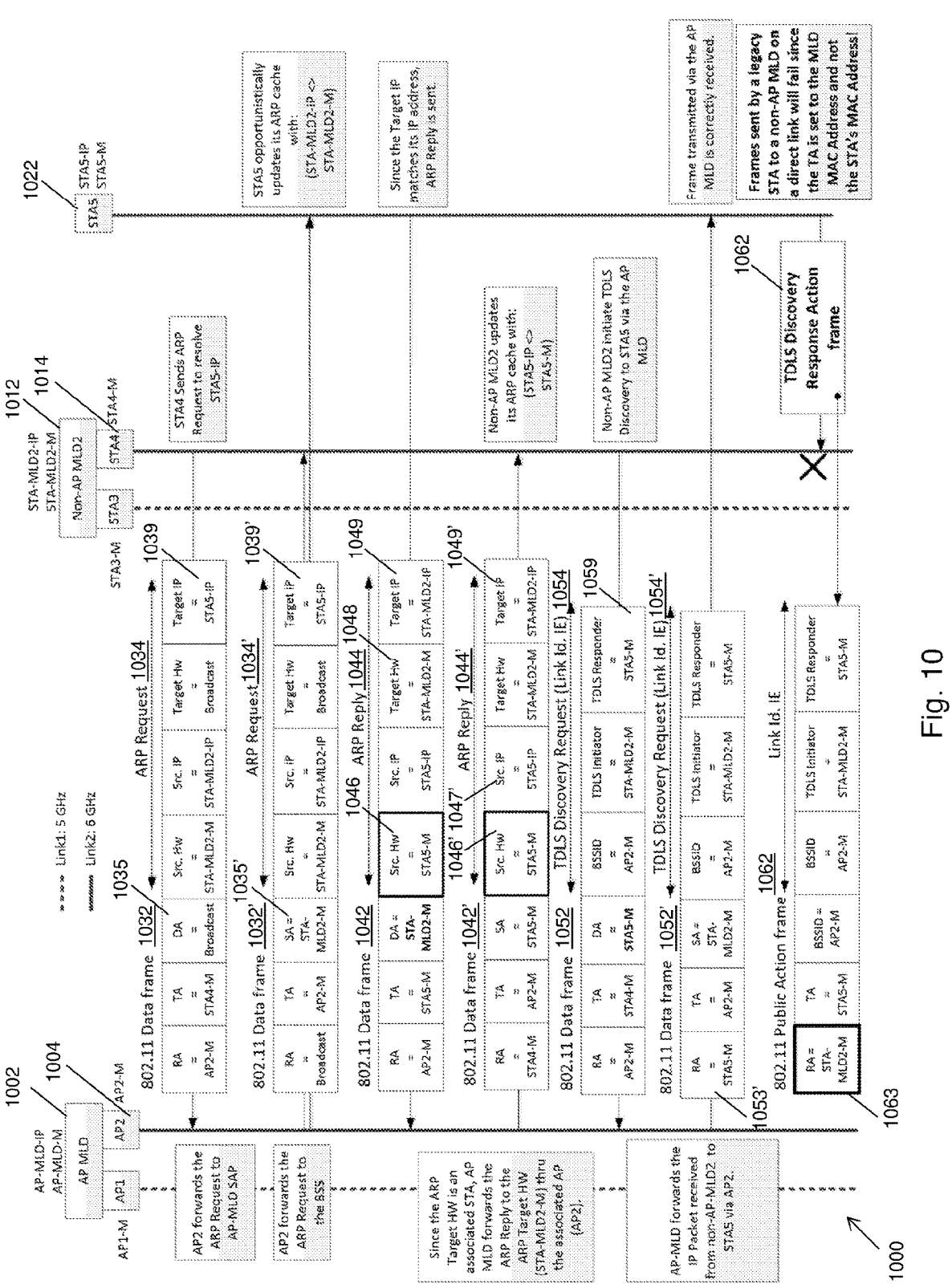

FIG. 10 shows a flow chart 1000 illustrating communications among an AP MLD 1002, one non-AP MLDs 1022 and a legacy STA 1012 for multi-link address resolution according to the first embodiment of the present disclosure. The AP MLD 1002 is affiliated with two APs (AP1, AP2 1004) operating on 5 GHz and 6 GHz frequency bands respectively. AP MLD 1002 is associated with non-AP MLD2 1012 and STA5 1022. Non-AP MLD2 1012 is affiliated with two STAs (STA3, STA4 1014) operating on 5 GHz and 6 GHz frequency bands respectively. STA5 1022 is operating on the 6 GHz frequency band.

In this example, a non-AP MLD (e.g. non-AP MLD2 1012) resolving an IP address of a legacy STA (e.g. STA5 1022) is illustrated. STA4 of non-AP MLD2 1012 may initiate a ARP query by generating and transmitting, to AP MLD 1002 on the 6 GHz link (frequency band), a first data frame 1032 carrying a broadcast address in its DA field 1035 and an address resolution request (ARP Request) 1034. A broadcast address in the DA field 1035 indicates that the first data frame 1032 is being broadcasted to all associated STAs and non-AP MLDs. The ARP request 1034 carries the IP address of STA5 1022 in the Target IP field 1039 indicating that non-AP MLD2 1012 is trying to resolve the IP address to obtain the corresponding MAC address of STA5 1022.

Next, AP2 1004 of AP MLD 1002, which receives the first data frame 1032 on the 6 GHz link, forwards the first data frame 1032' carrying the ARP Request 1034' to all associated STAs and/or non-AP MLDs in the basic service set (BSS) including non-AP MLD2 1012 and STA5 1022. The SA field 1035' carries the MAC address of non-AP MLD2 1012 indicating that the original sender of the first data frame 1032' is non-AP MLD2 1012. Since the target IP address carried in the Target IP field 1039' of the ARP Request 1034' received by STA4 1014 and AP2 1004 does not match with their respective L2 and MLD MAC IP addresses, STA4 1014 and AP2 1004 ignore the ARP Request 1034' or reject the ARP Request 1034' as loop-back frame.

On the other hand, since the target IP address carried in the Target IP field 1039' of the ARP Request 1034' received by STA5 1022 matches its IP address (STA5-IP), STA5 1022 may generate and transmit, to AP MLD 1002, a second data frame 1042 carrying an address resolution response (ARP Reply) 1044 via the 6 GHz link. STA5 1022 provides its L2 MAC address (STA5-M) in the Source Hardware field 1046 of the ARP Reply 1044. The ARP Reply 1044 also carries the MAC address and the IP address of non-AP MLD2 1012 (STA-MLD2-M and STA-MLD2-IP) respectively in the Target Hardware field 1048 and Target IP field 1049 indicating non-AP MLD2 1012 as the target recipient of the ARP Reply 1044.

AP MLD 1002, which receives the second data frame 1042, identifies that the ARP Reply 1044 carried in the second data frame 1042 is directed to an associated STA (in this case, non-AP MLD2 1012 based on the MAC address (STA-MLD2-M) in the DA field), and forwards the second data frame 1042' carrying the ARP Reply 1044' to non-AP MLD2 1012, through any one of the affiliated AP (in this case, AP2 1004 to STA4 1014 via the 6 GHz link).

Since the target IP address carried in the Target IP field 1049' of the ARP Reply 1044' received by STA4 1014 matches with its IP address (STA-MLD2-IP), STA4 1014 may then process the second data frame 1042' and update its ARP cache to map the STA5's IP address (STA5-IP) in the Source IP field 1047' to the STA5's MAC address (STA5-M) in the Source Hardware field 1046' of the ARP Reply 1044'. As a result, the ARP query is resolved.

Subsequently, non-AP MLD2 1012 may initiate a tunneled direct link setup (TDLS) Discovery by transmitting, to STA5 1022 through AP MLD 1002 operating on the 6 GHz link, a subsequent data frame 1052 carrying a TDLS Discovery Request 1054. The TDLS Discovery Request comprises a TDLS Initiator field set to the MAC address of non-AP MLD2 1012 and a TDLS Responder field 1059 set to the MAC address of STA5 1022 indicating that non-AP MLD2 1012 (initiator) is trying to set up a direct link with STA5 1022 (responder).

AP MLD 1022, which receives the subsequent data frame 1052, identifies that the TDLS Discovery Request 1054 carried in the data frame 1052 is directed to an associated STA (in this case, STA5 1012 based on the MAC address (STA5-M) in the DA field), and forwards the data frame 1052' to STA5 1022. Noting that as STA5 1022 is associated with AP MLD 1022, and thus the L2 MAC address of STA5 1024 is known to AP MLD 902, AP MLD 902 sets the STA5's MAC address (STA5-M) in the RA field 1053' when forwarding the data frame 1052 to STA5 1022. As such, the data frame will be correctly received by STA5 1022.

STA5 1022, which receives the TDLS Discovery Request 1054', may transmit a TDLS Discovery Response Action frame 1062 back to STA4 1014 on a direct link, i.e. STA5's operating link (Link 2 or 6 GHz frequency band). However, similar to the example illustrated in FIG. 9, as STA5 1022 is not associated with non-AP MLD2 1012, and thus the L2 MAC address of STA4 1014 may not be known to STA5 1022, the RA field 1063 of the TDLS Discovery Response Action frame 1062 is set to non-AP MLD2's MLD MAC address (STA-MLD2-M) based on the TDLS initiator field in the TDLS Discovery Request 1054' rather than the STA4's L2 MAC address. This will cause the TDLS Discovery Response Action frame 1062 transmitted on the direct link to be dropped or ignored by STA4 1014.

Therefore, according to the present disclosure, in order to be able to correctly receive a frame transmitted on a direct link by another non-AP MLD or a legacy STA, aside from the usual frame filtering criteria, a non-AP MLD should be configured to also accept specific frames with the RA field set to its MLD MAC address. In particular, to avoid unnecessary checking, only certain frames' RA field is checked for MLD MAC address such as (i) data frames with frame control fields "To DS" and "From DS" set to a value of 0 (setting used for peer-to-peer transmissions) and (ii) Public Action frames used for peer-to-peer discovery like TLDS Discovery Response frame and Group Address Request/ Response frame (used for ANQP Request/Response).

However, this violates the agreement in 802.11be that the value of Address 1 (RA) field in the MAC header of an individually addressed frame sent over-the-air shall be the MAC address of the receiving STA affiliated with the MLD corresponding to that link (and not the MLD MAC Address of the MLD).

Hence, there is thus a need for communication apparatuses and methods that provide feasible technical solutions for multi-link address resolution to address one or more of the above challenges, such that the multi-link address resolution can result in a frame transmitted on a direct link be correctly receive by another non-AP MLD or a legacy STA in accordance with in the 802.11be agreement regarding the setting of the RA/TA fields.

According to the second embodiment of the present disclosure, an MLD's IP address is dynamically mapped to either the MLD MAC address or one of the L2 MAC addresses of the MLD. A determination may be carried out to determine which MAC address to return as the MLD's hardware MAC address in response to an address resolution request (ARP Request or Neighbor Solicitation message). This depends on whether the requesting STA which transmits the address resolution request to resolve another MLD or STA's IP address is an MLD or a non-MLD.

If it is determined that the requesting STA is an MLD, the MLD MAC address is returned as the MLD's hardware MAC address; whereas if it determined that the requesting STA is a non-MLD (either EHT or legacy STA), the MAC address of the affiliated AP/STA operating on the link in which the address resolution request is received is returned as the MLD's hardware MAC address. So, from a non-MLD's point of view, the MLD is identified by the MAC address of the affiliated AP/STA operating on the same link in which the non-MLD operates. However, if the non-MLD happen to be operating on a link that is not among any of the setup links of the MLD, the MLD may be identified by its MLD MAC Address.

One possible solution to achieve the above is by an MLD using different MAC SAPs for MLD and non-MLD/legacy connections. In the following paragraphs, a second embodiment of the present disclosure is explained with reference to multi-link address resolution in an AP MLD, a non-AP MLD and/or a non-MLD STA where the AP MLD and non-AP MLD uses different MAC SAPs for MLD and non-MLD/ legacy connections.

Frames transmitted by MLDs may carry an "ML indication" to indicate that it is transmitted by (or originated from) an MLD. The "ML indication" may be carried in all frames transmitted by MLDs, or it may be carried in frames transmitted/relayed by an AP MLD.

According to the second embodiment of the present disclosure, an MLD Address Query mechanism is proposed to perform MLD MAC address to L2 MAC address resolution, which will be illustrated in the following paragraphs relating to FIG. 18.

Further, AP MLD may provide proxy ARP features, which dynamically maps the IP address of an associated non-AP MLD to either the non-AP MLD's MLD MAC address or one of the L2 MAC addresses of the non-AP MLD. A determination may be carried out by the AP MLD on behalf of the non-AP MLD to determine which MAC address to return as the non-AP MLD's hardware MAC address in response to an address resolution request (ARP Request or Neighbor Solicitation message). This depends on whether the requesting STA which transmits the address resolution request to resolve the non-AP MLD or STA's IP address is an MLD or a non-MLD.

If it is determined that the requesting STA is an MLD, the non-AP MLD's MLD MAC address is returned as the MLD's hardware MAC address; whereas if it determined that the requesting STA is a non-MLD (either EHT or legacy STA), the MAC address of the affiliated STA of the MLD operating on the link in which the address resolution request is received is returned as the MLD's hardware MAC address. However, if the non-MLD happen to be operating on a link that is not among any of the setup links of an associated non-AP MLD, the AP MLD may return the non-AP MLD's MLD MAC Address as its hardware MAC address.

According to the second embodiment, when forwarding unicast data frames transmitted by an associated non-AP MLD to an associated non-MLD STA (e.g. legacy STA), the AP MLD sets the SA field of the forwarded data frame as the MAC address of the STA of the non-AP MLD corresponding to the link in which the frame is received by the AP MLD. Similarly when forwarding unicast data frames transmitted by an associated non-MLD STA (e.g. legacy STA) to an associated non-AP MLD, the AP MLD shall forward the frame on the same link in which the frame was received (i.e. link crossover is not allowed) as long as the non-AP MLD has an affiliated AP operating on the link.

In TDLS frames transmitted by a non-AP MLD to a non-MLD STA (e.g. legacy STA), the relevant address fields such as the TDLS Initiator STA, TDLS Responder STA are set as the STA MAC address of the non-AP MLD corresponding to the transmission link (and not the MLD MAC address).

Figures 11A, 11B:
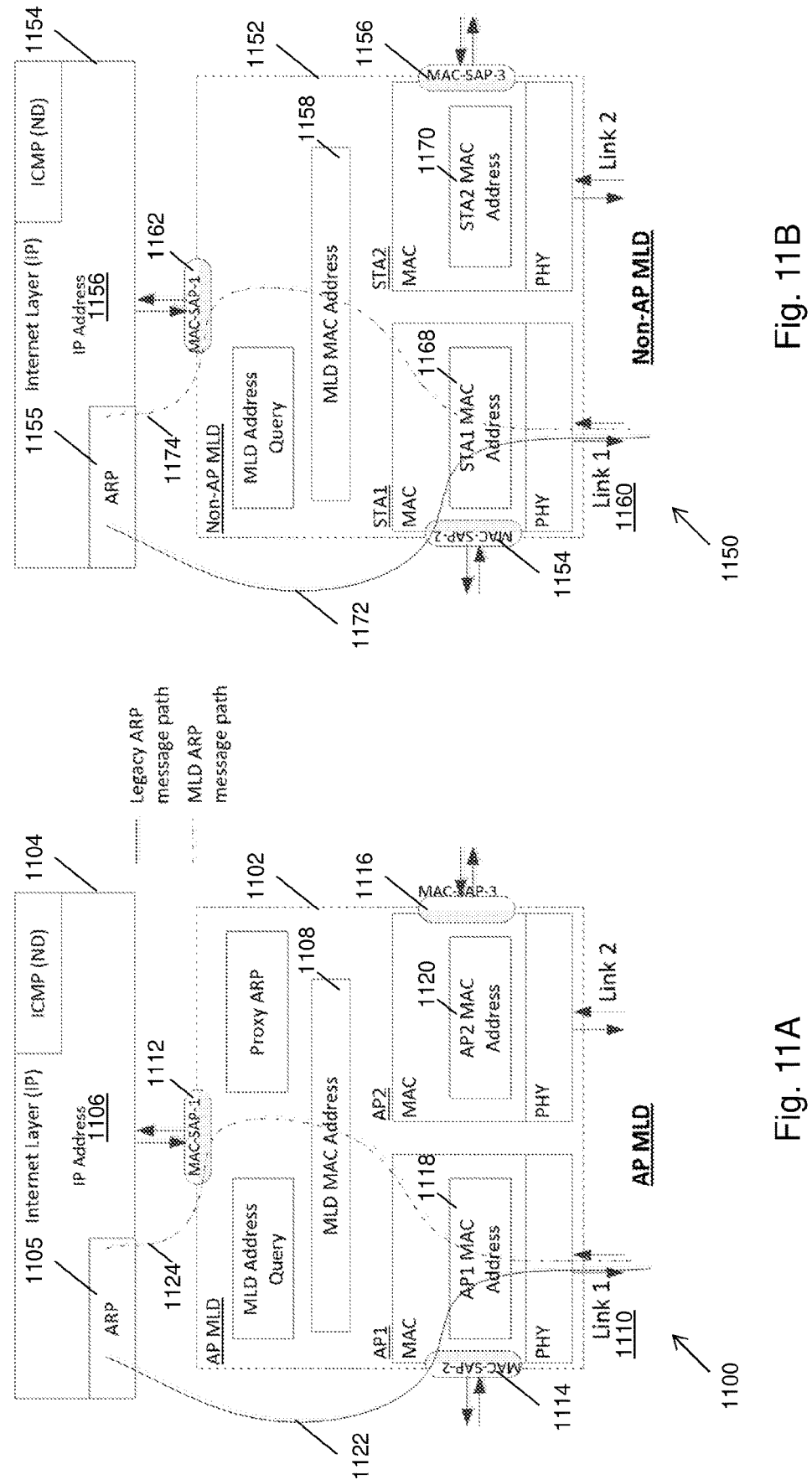
FIG. 11A shows a schematic diagram illustrating an example configuration of an AP-MLD and communications of a network interface layer of the AP MLD with its internet layer for multi-link address resolution according to a second embodiment of the present disclosure.
FIG. 11B shows a schematic diagram illustrating an example configuration of a non-AP-MLD and communications of a network interface layer of the non-AP MLD with its internet layer for multi-link address resolution according to a second embodiment of the present disclosure.

FIGS. 11A and 11B show schematic diagrams 1100, 1150 illustrating example configurations of an AP MLD 1102 and a non-AP MLD 1152 and communications of respective network interface layers with their respective internet layer 1104, 1154 for multi-link address resolution according to the second embodiment of the present disclosure. The AP MLD 1102 and the non-AP MLD 1152 each maintains a single IP address 1106, 1156 that is mapped to a MLD MAC address 1108, 1158 and a MAC SAP for the MLD (e.g. MAC-SAP-1 1112, 1162) and a AP/STA MAC SAP for each of the affiliated APs/STAs within the MLD (e.g. AP1/STA1's MAC-SAP-2 1114, 1154 and AP2/STA2's MAC-SAP-3 1116, 1156).

The AP MLD 1100 and the non-AP MLD 1150 use different MAC SAPs for MLD and non-MLD (including legacy STAs) connections. The MLDs' IP addresses are dynamically mapped to either the MLD MAC address 1108, 1158 or the STA MAC address 1118, 1120, 1168, 1170. Traffic to/from DS (including ARP and ND messages) from/to MLDs are routed through the MLD MAC SAPs 1112, 1162, as indicated by lines 1122, 1172, and while traffic to/from DS (including ARP and ND messages) from/to non-MLDs are routed through the STA MAC SAPs 1114, 1116, 1154, 1156, as indicated by lines 1124, 1174. ARP/ND 1105, 1155 returns the MAC address of the corresponding MAC SAP through which the ARP/ND request was received. In other words, if an ARP/ND request was received from a non-MLD, the traffic is routed through a STA MAC SAP and a STA MAC address is returned; whereas if a ARP/ND request was received from a MLD, the traffic is route through a MLD MAC SAP and thus a MLD MAC address is returned.

Further, it is also possible that multiple IP addresses are assigned to the device and there is one-to-one mapping between IP address and the MAC Address corresponding to each MAC SAP; e.g. one IP Address corresponding to the MLD MAC Address; and one IP address corresponding to each of the AP/STA MAC Addresses.

Figure 12:
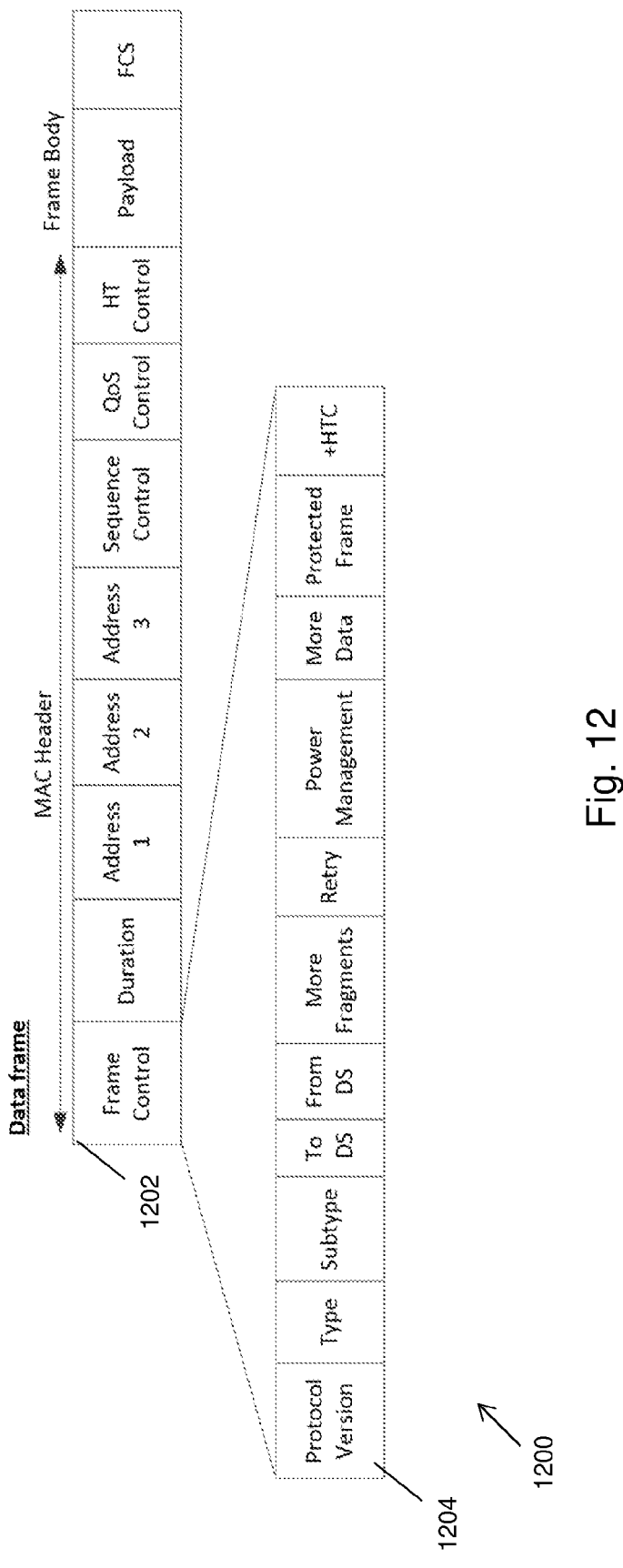
FIG. 12 shows an example format of a data frame according to the second embodiment of the present disclosure.

FIG. 12 shows an example format of a data frame 1200 according to the second embodiment of the present disclosure. The data frame 1200 may comprise a Frame Control field, a Duration field, an Address 1 field, an Address 2 field, an Address 3 field, a Sequence Control field, a Quality of Service (QoS) Control field, a HT field, a Payload field and a Frame Check Sequence (FCS). The Frame Control field 1202, the Duration field, the Address 1 field, the Address 2 field, the Address 3 field, the Sequence Control, the QoS Control field, the HT Control field may be grouped as MAC header. The Frame Control field 1202 comprises a Protocol Version subfield 1204, a Type subfield, a Subtype subfield, a To DS subfield, From DS subfield, More Fragments subfield, a Retry subfield, a Power Management subfield, a More Data subfield, a Protected Frame subfield and a +HTC subfield.

When the Protocol Version subfield 1204 in the Frame Control field 1202 of the Data frame 1200 is set to a value other than 'b00', it acts as an "ML indication" identifying the transmitting/originating device as an MLD. A recipient STA/AP or STAs/APs of a recipient MLD use the presence of the "NIL indication" to determine whether or not the transmitting/originating device is an MLD, and thus the MAC SAP to which the received data frames are forwarded to. In particular, Data frames received by a recipient MLD carrying such "ML indication" are forwarded to the MLD MAC SAP, while all other Data frames are forwarded to the STA/AP MAC SAP. ARP/ND of the recipient MLD returns the MAC address corresponding to the MAC SAP through which the APR/ND request is received as the hardware address of the recipient MLD. Advantageously, an MLD's hardware MAC address will be correctly mapped based on the ML indication identifying the type of the requesting STA (MLD or non-MLD).

An AP knows the device type of all associated devices, for example, based on capabilities exchange during the association procedure. Even without an "NIL indication", an AP can decide the MAC SAP based on the TA field. Data frames from legacy STAs go to AP MAC SAP, while those from non-AP MLDs go to MLD MAC SAP.

Figure 13:
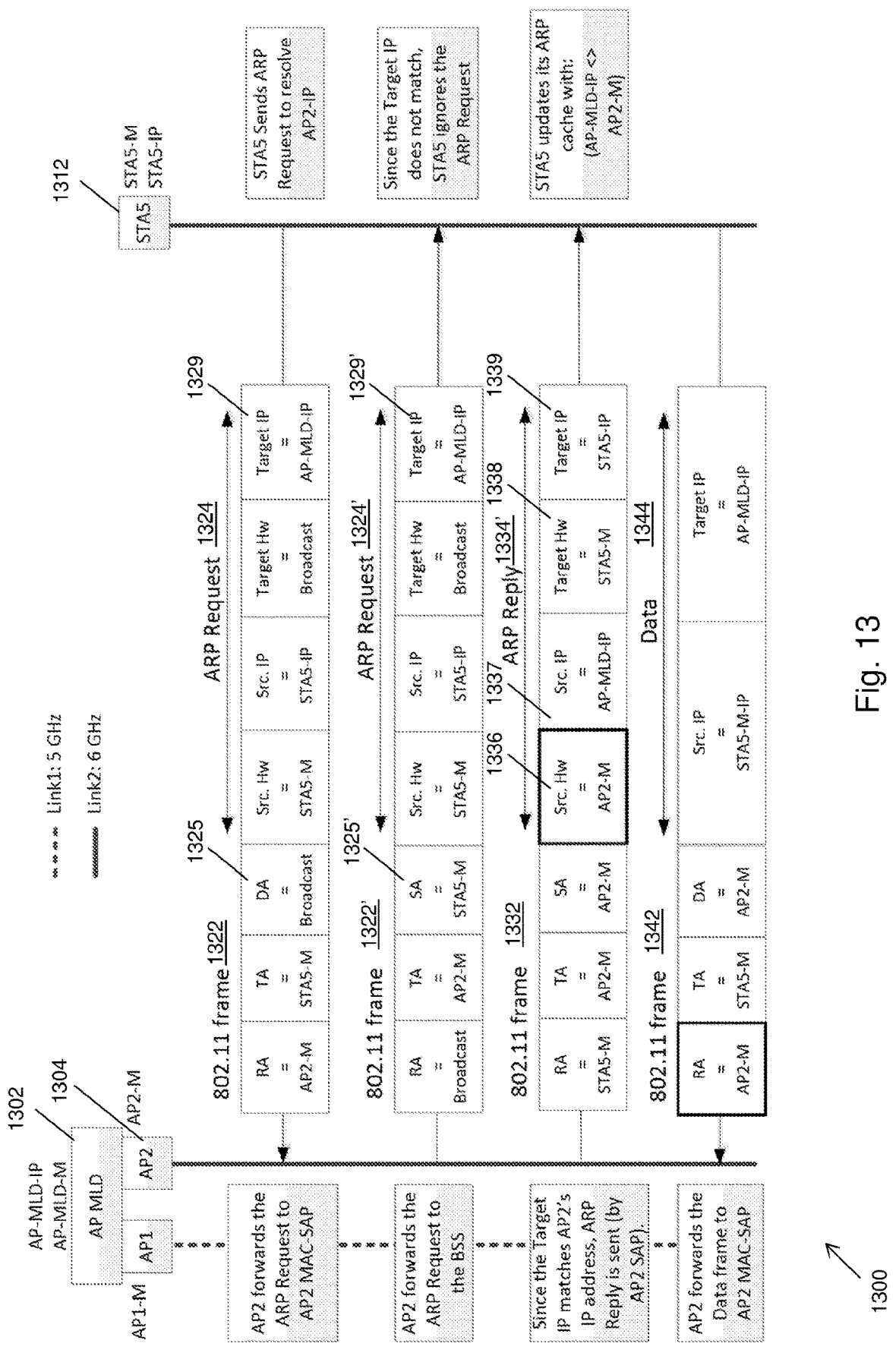
FIG. 13 shows a flow chart illustrating communication between an AP MLD and a non-MLD STA for multi-link address resolution according to the second embodiment of the present disclosure.

FIG. 13 shows a flow chart illustrating communication between an AP MLD 1302 and a non-MLD STA 1312 for multi-link address resolution according to the second embodiment of the present disclosure. AP MLD 1302 is affiliated with two APs (AP1, AP2 1304) operating on 5 GHz and 6 GHz frequency bands respectively. AP MLD 1302 is associated with STA5 1312 on 6 GHz frequency band.

In this example, a legacy STA (e.g. STA5 1312) resolving an IPv4 address of an associated AP MLD (e.g. AP MLD 1302) is illustrated. STA5 1312 may initiate a ARP query by generating and transmitting, to AP MLD 1302 on the 6 GHz link (frequency band), a first data frame 1322 carrying a broadcast address in its DA field 1325 and an address resolution request (ARP Request) 1324. A broadcast address in the DA field 1325 indicates that the first data frame 1322 is being broadcasted to all associated STAs and non-AP MLDs. The ARP request 1324 carries the IP address of AP MLD 1302 (AP-MLD-IP) in the Target IP field 1329 indicating that STA5 1312 is trying to resolve the IP address to obtain the corresponding MAC address of the AP-MLD 1302.

Next, AP2 1304 of AP MLD 1302, which receives the first data frame 1322 on the 6 GHz link, may forward the first data frame 1322' carrying the ARP Request 1324' to all associated STAs and/or non-AP MLDs in the basic service set (BSS) including STA5 1312. The SA field 1325' carries the MAC address of STA5 indicating that the original sender of the first data frame 1322' is STA5. Since the target IP address carried in the Target IP field 1329' of the ARP Request 724' received by STA5 1312 does not match with its IP address, STA5 1312 ignores the ARP Request 1324' or reject the ARP Request 1324' as loop-back frame.

On the other hand, since the target IP address carried in the Target IP field 1329 of the ARP Request 1324 received by AP2 1304 matches its AP MLD's IP address, AP2 1304 may identify the originating device is STA5 1312 based on the SA field 1325', and determine the device type of requesting device STA5 1312. In this case, AP2 1304 may determines that STA5 is a non-MLD, and, on this basis, the ARP Request 1324 is forwarded to the AP2 MAC SAP (and not the MLD MAC SAP).

A second data frame 1332 carrying an address resolution response (ARP Reply) 1334 may be generated by the AP MLD 1302 and pass down via AP2's MAC SAP to transmit from AP2 1304 to STA5 1312 via the 6 GHZ link. The ARP Reply 1334 carries AP2's MAC address (AP2-M) in the Source Hardware field 1336, AP MLD's IP Address in the Source IP field 1337, the STA5's MAC address in the Target Hardware field 1338 and the STA5's IP address in the Target IP field 1339 indicating STA5 1312 is the target recipient of the ARP Reply 1334.

Since the target IP address carried in the Target IP field 1339 of the ARP Reply 1334 received by STA5 1312 matches with its IP address, STA5 1312 may process the second data frame 1332 and update its ARP cache to map the AP MLD's IP address (AP-MLD-IP) in the Source IP field 1337 to the AP2's MAC address (AP2-M) in the Source Hardware field 1336 of the ARP Reply 1334. As a result, the ARP query is resolved.

Subsequently, STA5 1312 may transmit a subsequent data frame 1342 to AP2 1304 through AP2 MAC-SAP. The data frame 1342 destined to AP-MLD will be addressed to AP2 at the IP layer with the RA field 1353 of the data frame 1342 set to the AP2's MAC address (AP2-M).

Figure 14:
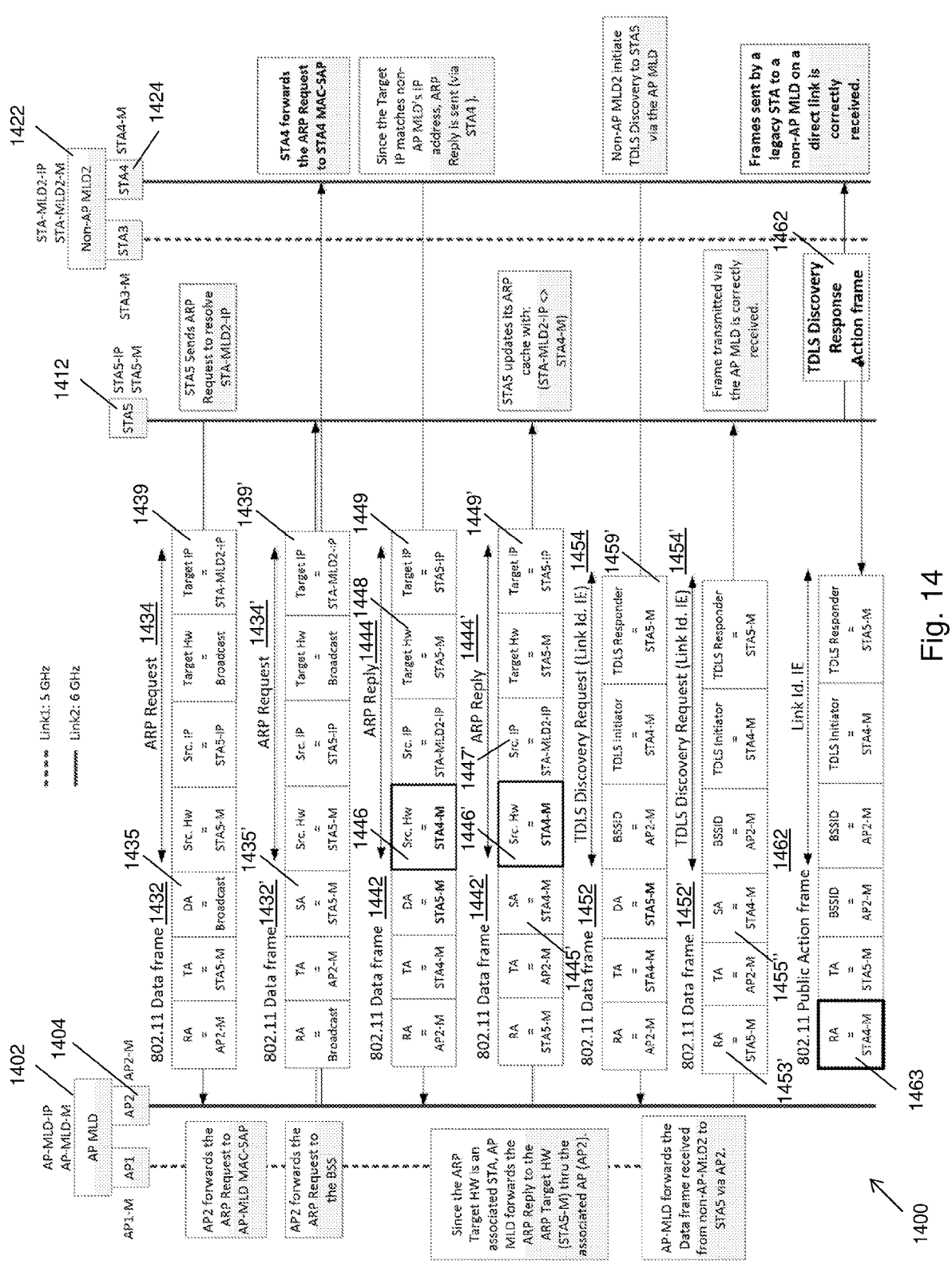
FIGS. 14-17 show four flow charts illustrating between a non-AP MLD and a non-MLD STA via an AP MLD for multi-link address resolution according to the second embodiment of the present disclosure.

FIG. 14 shows a flow chart 1400 illustrating communication between a non-AP MLD 1422 and a non-MLD STA 1412 via AP MLD 1402 for multi-link address resolution according to a first example of the second embodiment of the present disclosure.

In this first example, a legacy STA (e.g. STA5 1412) resolving an IPv4 address of a non-AP MLD (e.g. non-AP MLD2 1422) with a common link (e.g. Link 2 or 6 GHz frequency band) is illustrated. STA5 1412 may initiate an ARP query by generating and transmitting, to AP MLD 1402 on the 6 GHz link (frequency band), a first data frame 1432 carrying a broadcast address in its DA field 1435 and an address resolution request (ARP Request) 1434. A broadcast address in the DA field 1435 indicates that the first data frame 1432 is being broadcasted to all associated APs and AP MLDs. The ARP request 1434 carries the IP address of non-AP MLD2 1422 in the Target IP field 1439 indicating that STA5 1412 is trying to resolve the IP address to obtain the corresponding MAC address of non-AP MLD2 1422.

Next, AP2 1404 of AP MLD 1402, which receives the first data frame 1432 on the 6 GHz link, may forward the first data frame 1432' carrying the ARP Request 1434' to all associated STAs and/or non-AP MLDs in the basic service set (BSS) including STA5 1412 and non-AP MLD2 1422. The SA field 1435' carries the MAC address of STA5 1412 indicating that the original sender of the first data frame 1434' is STA5 1412. Since the target IP address carried in the Target IP field 1439' of the ARP Request 1434' received by STA5 1412 and AP2 1404 does not match with their respective L2 and MLD MAC IP addresses, STA5 1412 and AP2 1404 ignore the ARP Request 1434' or reject the ARP Request 1434' as loop-back frame.

STA4 1424 may identify the ARP Request 1434' is originated from STA5 1412 based on the SA field 1435', and determine that the requesting device STA5 1412 is a non- MLD due to a lack of "ML indication" in the first data frame 1432'. On this basis, the ARP Request 1434' is forwarded to the ARP/IP layer via the STA4 MAC SAP. Non-AP MLD2 1422 may also record Link 2 (6 GHz frequency band) as the STA5's operating link.

Since the target IP address carried in the Target IP field 1439' of the ARP Request 1434' matches non-AP MLD2's IP address (STA-MLD2-IP), AP MLD2 may generate a second data frame 1442 carrying an address resolution response (ARP Reply) 1444 using its STA MAC SAP and transmit the data frame 1442 to AP2 1404 via STA4. The ARP Reply 1444 carried in the data frame 1442 carries STA4's MAC address (STA4-M) in the Source Hardware field 1446, the STA5's MAC address in the Target Hardware field 1448 and the STA5's IP address in the Target IP field 1449 indicating STA5 1412 is the target recipient of the ARP Reply 1444.

AP MLD 1402, which receives the second data frame 1442, identifies that the ARP Reply 1444 carried in the second data frame 1442 is directed to STA5 based on the MAC address (STA5-M) in the Target Hardware field 1448, and forwards the second data frame 1442' carrying the ARP Reply 1444' to STA5 1412, through AP2 1404 operating on the STA5's operating link (Link 2). It is noted that the SA field of the second data frame 1442' is set to STA4's MAC address (and not non-AP MLD's MLD MAC Address) to identify the original transmitting STA of the second data frame 1442 is STA4 1424.

STA5 1412, which receives the second data frame 1442, may process it and update its ARP cache to map the non-AP MLD's IP address (STA-MLD2-IP) in the Source IP field 1447' to the STA4's MAC address (STA4-M) in the Source Hardware field 1446' of the ARP Reply 1444'. As a result, the ARP query is resolved.

Subsequently, STA4 1424 of non-AP MLD2 1422 may initiate a TDLS Discovery by transmitting a subsequent data frame 1452 carrying a TDLS Discovery Request 1454 to STA5 1412. STA4 1424 is used as TDLS Initiator since it is now known that the peer device is a non-MLD STA, i.e. STA5 1412, is operating on Link 2. The TDLS Discovery Request 1454 comprises a TDLS Initiator field set to the STA4's MAC address and a TDLS Responder field 1459 set to the MAC address of STA5 1412.

AP MLD 1402, which receives the subsequent data frame 1452, identifies that the TDLS Discovery Request 1454 carried in the data frame 1452 is directed to STA5 1412 based on STA5's MAC address (STA5-M) in TDLS Responder field 1459, and forwards the Data frame 1452' received from non-AP MLD2 1422 carrying STA4's MAC address (STA4-M) in the SA field 1455' and the TDLS Discovery Request 1454' to STA5 1412. AP MLD 1402 sets the STA5's MAC address (STA5-M) in the RA field 1453' when forwarding the Data frame 1452' to STA5 1412. As such, the data frame will be correctly received by STA5 1412.

STA5 1412, which receives the TDLS Discovery Request 1454', may transmit a TDLS Discovery Response Action frame 1462 back to STA4 1426 on a direct link, i.e. STA5's operating link (Link 2). STA5 1412 is able to set the RA field 1463 of the TDLS Discovery Response Action frame 1462 to STA4's MAC address (STA4-M) based on the mapping stored in its ARP cache. As such, this leads to the frames such as the TDLS Discovery Response Action frame 1462 sent by STA5 1412 to the non-AP MLD 1422 on a direct link to be correctly received via STA4 1424.

This resolves the issue of frames transmitted on a direct link between a legacy STA and a non-AP MLD failing to be correctly received as depicted in the first embodiment of the present disclosure. Since the SA fields as well as the TDLS Initiator fields in the Link Identifier element of the TDLS Discovery Request frames relayed by the AP are both set as STA MAC Addresses, there will be no confusion at the receiving peer STA.

When forwarding group addressed Data frames received from an associated non-MLD (for example 1432), the AP MLD shall forward the frame on the same link (e.g. 6 GHz link) in which the frame was received as long as there are associated non-AP MLD operating on that link. If there are associated non-AP MLDs operating in power save mode on that link and actively operating on another link (e.g. 5 GHz link), the AP shall buffer the Data frame for such non-AP MLDs on the 6 GHz link and inform the non-AP MLD of the buffered frame on the 5 GHz link, e.g. using the TIM element in DTIM Beacon frames. This is to ensure that the Data frame is forwarded via the correct STA MAC SAP of the non-AP MLD and the correct STA MAC Address (of the STA that operates on the same link as the non-MLD) is returned as the non-AP MLD's hardware MAC Address.

Figure 15:
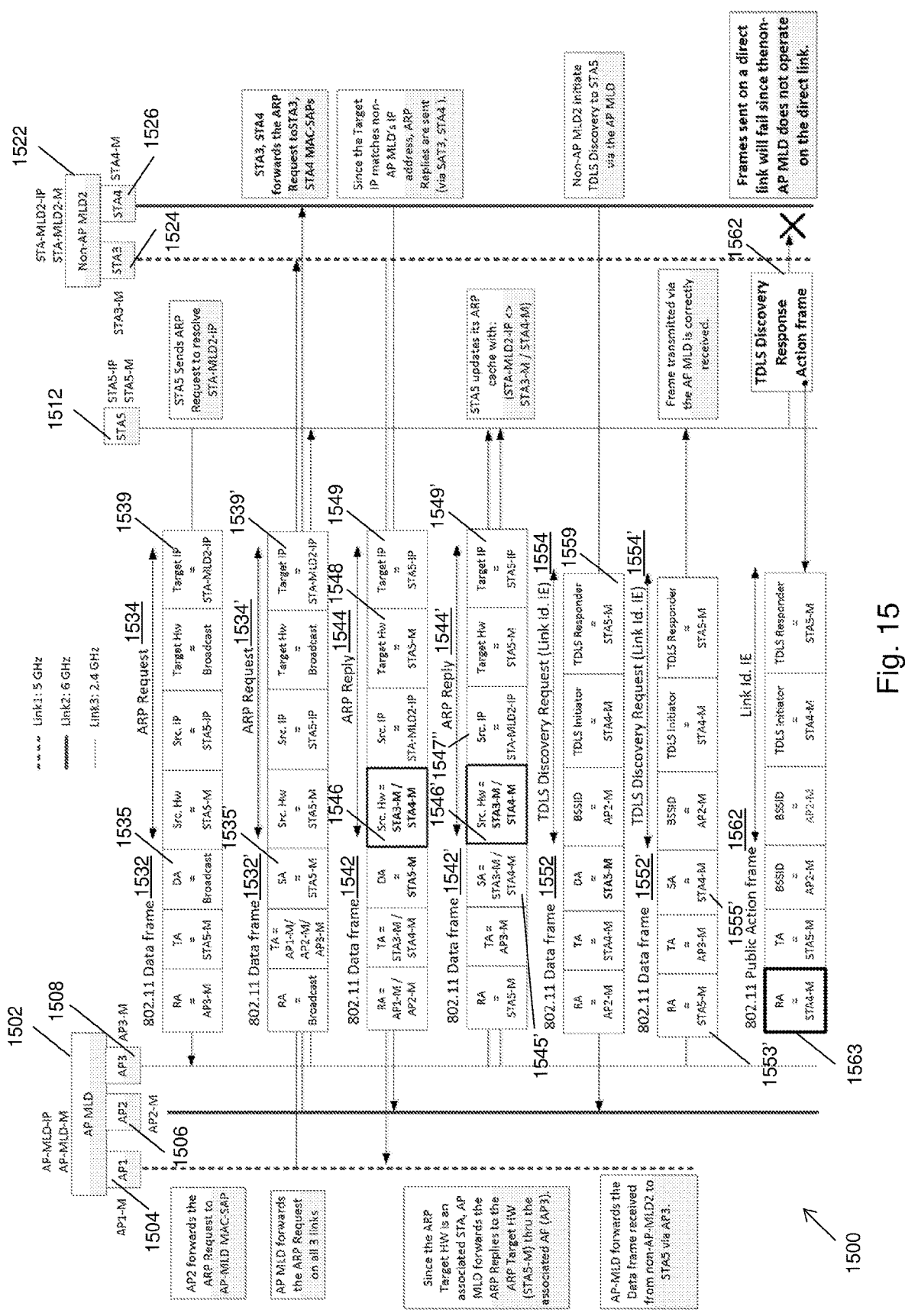

FIG. 15 shows a flow chart 1500 illustrating communication between a non-AP MLD 1522 and a non-MLD STA 1512 via AP MLD 1502 for multi-link address resolution according to a second example of the second embodiment of the present disclosure.

In this second example, a legacy STA (e.g. STA5 1512) resolving an IPv4 address of a non-AP MLD (e.g. non-AP MLD2 1522) without a common link is illustrated. If the non-MLD happen to be operating on a link that is not among the setup links of some of associated non-AP MLDs, the AP MLD has no choice but to forward any group addressed Data frames received from an associated non-MLD on all the setup links in other to reach all the associated non-AP MLDs. This causes multiple ARP Requests and ARP responses to be generated and as a result the legacy STA's ARP may cache any one of the STA MAC Addresses of the non-AP MLD. Regardless, communication between the legacy STA and the non-AP MLD will be successful if they happen via the associated AP MLD, however in this case since there is no direct link between the legacy STA and the non-AP MLD, direct link communication is not possible regardless of the ARP cache.

Returning to the example, STA 5 is operating on link 3, while non-AP MLD2 is operating on links 1 and 2. STA5 1512 may initiate an ARP query by generating and transmitting, to AP MLD 1502 in 2.4 GHz frequency band (Link 3), a first data frame 1532 carrying a broadcast address in its DA field 1535 and an address resolution request (ARP Request) 1534. A broadcast address in the DA field 1535 indicates that the first data frame 1532 is being broadcasted to all associated STAs and non-AP MLDs. The ARP request 1534 carries the IP address of non-AP MLD2 1522 in the Target IP field 1539 indicating that STA5 1512 is trying to resolve the IP address to obtain the corresponding MAC address of non-AP MLD2 1522.

Next, AP3 1508 of AP MLD 1502, which receives the first data frame 1532 in the 2.4 GHz link, may forward the first data frame 1532' carrying the ARP Request 1534' to all associated STAs and/or non-AP MLDs in the basic service set (BSS) including STA3 1524, STA4 1526 and STA5 1512 in all three links (2.4, 5 and 6 GHz links). The SA field 1535' carries the MAC address of STA5 1512 indicating that the original sender of the first data frame 1534' is STA5 1512.

Since the target IP address carried in the Target IP field 1539' of the ARP Request 1534' matches the IP addresses (STA-MLD2-IP) of non-AP MLD2 1522, non-AP MLD2 1522 may receive two ARP Requests 1534' via both STA3 1524 and STA4 1526. Both STA3 1524 and STA4 1524 may identify the ARP Requests 1534' are originated from STA5 1512 based on the SA field 1535', and determine that the requesting device STA5 1512 is a non-MLD due to a lack of "ML indication" in the first data frame 1532'. On this basis, the ARP Request 1534' is forwarded to the STA3's and STA4 MAC SAPs.

Non-AP MLD2 1522 may generate second data frames 1542 carrying an address resolution response (ARP Reply) 1544 via their respective STA MAC SAPs, and transmit the data frames 1542 to AP1 1504 and AP2 1506 via the 5 GHz frequency band (Link 1) and 6 GHz frequency band (Link 2) respectively. The two ARP Replies 1544 carried in the data frames 1542 generated by STA3 1524 and STA4 1526 carry respective MAC addresses (STA3-M/STA4-M) in the Source Hardware field 1546 and the STA5's MAC address in the Target Hardware field 1548 and the STA5's IP address in the Target IP field 1549 indicating STA5 1512 is the target recipient of the ARP Replies 1544.

AP MLD 1502, which receives both of the second data frames 1542, identifies that the ARP Replies 1544 carried in the second data frames 1542 are directed to STA5 1512 based on the MAC address (STA5-M) in the Target Hardware field 1548, and forwards the second data frames 1552' carrying the ARP Reply 1544' to STA5 1512, through AP3 1508 operating on the STA5's operating link (Link 3). It is noted that the SA field 1545' of the second data frames 1542' is set to STA3's and STA4's MAC address to identify the original transmitting STAs of the second data frame 1542 is STA3 1524 and STA4 1524 respectively.

STA5 1512, which receives the ARP replies 1544' carried in the two second data frames 1542, may process them and update its ARP cache twice to map the non-AP MLD's IP address (STA-MLD2-IP) in the Source IP fields 1547' to both MAC addresses (STA3-M/STA4-M) in the Source Hardware fields 1546' of the ARP Replies 1544'. However, the MAC address that is updated later (e.g. STA4-M) will remain in the ARP cache as non-AP MLD2's MAC Address.

Subsequently, STA4 1526 of non-AP MLD2 1522 may initiate a TDLS Discovery by transmitting a subsequent data frame 1552 carrying a TDLS Discovery Request 1554 to STA5 1512. STA4 1526 is used as TDLS Initiator. The TDLS Discovery Request 1554 comprises a TDLS Initiator field set to the STA4's MAC address and a TDLS Responder field 1559 set to the MAC address of STA5 1512.

AP MLD 1502, which receives the subsequent data frame 1522, identifies that the TDLS Discovery Request 1554 carried in the data frame 1554 is directed to STA5 1512 based on STA5's MAC address (STA5-M) in TDLS Responder field 1559, and forwards the Data frame 1552' received from non-AP MLD2 1522 carrying STA4's MAC address (STA4-M) in the SA field 1555' and the TDLS Discovery Request 1554' to STA5 1512 via the STA5's operating link. AP MLD 1502 is able to translate the STA5's MAC address (STA5-M) in the RA field 1553' when forwarding the data frame 1552' to STA5 1512. As such, the data frame will be correctly received by STA5 1512.

STA5 1512, which receives the TDLS Discovery Request 1554', may transmit a TDLS Discovery Response Action frame 1562 on link 3. STA5 1512 sets the RA field 1563 of the TDLS Discovery Response Action frame 1562 to STA4's MAC address (STA4-M) based on the mapping stored in its ARP cache. However, since non-AP MLD2 does not have any affiliated STA that operates on link3, the frames transmitted from STA5 1512 to non-AP MLD2 1522 will fail even though the RA is correctly set.

Figure 16:
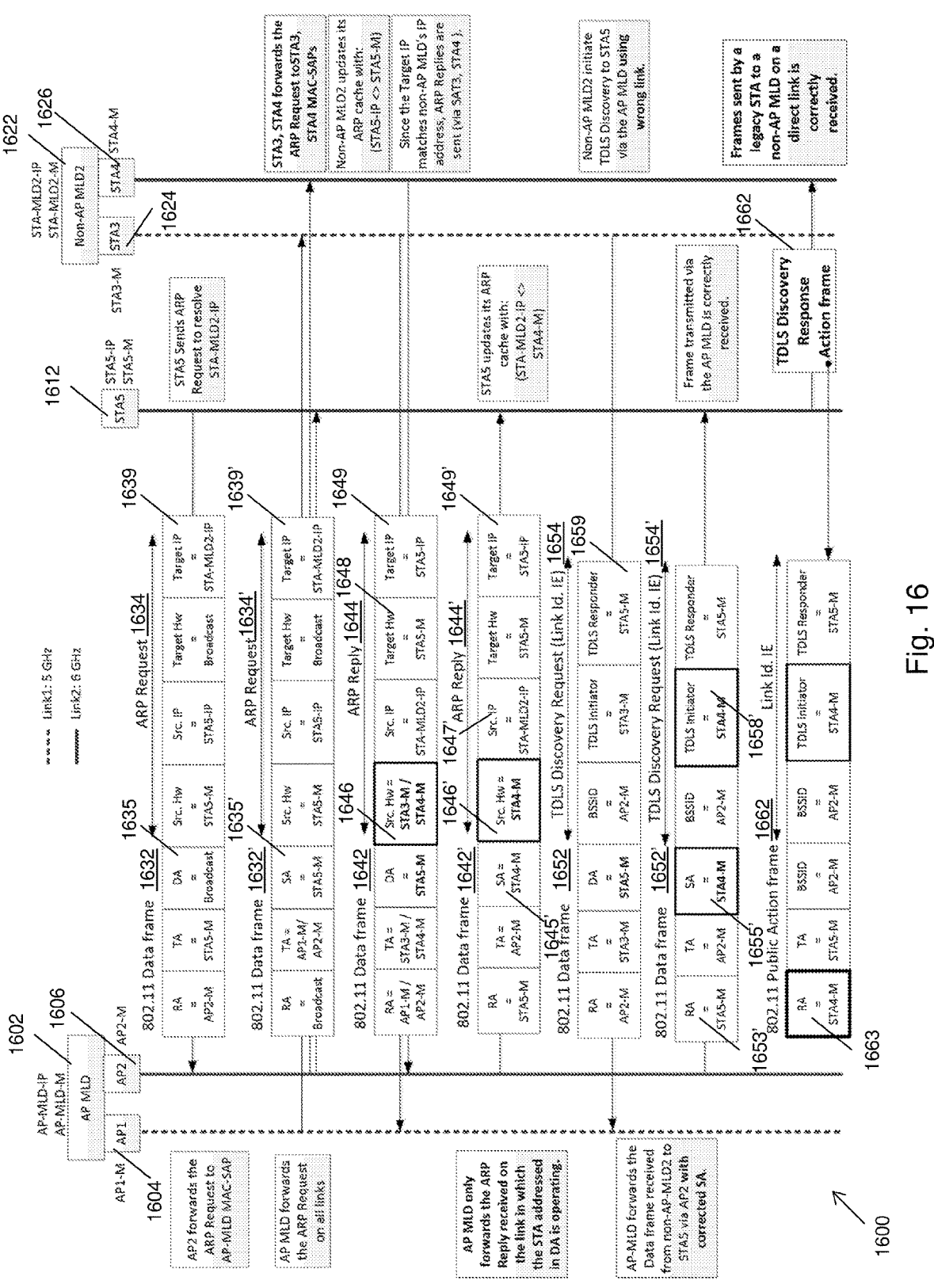

FIG. 16 shows a flow chart 1600 illustrating communication among an AP MLD 1602, a non-AP MLD 1622 and a non-MLD STA 1612 for multi-link address resolution according to a third example of the second embodiment of the present disclosure.

This third example is identical to the first example shown in FIG. 14 but considering the scenario where the AP MLD 1402 duplicates broadcast Data frames on all links (Link1 and Link2).

Even if the non-MLD operates on a link that is among the setup links of some of associated non-AP MLDs, due to presence of other legacy STAs or non-AP MLDs on other links, the AP MLD may have no choice but to forward any group addressed Data frames received from an associated non-MLD on all the setup links. This causes multiple ARP Requests and ARP responses to be generated. However, the AP MLD can assist legacy STA to maintain correct ARP Cache by only forwarding the ARP Replies that are received on the link in which the legacy STA (addressed in the DA field) is operating. It may also happen that a non-AP MLD initiates the TDLS Discovery/Setup Request frames on a wrong link with a legacy STA, not knowing which link it operates. In such case the AP MLD may also assist the legacy STA by forwarding the TDLS Discovery/Setup Request frames on the correct link and may even modify the SA and the TDLS Initiator fields to reflect the initiator non-AP MLD's correct STA (the one operating on the same link as the legacy STA, STA4 in this example). This however requires the AP MLD to inspect tunneled Data frames and modify the Data frame payload.

In this third example, a legacy STA (e.g. STA5 1612) resolving an IPv4 address of a non-AP MLD (e.g. non-AP MLD2 1622) with a common link (e.g. Link 2 or 6 GHz frequency band) is illustrated. STA5 1612 may initiate an ARP query by generating and transmitting, to AP MLD 1602 on the 6 GHz link (frequency band), a first data frame 1632 carrying a broadcast address in its DA field 1635 and an address resolution request (ARP Request) 1634. A broadcast address in the DA field 1635 indicates that the first data frame 1632 is being broadcasted to all associated STAs and non-AP MLDs. The ARP request 1634 carries the IP address of non-AP MLD2 1622 in the Target IP field 1639 indicating that STA5 1612 is trying to resolve the IP address to obtain the corresponding MAC address of non-AP MLD2 1622.

Next, AP2 1606 of AP MLD 1602, which receives the first data frame 1632 on the 6 GHz link, may forward the first data frame 1632' carrying the ARP Request 1634' to all associated STAs and/or non-AP MLDs in the basic service set (BSS) including STA3 1624, STA4 1626 and STA5 1612 in all links (5 and 6 GHz links). The SA field 1635' carries the MAC address of STA5 1612 indicating that the original sender of the first data frame 1634' is STA5 1612.

Since the target IP address carried in the Target IP field 1639' of the ARP Request 1634' matches the IP addresses (STA-MLD2-IP) of STA3 1624 and STA4 1626, non-AP MLD2 may receive two ARP Requests 1634' via both STA3 1624 and STA4 1626. Both STA3 1624 and STA4 1626 may identify the ARP Requests 1634' are originated from STA5 1612 based on the SA field 1635', and determine that the requesting device STA5 1612 is a non-MLD due to a lack of "ML indication" in the first data frame 1632'. On this basis, the ARP Request 1634' is forwarded to the STA3's and STA4 MAC SAPs.

STA3 1624 and STA4 1626 may generate a second data frame 1642 carrying an address resolution response (ARP Reply) 1644 using their respective STA MAC SAPs, and transmit the data frames 1642 to AP1 1604 and AP2 1606 via the 5 GHZ frequency band (Link 1) and 6 GHz frequency band (Link 2) respectively. The two ARP Replies 1644 carried in the data frames 1642 generated by STA3 1624 and STA4 1626 carry respective MAC addresses (STA3-M/ STA4-M) in the Source Hardware field 1646 and the STA5's MAC address in the Target Hardware field 1648 and the STA5's IP address in the Target IP field 1649 indicating STA5 1612 is the target recipient of the ARP Replies 1644.

AP MLD 1602, which receives both of the second data frames 1642, identifies that the ARP Replies 1644 carried in the second data frames 1642 are directed to STA5 1612 based on the MAC address (STA5-M) in the DA field. Noting that STA5 1612 operates on Link 2 (6 GHz frequency band), AP MLD 1602 only forwards the second data frame 1642' carrying the ARP Reply 1644' received on the STA5's operating link to STA5 1612 through AP2 1606 operating on that link and does not forward the second data frame 1642' carrying the ARP Reply 1644' received on the other link (link 1). It is noted that the SA field 1645' of the second data frames 1662' is set to STA4's MAC address to identify the original transmitting STA of the second data frame 1642 is STA4 1624.

STA5 1612, which receives the ARP reply 1644' carried in the second data frames 1642', may process the ARP reply and update its ARP cache to map the non-AP MLD's IP address (STA-MLD2-IP) in the Source IP fields 1647' to STA4-M in the Source Hardware fields 1646' of the ARP Reply 1644'.

Subsequently, non-AP MLD2 1622 may initiate a TDLS Discovery by transmitting a subsequent data frame 1652 carrying a TDLS Discovery Request 1654 to STA5 1612 through one of its affiliated STAs (in this case STA3 1624 through Link 1). The TDLS Discovery Request 1654 comprises a TDLS Initiator field set to the STA3's MAC address and a TDLS Responder field 1659 set to the MAC address of STA5 1612.

AP1 1604 of AP MLD 1602, which receives the subsequent data frame 1652 via Link 1, identifies that the TDLS Discovery Request 1654 carried in the data frame 1652 is directed to STA5 1612 based on STA5's MAC address (STA5-M) in TDLS Responder field 1659. Noting that STA5 1612 is operating on Link 2, AP1 1604 is able to correct the MAC address in the SA field 1655' and the TDLS Initiator field 1658' to relate to STA4 1606 (STA4-M) which operates in the same link as STA5 1612, and forward the Data frame 1652' received from non-AP MLD2 1622 carrying the corrected SA field 1655' and the TDLS Initiator field 1658' to STA5 1612 through AP2 1606 operating on the STA5's operating link. As such, despite non-AP MLD2 1622 transmitted the data frame 1642 in the wrong link, the data frame 1642 is correctly received by STA5 1612.

STA5 1612, which receives the TDLS Discovery Request 1654', may transmit a TDLS Discovery Response Action frame 1662 back to the source on a direct link. STA5 1612 is able to set the RA field 1663 of the TDLS Discovery Response Action frame 1662 to STA4's MAC address (STA4-M) based on the TDLS Initiator field 1658'. As a result, the TDLS Discovery Response Action frame 1662 transmitted to non-AP MLD 1622 on a direct link is correctly received by STA4 1626. As such, communications on the direct link are successful. All subsequent data frames transmitted by STA5 to non-AP MLD2 via the direct link will also be successful as the RA can be correctly set to STA4 based on STA5's ARP cache mapping STA-MLD2-IP to STA4-M.

Figure 17:
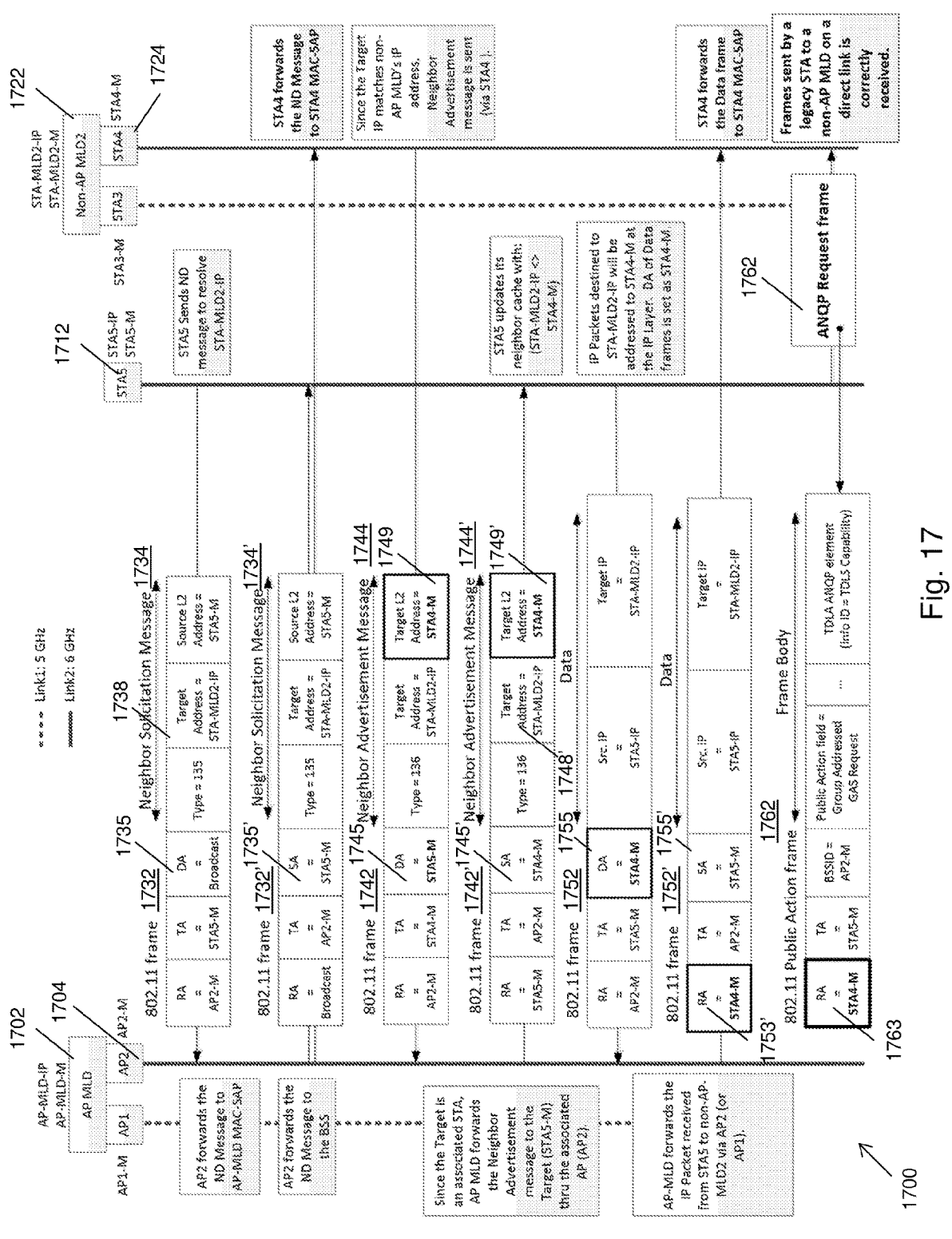

FIG. 17 shows a flow chart 1700 illustrating communication between a non-AP MLD 1722 and a non-MLD STA

1712 via AP MLD 1702 for multi-link address resolution according to a fourth example of the second embodiment of the present disclosure.

In this fourth example, a legacy STA (e.g. STA5 1712) resolving an IPv6 address of a non-AP MLD (e.g. non-AP MLD2 1722) with a common link (e.g. Link 2 or 6 GHz frequency band) is illustrated. This fourth example is similar to the first example except that STA5 1712 resolves an IPv6 address rather than IPv4 address. STA5 1712 may initiate an ND query by generating and transmitting, to AP MLD 1702 on the 6 GHz link (frequency band), a first data frame 1732 carrying a broadcast address in its DA field 1735 and a Neighbor Solicitation Message 1734. A broadcast address in the DA field 1735 indicates that the first data frame 1732 is being broadcasted to all associated APs and AP MLDs. The Neighbor Solicitation Message 1734 carries the IP address of non-AP MLD2 1722 in the Target Address field 1738 indicating that STA5 1712 is trying to resolve the IP address to obtain the corresponding MAC address of non-AP MLD2 1722.

Next, AP2 1704 of AP MLD 1702, which receives the first data frame 1732 on the 6 GHz link, may forward the first data frame 1732' carrying the Neighbor Solicitation Message 1734' to all associated STAs and/or non-AP MLDs in the basic service set (BSS) including STA5 1712 and non-AP MLD2 1722. The SA field 1735' carries the MAC address of STA5 1712 indicating that the original sender of the first data frame 1734' is STA5 1712. Since the target IP address carried in the Target Address field of the Neighbor Solicitation Message 1734' received by STA5 1712 and AP2 1704 does not match with their respective L2 and MLD MAC IP addresses, STA5 1712 and AP2 1704 ignore the Neighbor Solicitation Message 1734' or reject the Neighbor Solicitation Message 1734' as loop-back frame.

On the other hand, since the target IP address carried in the Target Address field 1738' of the Neighbor Solicitation Message 1734' received by STA4 1724 matches its non-AP MLD2's IP address (STA-MLD2-IP), STA4 1724 may identify the Neighbor Solicitation Message 1734' is originated from STA5 1712 based on the SA field 1735', and determine that the requesting device STA5 1712 is a non-MLD due to a lack of "ML indication" in the first data frame 1732'. On this basis, the Neighbor Solicitation Message 1734' is forwarded to the STA4 MAC SAP. Non-AP MLD2 1722 may also record Link 2 (6 GHz frequency band) as the STA5's operating link.

STA4 1724 may generate a second data frame 1742 carrying Neighbor Advertisement Message 1734 using its STA MAC SAP and transmit the data frame 1742 to AP2 1704 via the operating link. The Neighbor Advertisement Message 1744 carried in the data frame 1742 carries its STA4's MAC address (STA4-M) in the Target L2 Address field 1446.

AP MLD 1702, which receives the second data frame 1742, identifies that the Neighbor Advertisement Message 1744 carried in the second data frame 1742 is directed to STA5 based on the MAC address (STA5-M) in the DA field 1745, and forwards the second data frame 1742' carrying the Neighbor Advertisement Message 1744' to STA5 1712 through AP2 1704 operating on the STA5's operating link (Link 2). It is noted that the SA field 1745' of the second data frame 1742' is set to STA4's MAC address to identify the original transmitting STA of the second data frame 1742 is STA4 1724.

STA5 1712, which receives the second data frame 1742, may process it and update its ARP cache to map the non-AP MLD's IP address (STA-MLD2-IP) in the Target IP field

1748' to the STA4's MAC address (STA4-M) in the Target L2 Address field 1749' of the Neighbor Advertisement Message 1744'. As a result, the ND query is resolved.

Subsequently, STA5 1712 may transmit a subsequent data frame (IP Packet) 1752 to non-AP-MLD2 1722 through AP MLD 1702. The IP Packet destined to STA-MLD2-IP will be addressed to STA-4 at the IP layer with the DA field 1755 of the IP Packet 1752 set to the MAC address of STA4 1724 (STA-4-M) at the MLD level.

AP MLD 1702, which receives the IP Packet 1752, identifies that the IP Packet 1752 is directed to a STA affiliated with an associated non-AP MLD (in this case, STA4 of non-AP MLD2 1722 based on the DA field 1755), and forwards the IP Packet 1752' received from STA5 1712 non-AP MLD2 1722, through any one of the affiliated AP (in this case, AP2 1704 via the 6 GHz link). Noting that as non-AP MLD2 1722 is associated with AP MLD 1702, and thus the L2 MAC address of STA4 1724 is known to AP MLD 1702, AP MLD 1702 sets the STA4's MAC address (STA4-M) in the RA field 1753' when forwarding the IP Packet 1752' to STA4 1724. As such, IP Packet 1752' will be correctly received by STA4 1724.

STA4 1724 may identify the data frame 1752' is originated from STA5 1712 based on the SA field 1755', and determine that the requesting device STA5 1712 is a non-MLD due to a lack of "ML indication" in the data frame 1752'. On this basis, the data frame 1752' is forwarded to STA4 MAC SAP.

Subsequently, STA5 1712 may transmit an ANQP Request frame 1762 to STA4 1724 on a direct link, i.e. STA5's operating link (Link 2). STA5 1712 is able to set the RA field 1763 of the ANQP Request frame 1762 to STA4's MAC address (STA4-M) based on the mapping stored in its ARP cache. As such, the ANQP Request frame 1762 sent by STA5 1712 to STA4 1724 on a direct link is correctly received. This resolves the issue of frames transmitted on a direct link between a legacy STA and a non-AP MLD failing to be correctly received as illustrated in FIG. 9 in the first embodiment.

In the following paragraphs, a third embodiment of the present disclosure is explained with reference to multi-link address resolution in an AP MLD, a non-AP MLD and/or a non-MLD STA using a MLD address query mechanism.

As mentioned in the first embodiment, when a non-AP MLD resolves another non-AP MLD's IP address, a ANQP Request frame subsequently sent by the non-AP MLD to the other non-AP MLD on a direct link will fail since the RA is set to the MLD MAC address and not the STA's MAC address.

According to the third embodiment of the present disclosure, a MLD address query mechanism is proposed to perform MLD MAC address to L2 MAC address resolution to resolve the above issues:

A non-AP MLD or an EHT STA may initiate the MLD MAC Address Query to request a peer non-AP MLD to provide its L2 MAC addresses (STA MAC addresses) upon obtaining the MLD MAC Address of the peer non-AP MLD (e.g. through the ARP/ND procedure as depicted in FIG. 8) and prior to it initiating a frame exchange on a direct link with the peer non-AP MLD. The non-AP MLD can be made aware that a peer device is an MLD due to the presence of the "ML indication. The non-AP MLD may initiate the MLD MAC Address Query by transmitting a MLD Address Query Request frame to the other non-AP MLD related via an AP MLD (transparent or non-transparent). In particular, a MLD Address Query Request frame will be transparent to an AP MLD if a Data frame is used to carry the MLD Address Query, that is, the AP MLD may not be aware of the content of the frame exchange, it simply forwards the data frame based on the DA field. The MLD Address Query Request/Response is non-transparent if Management frames are used instead.

Figure 18:
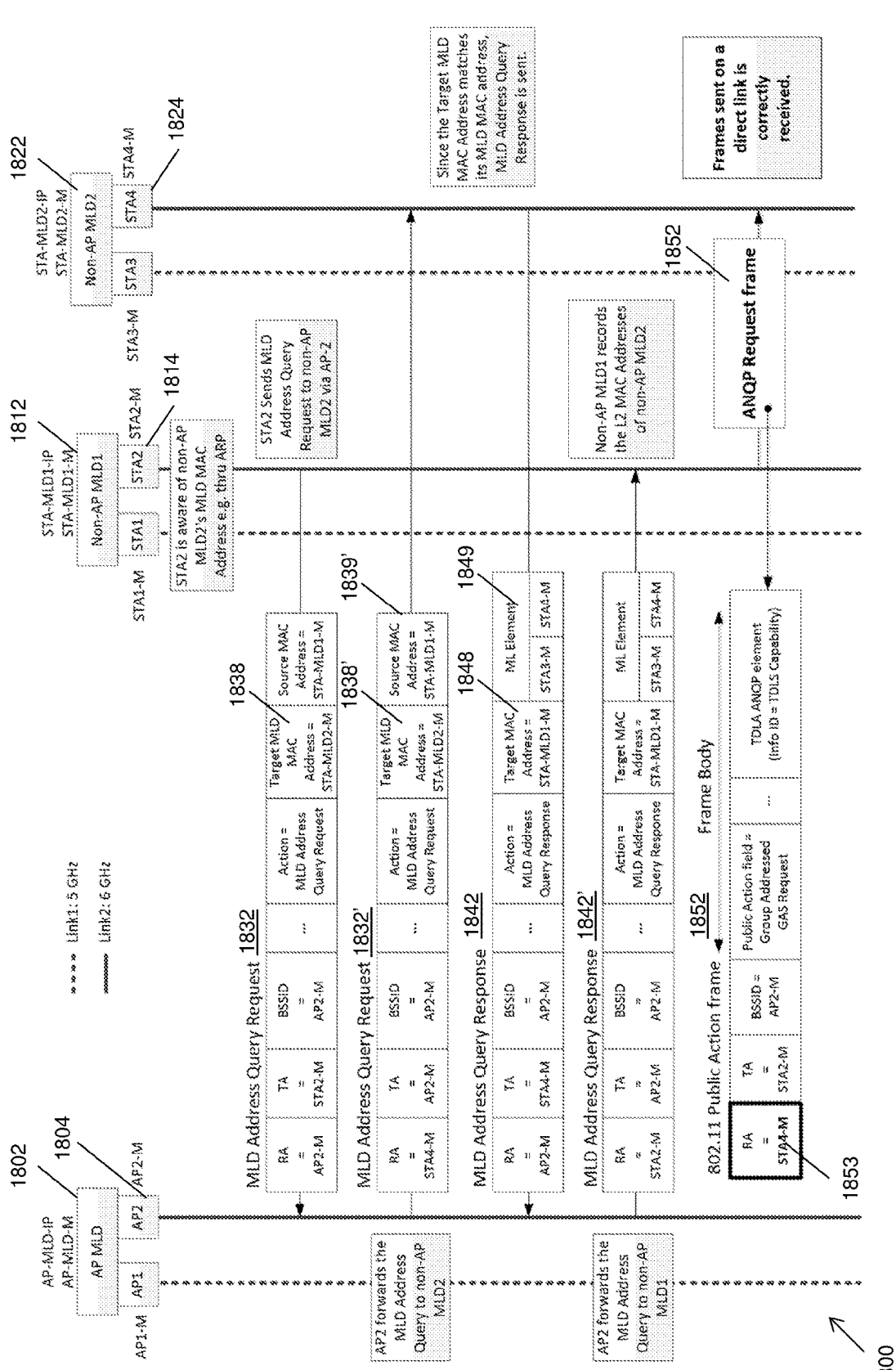
FIG. 18 shows a flow chart illustrating communications between two non-AP MLDs via an AP MLD for multi-link address resolution according to a third embodiment of the present disclosure.

FIG. 18 shows a flow chart 1800 illustrating communications among an AP MLD 1802 and two non-AP MLDs 1812, 1822 for multi-link address resolution using management frames according to a third embodiment of the present disclosure. In this example, STA2 1814 would like to initiate a direct link transmission with non-AP MLD2 1822 but is aware that the peer (non-AP MLD) is an MLD and non-AP MLD2's MAC address due to presence of ML indication in an ARP/ND query, but it is not aware of the STAs affiliated with non-AP MLD2 1822 and their STA MAC addresses. STA2 may send a MLD Address Query Request frame 1832 to non-AP MLD2 via AP2 1804 of AP MLD 1802 operating on Link 2. The MLD Address Query Request frame 1832 carries a Target MLD MAC Address field 1838 carrying the MAC address of non-AP MLD2 1822 indicating non-AP MLD2 1822 as the target recipient of the MLD Address Query Request frame 1832.

AP2 1804 of AP MLD 1802 which receives the MLD Address Query Request frame 1832 identifies that the MLD Address Query Request frame 1832 is directed to an associated non-AP MLD (in this case, non-AP MLD2 based on the MAC address (STA-MLD2-M) in the Target MLD MAC Address field 1838, and forwards the MLD Address Query Request frame 1832' to non-AP MLD2 1822 using AP2 1804.

Since the target IP address carried in the Target MAC Address field 1838' of the MLD Address Query Request frame 1832' received by STA4 1824 matches its non-AP MLD2's MAC address (STA-MLD2-M), non-AP MLD2 1822 may generate and transmit a MLD Address Query Response frame 1842 carrying an ML Element 1849 comprising L2 MAC Addresses and identifiers of the operating links of all STAs affiliated with the non-AP MLD2 1822 back to the source non-AP MLD1 1812 identified based on Source MAC Address field 1839' through AP2 1804.

AP2 1804 of AP MLD 1802 which receives the MLD Address Query Response 1842 identifies that the MLD Address Query Response 1842 is directed to an associated non-AP MLD (in this case, non-AP MLD2 based on the MAC address (STA-MLD1-M) in the Target MLD MAC Address field 1848, and forwards the MLD Address Query Response frame 1842' to non-AP MLD1 1812 using AP2 1804.

STA2 1814 of non-AP MLD1 1812 may receive and process the MLD Address Query Response frame 1842', and record the L2 MAC addresses and operating links of all STAs affiliated with non-AP MLD2 1822, for example, in an MLD address cache. Subsequently, STA2 1814 may transmit an ANQP Request frame 1852 to STA4 1824 on a direct link (Link 2). STA2 1814 is able to set the RA field 1853 of the ANQP Request frame 1852 to STA4's L2 MAC address (STA4-M) based on the recorded L2 MAC addresses received in MLD Address Query Response frame 1842. As such, the ANQP Request frame 1852 sent by STA2 1814 to STA4 1824 on a direct link is correctly received.

Figure 19:
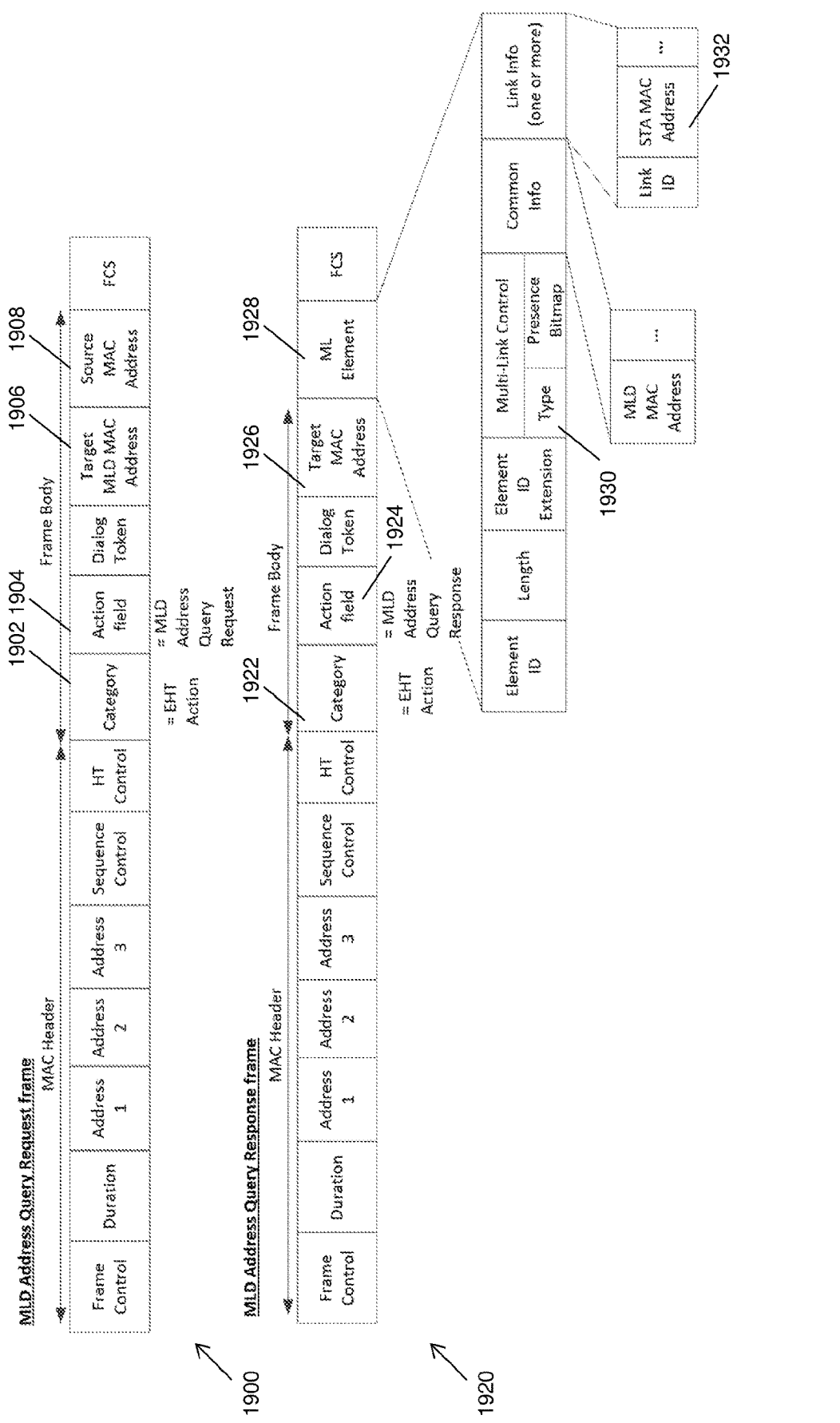
FIG. 19 shows an example format of a MLD address query request frame and a MLD address query response frame according to the third embodiment of the present disclosure.

FIG. 19 shows an example format of a MLD Address Query Request frame 1900 and a MLD Address Query Response frame 1920 according to the third embodiment of the present disclosure. A MLD Address Query Request frame 1900 comprises a Frame Control field, a Duration field, an Address 1 field, an Address 2 field, an Address 3 field, a Sequence Control field, a HT field, a Category field

1902 and an Action field 1904, a Dialog Token field, a Target MLD MAC Address field 1906 and a Source MAC Address field 1908 and a FCS. The Frame Control field, the Duration field, the Address 1 field, the Address 2 field, the Address 3 field, the Sequence Control, and the HT Control field may be grouped as MAC header; and the Category field 1902 and the Action field 1904, the Dialog Token field, the Target MLD MAC Address field 1906 and the Source MAC Address field 1908 may be grouped as Frame Body. The Category field 1902 is set to correspond to an EHT Action and the Action field 1904 is set to correspond to a MLD Address Query Request. The Target MLD MAC Address field 1906 is set to the MLD MAC address to be resolved and the Source MAC Address field 1908 is set to the transmitting STA's MAC address or transmitting MLD's MLD MAC address.

A MLD Address Query Response frame 1920 comprises a Frame Control field, a Duration field, an Address 1 field, an Address 2 field, an Address 3 field, a Sequence Control field, a HT field, a Category field 1922 and an Action field 1924, a Dialog Token field, a Target MAC Address field 1926 and a ML Element 1928 and a FCS. The Frame Control field, the Duration field, the Address 1 field, the Address 2 field, the Address 3 field, the Sequence Control, and the HT Control field may be grouped as MAC header; and the Category field 1922 and the Action field 1924, the Dialog Token field, the Target MAC Address field 1926 and the ML Element 1928 may be grouped as Frame Body. The Category field 1922 is set to correspond to an EHT Action and the Action field 1904 is set to correspond to a MLD Address Query Response. The Target MAC Address field 1926 is set to the MAC Address of the Source MAC Address 1908 in the MLD Address Query Request 1900.

The ML Element 1928 further comprises an Element ID field, a Length field, an Element ID Extension field, a Multi-link Control field comprising a Type subfield 1930 and a Presence Bitmap subfield, a Common Info field comprising one or more MLD MAC Address subfields and one or more Link Info fields each comprising an Link ID subfield and one or more STA MAC Address subfields. The Type subfields 1926 of the Multi-Link Control field is set to correspond to a MLD Address Query type and the one or more STA MAC Address subfields carried in each Link Info field (e.g. STA MAC Address field 1932) is set to a STA MAC address of the target MLD, while the Link ID fields carry the identifiers of the links in which the STA operates.

Figure 20:
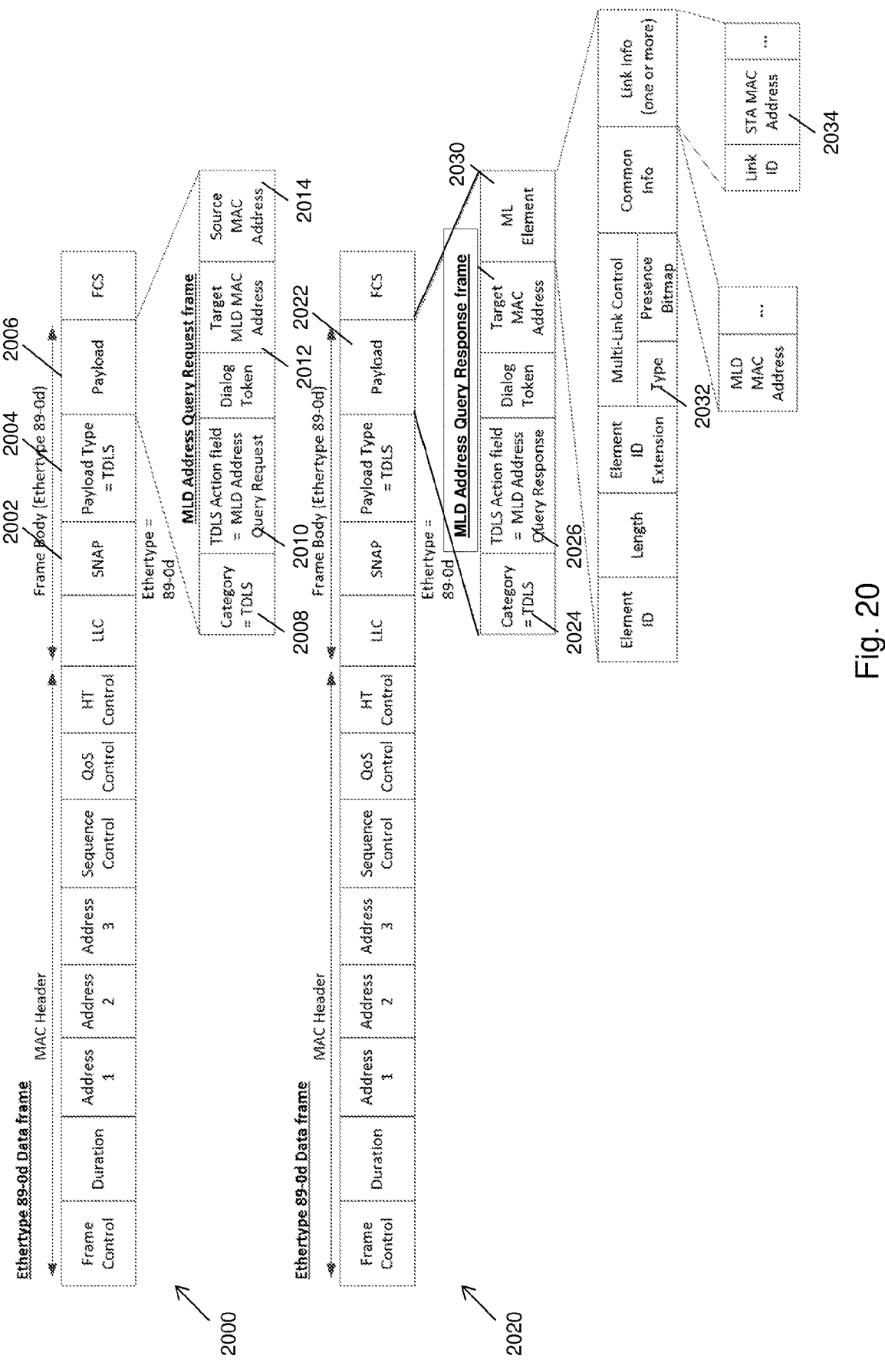
FIG. 20 shows example formats of Ethertype 89-Od data frames that are used to carry MLD address query frames according to the third embodiment of the present disclosure.

Alternatively, encapsulated data frames (e.g. Ethertype 89-Od Data frame carrying TDLS payload) may be used as MLD Address Query Request and Response frames. FIG. 20 shows example formats of Ethertype 89-Od data frames 2000, 2020 according to the third embodiment of the present disclosure.

The Ethertype 89-Od data frame comprises a Frame Control field, a Duration field, an Address 1 field, an Address 2 field, an Address 3 field, a Sequence Control field, a HT field, a Logical Link Control (LLC) field, a Subnetwork Access Protocol (SNAP) field 2002, a Payload Type field 2004, a Payload field 2006 and a FCS. The Frame Control field, the Duration field, the Address 1 field, the Address 2 field, the Address 3 field, the Sequence Control, and the HT Control field may be grouped as MAC header; and the LLC field, the SNAP field, the Payload Type field and the Payload field may be grouped as Frame Body. The SNAP field 2002 is set to an Ethertype of 89-0d, and the Payload Type field 2004 is set to correspond to a TDLS. The Payload field 2006 comprises a Category field 2008, a TDLS Action field 2010, a Dialog Token field, a Target MLD MAC Address field 2012 and a Source MAC Address field 2014. The Category field 2008 is set to correspond to a TDLS. The TDLS Action field 2010 is set to correspond to a MLD Address Query Request. The Target MLD MAC Address field 2012 is set to the MLD MAC address to be resolved and the Source MAC Address field 2014 is set to the transmitting STA's MAC address or transmitting MLD's MLD MAC address.

As an alternative of the MLD Address Query Request frame 1900, the Ethertype 89-Od data frame 2000 comprises a Frame Control field, a Duration field, an Address 1 field, an Address 2 field, an Address 3 field, a Sequence Control field, a HT field, a Logical Link Control (LLC) field, a Subnetwork Access Protocol (SNAP) field 2002, a Payload Type field 2004, a Payload field 2006 and a FCS. The Frame Control field, the Duration field, the Address 1 field, the Address 2 field, the Address 3 field, the Sequence Control, and the HT Control field may be grouped as MAC header; and the LLC field, the SNAP field, the Payload Type field and the Payload field may be grouped as Frame Body. The SNAP field 2002 is set to an Ethertype of 89-0d, and the Payload Type field 2004 is set to correspond to a TDLS. The Payload field 2006 comprises a Category field 2008, a TDLS Action field 2010, a Dialog Token field, a Target MLD MAC Address field 2012 and a Source MAC Address field 2014. The Category field 2008 is set to correspond to a TDLS. The TDLS Action field 2010 is set to correspond to a MLD Address Query Request. The Target MLD MAC Address field 2012 is set to the MLD MAC address to be resolved and the Source MAC Address field 2014 is set to the transmitting STA's MAC address or transmitting MLD's MLD MAC address.

As an alternative of the MLD Address Query Response frame 1920, the Ethertype 89-Od data frame 2020 may carry the same fields as those in the Ethertype 89-Od data frame used as a MLD Address Query Request frame except that the Payload field 2022 comprises a Category field 2024, a TDLS Action field 2026, a Dialog Token field, a Target MAC Address field 2028 and a ML Element 2030. The Category field 2024 is set to correspond to a TDLS. The TDLS Action field 2026 is set to correspond to a MLD Address Query Response. The Target MAC Address field 2028 is set to the MAC Address of the Source MAC Address 1908 of the MLD Address Query Request carried in the Ethertype 89-Od Data frame 2000. The ML Element 2030 may have the same setting as that of the ML Element field 1928 in MLD Address Query Response frame 1920 described above and shown in FIG. 19.

In the following paragraphs, a fourth embodiment of the present disclosure is explained with reference to multi-link address resolution in an AP MLD, a non-AP MLD and/or a non-MLD STA using an individual/group bit of their MAC addresses in address fields as a "ML indication" for multi-link address resolution.

Figure 21:
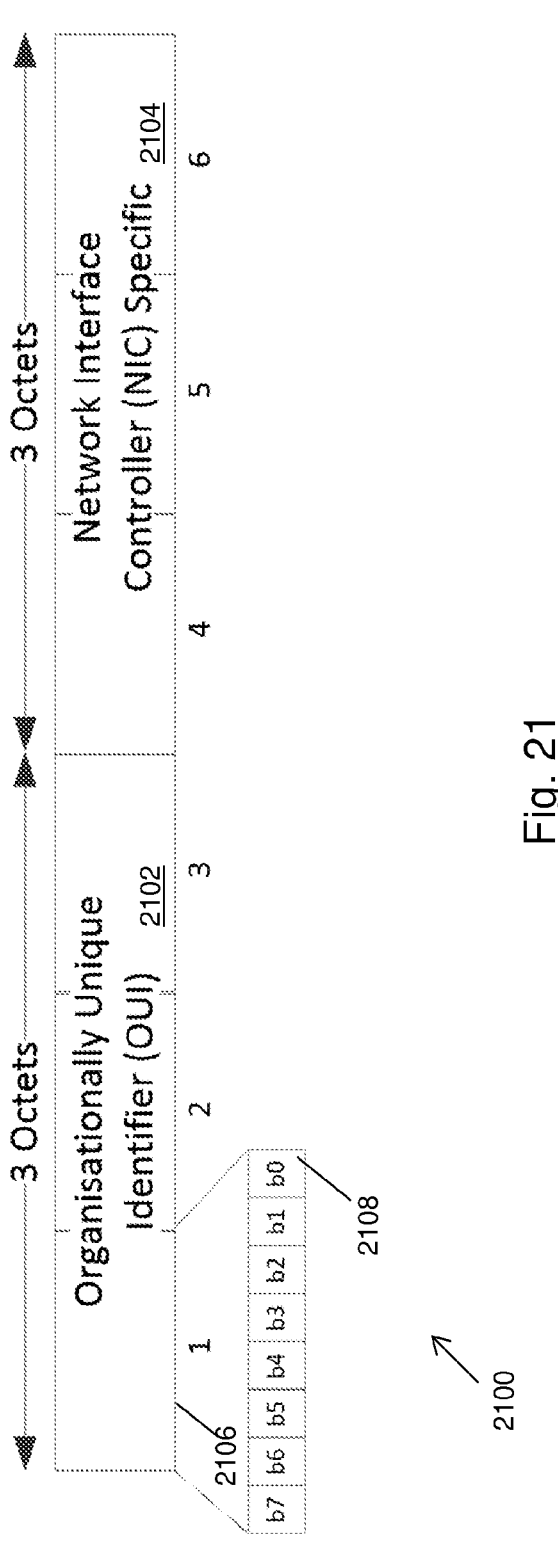
FIG. 21 shows an example architecture of a MAC address of a STA or an MLD according to a fourth embodiment of the present disclosure.

In the address fields that carry MAC address of a transmitting/originating STA in Data and Management frames, the Individual/Group bit (b0) of the MAC address is used as the "ML indication" to differentiate between the transmitting/originating STA's L2 MAC address and the MLD MAC address of the affiliated MLD. FIG. 21 shows an example architecture 2100 of a MAC address according to the fourth embodiment of the present disclosure. The MAC address contains six octets. The first three octets 2102 are Organizationally Unique Identifier (OUI), and the last three octets 2104 are the number specific to the device which is known as Network Interface Controller (NIC) specific. The first octet 2106 of the three OUI octets 2102 contains eight bits b0-b7 where b0 bit 2108, i.e. the least significant bit, is the Individual/Group bit. The Individual/Group (b0) bit 2108 can be set and used as a "ML indication". In particular, b0 bit is set to 0 to indicate L2 MAC address and 1 to indicate MLD MAC address. It is noted that b0 bit (Individual/Group bit) is also used to indicate "bandwidth signaling TA" in certain control frames, but it is not used in Data and Management frames and hence can be utilized as "ML indication".

A non-AP MLD, when transmitting frames to a peer device, shall set the b0 bit as 1 in the TA field of the frames transmitted to another non-AP MLD in the direct link; whereas an AP MLD, when relaying data frames transmitted by a non-AP MLD to another non-AP MLD, shall set the b0 bit as 1 in the SA field of the data frames. The b0 bit shall not be set as 1 in frame addressed to (pre-EHT) legacy STAs or non-MLD EHT STAs, noting that b0 bit is always set as 0 in Data/Management frames by pre-EHT STAs.

If the b0 bit of a frame received from a peer device is set to 1, the receiving MLD is informed that the transmitting/originating device is an MLD, else it is a legacy STA or a non-MLD EHT STA. The MLD needs to recover MLD MAC address by setting b0 bit to 0, and may then take further actions such as forwarding to the correct MAC SAP or attempt to resolve the peer MLD's L2 MAC address etc.

If the same MAC address is used as both the MLD MAC address and the L2 MAC address, it does not matter how b0 bit is set since in both cases the same MAC address is mapped to the IP address.

Additionally, a non-AP MLD, when transmitting frames to a peer device, may set the b0 bit as 1 in any address field that carries its MLD MAC address (including address fields carried in payload of Data frame), for example in the TDLS Initiator/TDLS Responder fields in TDLS discovery/setup frame. If b0 bit was not set by the transmitting non-AP MLD, an AP MLD associated with the transmitting non-AP MLD may help to set the b0 bit as 1 in the address field that carries the transmitting MLD's MLD MAC address in frames relayed by the AP to another non-AP MLD (including address fields carried in payload of Data frame), for example in the TDLS Initiator/TDLS Responder fields in TDLS discovery/setup frame.

Additionally, if the b0 bit of a frame received from a peer device is set to 1, the target application (TDLS) of the receiving MLD is informed that the transmitting/originating device is an MLD; else it is a legacy STA. The receiving MLD needs to recover the original MLD MAC address by setting b0 bit back to 0. The application may take further actions, for example performing a MLD Address Query to solicit the peer MLD's STA MAC Addresses if the originating device is an MLD.

According to the present disclosure, ARP/ND protocols of an MLD are "enhanced" to be MLD aware. Advantageously, MLD aware ARP/ND protocol allows adaptive hardware resolution to work correctly even if a single MLD MAC SAP is used for legacy STA. In particular, ARP/ND protocols set b0 bit as 1 in the source hardware address field in the transmitted ARP/ND messages. The hardware MAC address returned by the ARP/ND protocol depends on the requesting device. If the requesting device is an MLD (e.g. known through the b0 bit in the source hardware address set to 1 in the request frame), ARP/ND returns the MLD's MLD MAC address as its hardware MAC address. IF the requesting device is not an MLD (e.g. known through the b0 bit in the source hardware address set to 0 in the request frame), ARP/ND returns the MAC address of the affiliated STA of the MLD operating on the link in which the request frame was received as its hardware MAC address where the MAC address of the affiliated STA of the MLD may be provided by the MLD to the ARP/ND protocol along with the ARP/ND message.

Additionally, if the b0 bit is set to 1 in the resolved hardware address, the ARP/ND is informed that the peer device is an MLE, else it is a legacy STA. The MLD needs to recover the original MLD MAC address by setting b0 bit back to 0. However, the "enhanced" version of ARP/ND protocols may only be used when all systems use the modified ARP/ND protocols since legacy ARP/ND do not understand that b0 is used as ML Indication and may record the incorrect MLD MAC Address.

Figure 22:
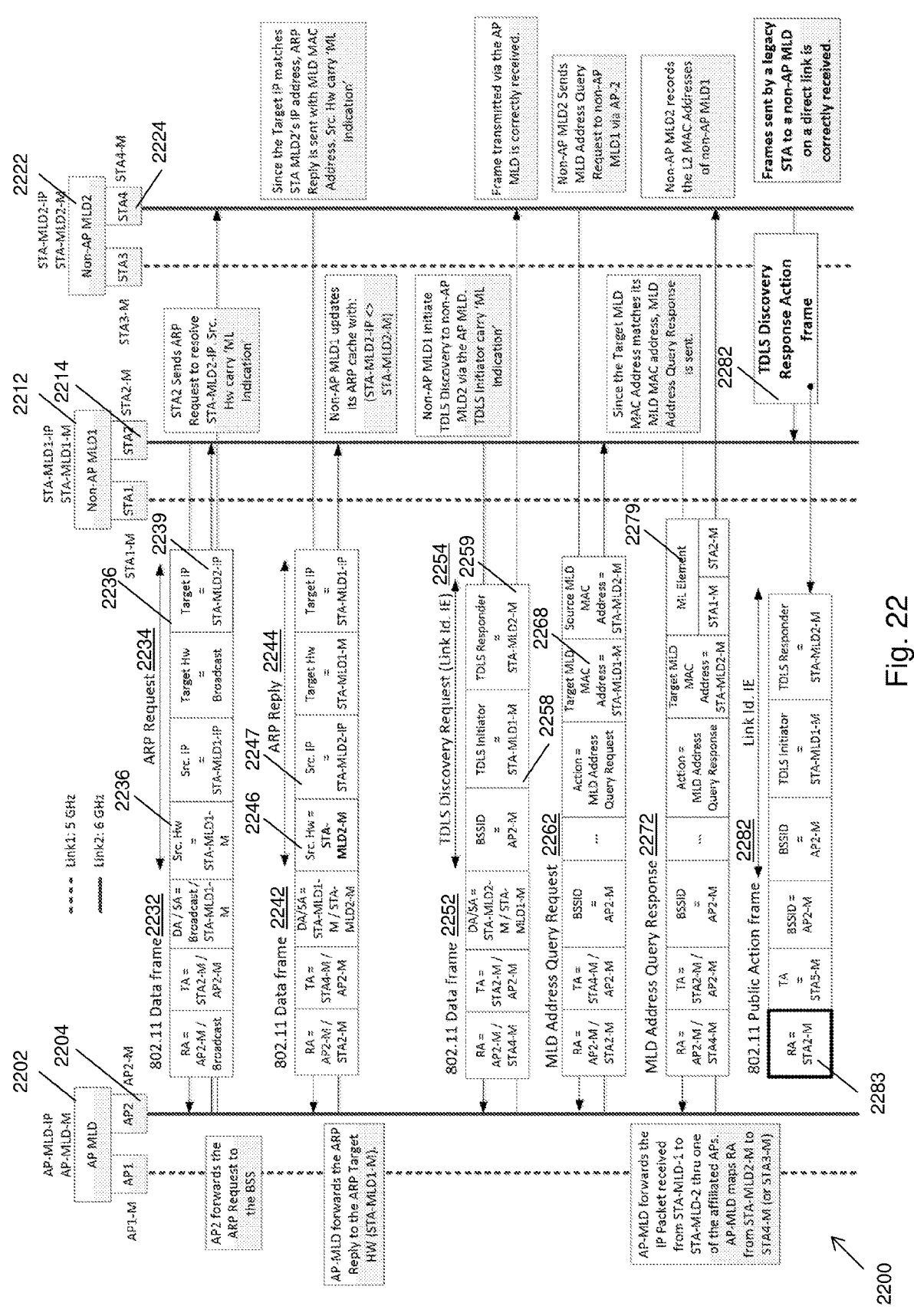
FIG. 22 shows a flow chart illustrating communications between two non-AP MLDs via an AP MLD for multi-link address resolution according to the fourth embodiment of the present disclosure.

FIG. 22 shows a flow chart 2200 illustrating communications among an AP MLD 2202 and two non-AP MLDs 2212, 2222 for multi-link address resolution according to the fourth embodiment of the present disclosure.

In this example, a non-AP MLD (e.g. non-AP MLD1 2212) resolving an IPv4 address of another non-AP MLD (e.g. non-AP MLD2 2222) is illustrated. STA2 2214 of non-AP MLD1 2212 may initiate an ARP query by generating and transmitting a first data frame 2232 carrying an ARP Request 2234 to non-AP MLD2 2222 through AP2 2204 of AP MLD 2202 on Link 2 (6 GHz frequency band). The ARP Request 2234 comprises a Source Hardware field 2236 carrying MAC address of non-AP MLD1 (STA-MLD1-M) with b0 bit set to 1 as "ML indication". When forwarding the Data frame 2232, the AP MLD may also set the b0 bit of the SA field to 1 to indicate that the originating device is an MLD. STA4 2224 of non-AP MLD2 2222 receives the first data frame 2232 on Link 2. Since the Target IP field 2239 of the first data frame 2232 matches the IP address of non-AP MLD2 2222, STA4 2224 generates a second data frame 2242 carrying an ARP Response 2244 and transmit the data frame 2242 back to non-AP MLD1 2212 through AP2 2204. Since the requesting device is known to be an MLD due to the presence of the "ML indication", the generated ARP Response 2242 comprises a Source Hardware field 2246 carrying the MLD MAC address of non-AP MLD2 (STA-MLD2-M). In addition, the b0 bit of the MLD MAC Address is set to 1 as "ML indication" indicating non-AP MLD2 2222 is an MLD.

STA2 2214, which receives the second data frame 2242, may process non-AP MLD2's MLD MAC address in the Source Hardware field 2246 of the ARP Reply 2242, for example recovering the original MLD MAC address by setting b0 bit back to 0, and update its ARP cache to map the non-AP MLD2's IP address (STA-MLD2-IP) in the Source IP field 2247 to the non-AP MLD2's MAC address (STA-MLD2-M). As a result, the ARP query is resolved.

Subsequently, non-AP MLD1 2212 may initiate a TDLS Discovery by transmitting a subsequent data frame 2252 carrying a TDLS Discovery Request 2254 to non-AP MLD2 2222 through one of its affiliated STAs (in this case from STA2 2214 to STA4 2224 through AP2 2204 on Link 2). The TDLS Discovery Request 2254 comprises a TDLS Initiator field 2258 set to the MAC address of non-AP MLD1 (STA-MLD1-M) with b0 bit set to 1 as "ML indication" and a TDLS Responder field 2259 set to the MAC address of non-AP MLD2 2222. When forwarding the Data frame 2252, the AP MLD may also set the b0 bit of the SA field to 1 to indicate that the originating device is an MLD. The frame 2252 transmitted via AP MLD is correctly received by non-AP MLD2 2222.

Notably, non-AP MLD2 2222 is aware that the peer device is an MLD due to the presence of the "NIL Indication" in the data frame carrying the TDLS Discovery Request 2254 but it does not know the STA MAC Addresses of non-AP MLD1 2212, and therefore, prior to sending a TDLS Discovery Response Action frame on a direct link in response to the TDLS Discovery Request 2254, non-AP MLD2 2222 transmits a MLD Address Query Request frame 2262 to non-AP MLD1 2212 via AP2 2204.

Since the target IP address carried in the Target MAC Address field 2268 of the MLD Address Query Request frame 2262 received by STA2 2214 matches its non-AP MLD1's MAC address (STA-MLD1-M), STA2 2214 may generate and transmit a MLD Address Query Response frame 2272 carrying an ML Element 2279 comprising L2 MAC Addresses of all STAs affiliated with non-AP MLD1 2212 (STA1-M and STA2-M) back to non-AP MLD2 2222.

STA4 2224 of non-AP MLD2 2222 may receive and process the MLD Address Query Response frame 2272, and record the L2 MAC addresses and operating links of non-AP MLD1 2212, for example, in its MLD Address cache. Subsequently, STA4 2224 may then transmit a TDLS Discovery Response Action frame 2282 to STA2 2214 on a direct link (Link 2). STA4 2224 is able to correctly set the RA field 2283 of the TDLS Discovery Response Action frame 2282 to the L2 MAC address of STA2 (STA2-M) based on the recorded L2 MAC addresses received in MLD Address Query Response frame 2272. As such, this leads to the TDLS Discovery Response Action frame 2282 sent by STA4 2224 to STA2 2214 on a direct link to be correctly received.

Figure 23:
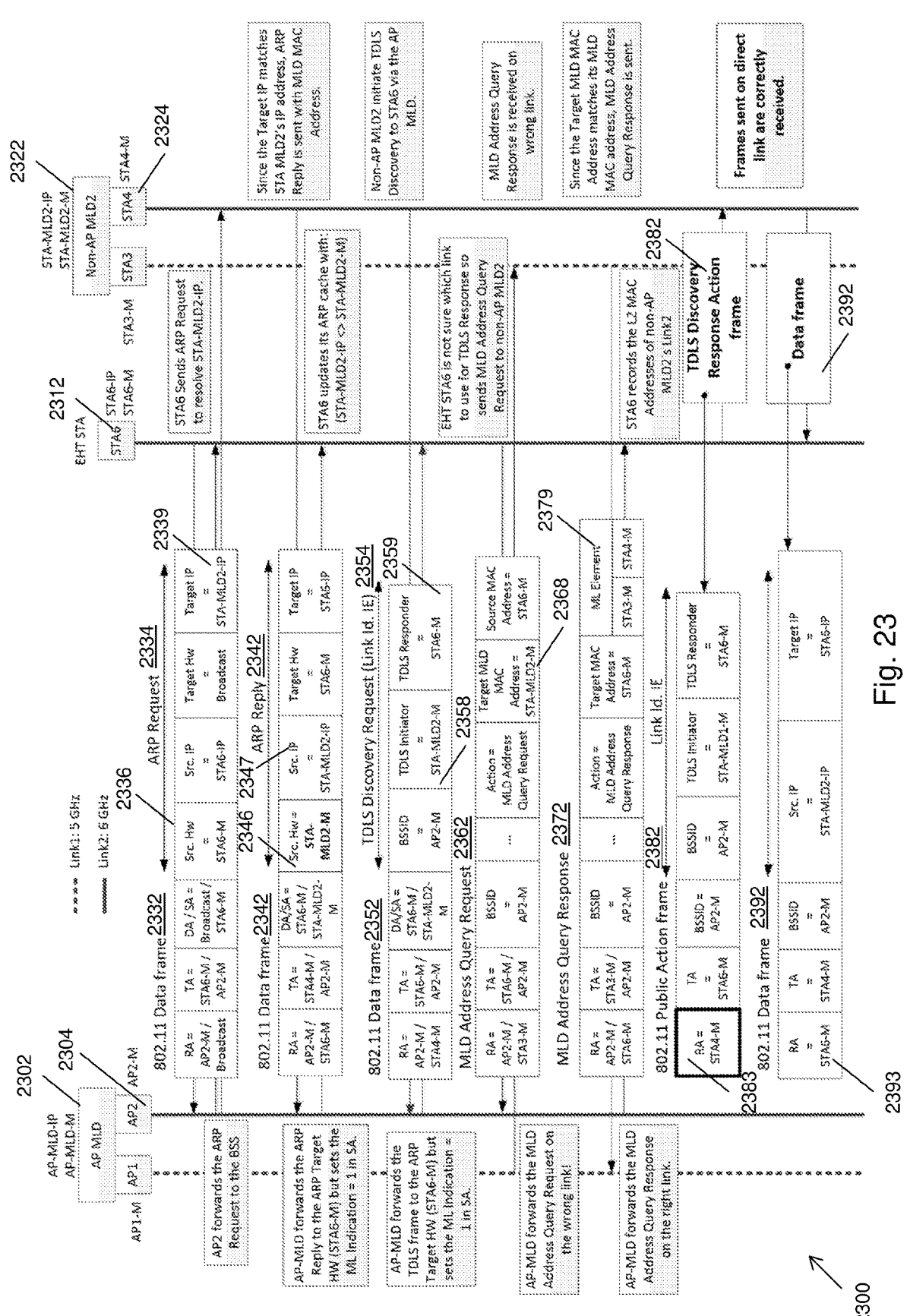
FIG. 23 shows a flow chart illustrating communications between a non-AP MLD and a non-MLD STA via an AP MLD for multi-link address resolution according to the fourth embodiment of the present disclosure.

FIG. 23 shows a flow chart illustrating communications among an AP MLD 2302, a non-AP MLD 2312 and a non-MLD STA 2322 for multi-link address resolution according to the fourth embodiment of the present disclosure.

In this example, an EHT non-MLD STA (e.g. STA5 2312) resolving an IPv4 address of a non-AP MLD (e.g. non-AP MLD2 2322) is illustrated. Also in this example, it is assumed that non-AP MLD2 2322 uses a single MLD MAC SAP for both MLD and non-MLD connections, i.e. it always returns MLD MAC address as its hardware address.

STA6 2312 may initiate an ARP query by generating and transmitting a first data frame 2332 carrying an ARP Request 2334 to non-AP MLD2 2332 through AP2 2304 of AP MLD 2302 on Link 2 (6 GHz frequency band). The ARP Request 2334 comprises a Source Hardware field 2336 carrying MAC address of STA6 (with b0 bit remained 0). STA4 2324 of non-AP MLD2 2322 receives the first data frame 2332 on Link 2. Since the Target IP field 2339 of the first data frame 2332 matches the IP address of non-AP MLD2 2322, STA4 2324 generates a second data frame 2342 carrying an ARP Response 2344 and transmit the data frame 2342 back to non-AP MLD1 2312 through AP2 2304. Similarly, the ARP Response 2342 comprises a Source Hardware field 2346 carrying MAC address of non-AP MLD2 (STA-MLD2-M).

STA6 2314, which receives the second data frame 2342, may process non-AP MLD2's MLD MAC address in the Source Hardware field 2346 of the ARP Reply 2342, and update its ARP cache to map the non-AP MLD2's IP address (STA-MLD2-IP) in the Source IP field 2347 to the non-AP MLD2's MAC address (STA-MLD2-M). As a result, the ARP query is resolved.

Subsequently, non-AP MLD2 2322 may initiate a TDLS Discovery by transmitting a subsequent data frame 2352 carrying a TDLS Discovery Request 2354 to STA6 2312 through one of its affiliated STAs (in this case from STA4 2324 to STA6 2312 through AP2 2304 on Link 2). The TDLS Discovery Request 2354 comprises a TDLS Initiator field 2358 set to the MAC address of non-AP MLD2 (STA-MLD2-M) with b0 bit set to 1 as "ML indication"

indicating that non-AP MLD2 2222 is an MLD and a TDLS Responder field 2359 set to the MAC address of STA5 2312. The frame 2352 transmitted via AP MLD is correctly received by STA5 2312.

Notably, STA6 2312 is aware that the peer device is an MLD due to the presence of the "ML Indication" in the data frame carrying the TDLS Discovery Request but it does not know the correct STA MAC Addresses of non-AP MLD2 2322, and therefore, prior to sending a TDLS Discovery Response Action frame in response to the TDLS Discovery Request 2352, STA5 2312 transmits a MLD Address Query Request frame 2351 to non-AP MLD2 2322 via AP2 2304.

Since the target IP address carried in the Target MAC Address field 2368 of the MLD Address Query Request frame 2362 received by STA4 2324 matches non-AP MLD1's MLD MAC address (STA-MLD2-M), STA4 2324 may generate and transmit a MLD Address Query Response frame 2372 carrying an ML Element 2379 comprising L2 MAC Addresses and identifiers of the operating links of all STAs affiliated with non-AP MLD2 2322 (STA3-M and STA4-M) back to STA5 2312.

STA5 2312 may receive and process the MLD Address Query Response frame 2372, and record the L2 MAC addresses and the operating links of non-AP MLD2 2322, for example, in its MLD address cache. Subsequently, STA5 2312 may then transmit a TDLS Discovery Response Action frame 2382 to STA4 2324 on a direct link (Link 2). STA5 2383 is able to set the RA field 2383 of the TDLS Discovery Response Action frame 2382 to the L2 MAC address of STA4 (STA4-M) based on the recorded L2 MAC addresses received in MLD Address Query Response frame 2372. As such, this leads to the TDLS Discovery Response Action frame 2382 sent by STA6 2312 to STA4 2324 on a direct link to be correctly received. Similarly, such TDLS setup may allow a further data frame 2392 from STA4 2324 of non-AP MLD2 2322 to STA6 2312 on a direct link.

This example is to highlight that an EHT STA (non-MLD), even though it operates on a single link, it can correctly operate on direct link with a non-AP MLD that does not make special consideration for single link devices (e.g. returning its MLD MAC Address instead of L2 MAC Address in response to ARP Requests from single link devices). It does so by the virtue of its ability to make use of EHT features such as ML Indication and MLD Address Query and getting little assistance from AP MLD (e.g. by setting the ML Indication in the SA fields of forwarded frames). Here, it is also illustrated that even though the MLD Address Query Request is forwarded on a wrong link by the AP MLD and subsequently the MLD Address response is sent by the non-AP MLD on a wrong link, the response frame is received by the EHT STA correctly and it can extract the right L2 (STA) MAC Address of the non-AP MLD based on the Link ID since the EHT STA is able to decode AP MLD's Beacon frames etc. and is able to figure out the link Ids assigned to different links.

In the following paragraphs, a fifth embodiment of the present disclosure is explained with reference to multi-link address resolution in an AP MLD with proxy ARP features, a non-AP MLD and/or a non-MLD STA.

When an AP MLD enables proxy ARP service, the AP MLD shall maintain a Hardware to Internet Address mapping for each associated station (non-AP MLDs and non-MLD STAs) and shall update the mapping when the Internet Address of the associated station changes. When the IPv4 address being resolved in an ARP request or ARP Probe, or the IPv6 being resolved in a Neighbor Solicitation message, is used by a non-AP STA current associated to the BSS, the proxy ARP service shall respond on behalf of the STA to the ARP request or the ARP probe or the Neighbor Solicitation message.

When the AP MLD receives an ARP request from a requesting associated station or from the DS with a target IP address that corresponds to an associated non-AP MLD, the AP MLD shall determine whether or not the requesting station is a non-AP MLD or not, and either (i) insert the non-AP MLD's MLD MAC address as the Sender's MAC address in the ARP response packet if the requesting station is a non-AP MLD or the request is from the DS, or (ii) insert the MAC address of the STA of the non-AP MLD that operates on the link in which the request was received as the Sender's MAC address in the ARP response packet if the requesting station is a non-MLD STA or not an MLD.

Similarly, when the AP MLD receives a Neighbor Solicitation message from a requesting associated station or from the DS with a target IP address that corresponds to an associated non-AP MLD, the AP MLD shall determine whether or not the requesting station is a non-AP MLD or not, and either (i) insert the non-AP MILD's MLD MAC address as the Sender's MAC address in the Neighbor Advertisement Message if the requesting station is a non-AP MLD or the request is from the DS, or (ii) insert the MAC address of the STA of the non-AP MLD that operates on the link in which the request was received as the Sender's MAC address in the Neighbor Advertisement Message if the requesting station is a non-MLD STA or not an MLD.

Further, the AP MLD also sets the least significant bit b0 (the Individual/Group bit) of the Sender MAC address to 1 to indicate an MLD MAC address in the ARP Response packet or the Neighbor Advertisement message sent on behalf of an associated MLD.

According to the fifth embodiment, when an AP MLD has its proxy ARP features enabled, the AP MLD may also respond to MLD Address Query Request on behalf of associated non-AP MLD or non-MLD STAs. When the MLD MAC address being resolved in an MLD Address Query Request is used by a non-AP MLD or a non-MLD STA currently associated with the AP MLD, the proxy ARP service may respond on behalf of the non-AP MLD or the non-MLD STA to the MLD Address Query Request.

In particular, when the AP MLD receivers an MLD Address Query Request frame from a requesting associated station with a target MLD MAC address corresponding to an associated non-AP MLD or non-MLD STA, the AP MLD shall construct an ML element carrying the STA MAC address and identifiers of the operating links of all affiliated STAs of the associated non-AP MLD and the corresponding link ID; and respond to the requesting associated station with an MLD Address Query Response frame carrying the ML element.

While it is natural that the MLD Address Query feature is packaged within the Proxy ARP service, since MLD Address Query is a new feature in EHT, AP MLD may enable this feature even if the Proxy ARP Service is not supported by the AP MLD i.e. the MLD Address Query feature may also be de-coupled from the Proxy ARP Service. In addition, an AP MLD implementing the Proxy ARP service may also implement transmissions of Gratuitous ARP/Unsolicited Neighbor Advertisements. A gratuitous ARP request is an ARP request packet where the source and destination IP are both set to the IP of the machine issuing the packet and the destination MAC is the broadcast address ff:ff:ff:ff:ff:ff. Ordinarily, no ARP reply packet will occur. A gratuitous ARP reply is a reply to which no request has been made. Similarly, unsolicited Neighbor Advertisements are messages that are sent without anyone asking for it i.e. without receiving the corresponding Neighbor Solicitation message. When enabled, an AP MLD may also send out gratuitous ARP packets or unsolicited Neighbor Advertisements carrying an associated non-AP MLD's MLD MAC address as the hardware address when the IP address or the MLD MAC Address of associated non-AP MLD changes. Typically, these are sent to the broadcast address or all-hosts multicast address (ff02::1). These may cause associated legacy STAs to incorrectly update their ARP caches with the MLD MAC Address (instead of STA MAC Address). To prevent this, the AP MLD shall follow the broadcasted Gratuitous ARP or the multicasted unsolicited Neighbor Advertisements with unicast Gratuitous ARP or unicast Unsolicited Neighbor Advertisement message carrying the correct STA MAC Address as the sender hardware address to each associated legacy STA. Alternatively, broadcast transmissions of Gratuitous ARP/Unsolicited Neighbor Advertisements are not implemented for EHT APs/AP MLDs.

Figure 24A:
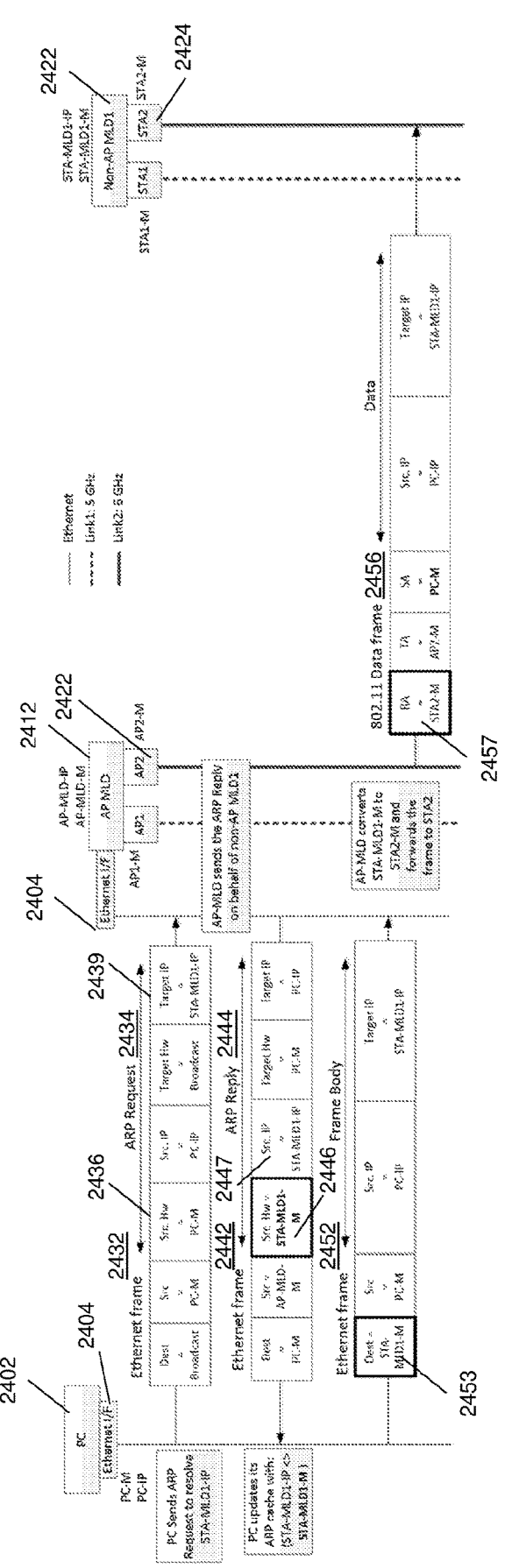
FIG. 24A shows a flow chart illustrating communications among a distribution system, an AP MLD and a non-AP MLD for multi-link address resolution according to a fifth embodiment of the present disclosure.

FIG. 24A shows a flow chart illustrating communications among a distribution system 2402, an AP MLD 2412 and a non-AP MLD 2422 for multi-link address resolution according to the fifth embodiment of the present disclosure.

In this example, an AP MLD 2412 resolving ARP Requests from DS (e.g. PC 2402) on behalf of an associated non-AP MLD (e.g. non-AP MLD1 2422) is illustrated. PC 2402 may initiate an ARP query to resolve the IP address of non-AP MLD1 2422 associated with AP MLD 2412 by generating and transmitting to AP MLD 2412 that is connected to PC 2402 via Ethernet interface (I/F) 2404 an Ethernet frame 2432 carrying an ARP Request 2434. The ARP Request 2434 comprises a Source Hardware field 2436 carrying PC's MAC address (PC-M) and a Target IP field 2439 carrying the IP address of non-AP MLD1 2422 (STA-MLD1-IP) indicating PC 2402 is trying to resolve the IP address of non-AP MLD1 2422.

Since the Target IP field 2439 of the first data frame 2432 matches the IP address of its associated non-AP MLD2 2422, AP MLD 2412 may generate a second data frame 2442 carrying an ARP Response 2444 and provide the MLD MAC address of non-AP MLD1 2422 (STA-MLD1-M) as its hardware address in the Source Hardware field 2446 of the ARP Response 2444, and transmit the second data frame 2442 back to PC 2402 through AP2 2422 via Ethernet I/F 2404.

PC 2402, which receives the second data frame 2442, may process non-AP MLD1's MLD MAC address carried in the Source Hardware field 2446 of the ARP Reply 2442, and update its ARP cache to map the non-AP MLD1's IP address (STA-MLD1-IP) in the Source IP field 2447 to the non-AP MLD1's MLD MAC address (STA-MLD1-M). As a result, the ARP query is resolved without exchanging data frames with non-AP MLD1 2422.

Subsequently, PC 2402 may wish to transmit data to non-AP MLD1 2422 via AP MLD 2412 by transmitting a subsequent Ethernet frame 2452 to AP MLD 2412. PC 2402 is able to set the Dest. (Destination) field of the Ethernet frame 2452 to non-AP MLD1's MLD MAC address based on the mapping stored in its ARP cache. AP MLD 2412, which receives the subsequent Ethernet frame 2452, may generate a corresponding data frame 2456, convert the non-AP MLD1's MLD MAC address and set the STA MAC address of one of the affiliated STAs of non-AP MLD1 2422 (in this case, MAC address (STA2-M) of STA2 2424) in the RA field 2457 of the data frame 2456, and forward the data frame 2456 to non-AP MLD1 2422. Since the RA field of the data frame 2456 matches that of STA2 2424, the data frame 2456 is correctly received by STA2 2424.

Figure 24B:
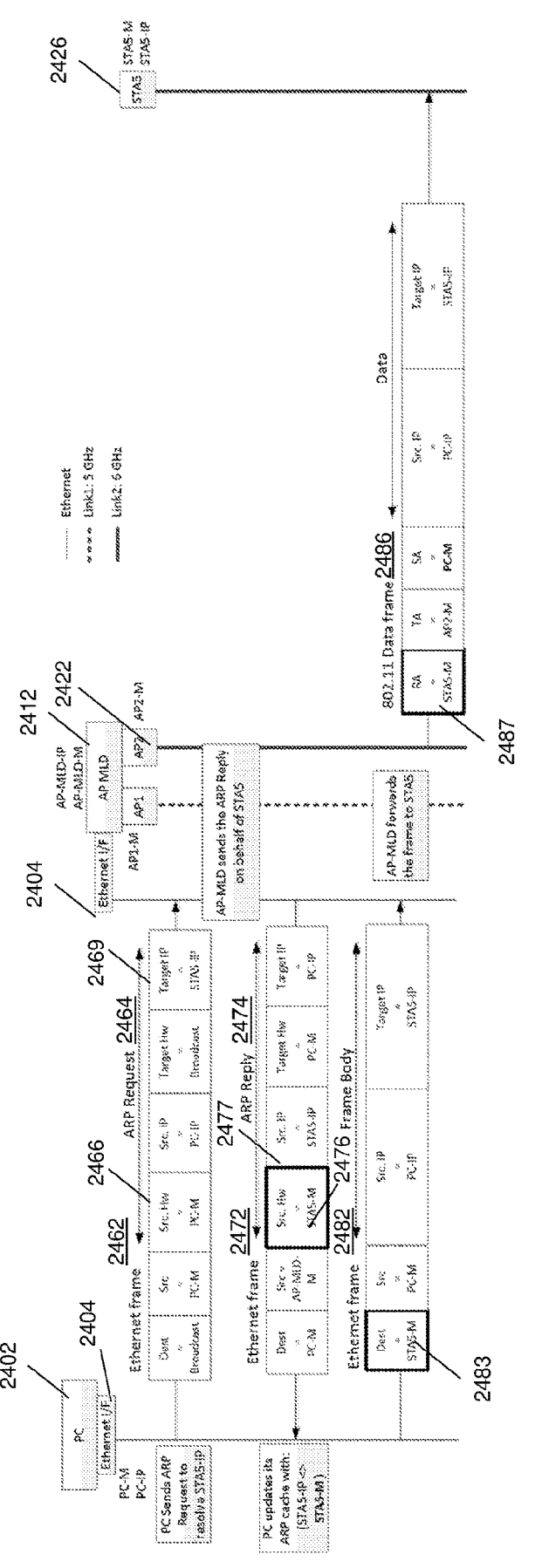
FIG. 24B shows a flow chart illustrating communications among a distribution system, an AP MLD and a non-MLD STA for multi-link address resolution according to a fifth embodiment of the present disclosure.

FIG. 24B shows a flow chart illustrating communications among a distribution system 2402, an AP MLD 2404 and a non-MLD STA 2426 for multi-link address resolution according to the fifth embodiment of the present disclosure.

In this example, an AP MLD 2412 resolving ARP Requests from DS (e.g. PC 2402) on behalf of an associated non-MLD STA (e.g. STA5 2426) is illustrated. PC 2402 may initiate an ARP query to resolve the IP address of non-AP MLD1 2422 associated with AP MLD 2412 by generating and transmitting to AP MLD 2412 that is connected to PC 2402 via Ethernet interface (I/F) 2404 an Ethernet frame 2462 carrying an ARP Request 2464. The ARP Request 2464 comprises a Source Hardware field 2466 carrying PC's MAC address (PC-M) and a Target IP field 2439 carrying the IP address of STA5 2426 (STA5-IP) indicating PC 2402 is trying to resolve the IP address of STA5 2426.

Since the Target IP field 2469 of the first data frame 2462 matches the IP address of its associated STA5 2426, AP MLD 2412 may generate a second data frame 2472 carrying an ARP Response 2474 and provide the MLD MAC address of STA5 2426 (STA5-M) as its hardware address in the Source Hardware field 2476 of the ARP Response 2474, and transmit the second data frame 2472 back to PC 2402 through AP2 2422 via Ethernet I/F 2404.

PC 2402, which receives the second data frame 2472, may process STA5's MAC address carried in the Source Hardware field 2476 of the ARP Reply 2472, and update its ARP cache to map the STA5's IP address (STA5-IP) in the Source IP field 2477 to the STA5's MAC address (STA5-M). As a result, the ARP query is resolved without exchanging data frames with STA5 2426.

Subsequently, PC 2402 may wish to transmit data to STA5 2426 via AP MLD 2412 by transmitting a subsequent Ethernet frame 2482 to AP MLD 2412. PC 2402 is able to set the Dest. field of the Ethernet frame 2482 to STA5's MAC address based on the mapping stored in its ARP cache. AP MLD 2412, which receives the subsequent Ethernet frame 2482, may generate a corresponding data frame 2486, set the STA5's MAC address in the RA field 2487 of the data frame 2486, and forward it to STA5. Since the RA field of the data frame 2486 matches that of STA5 2426, the data frame 2486 is correctly received by STA5 2426.

Figure 25:
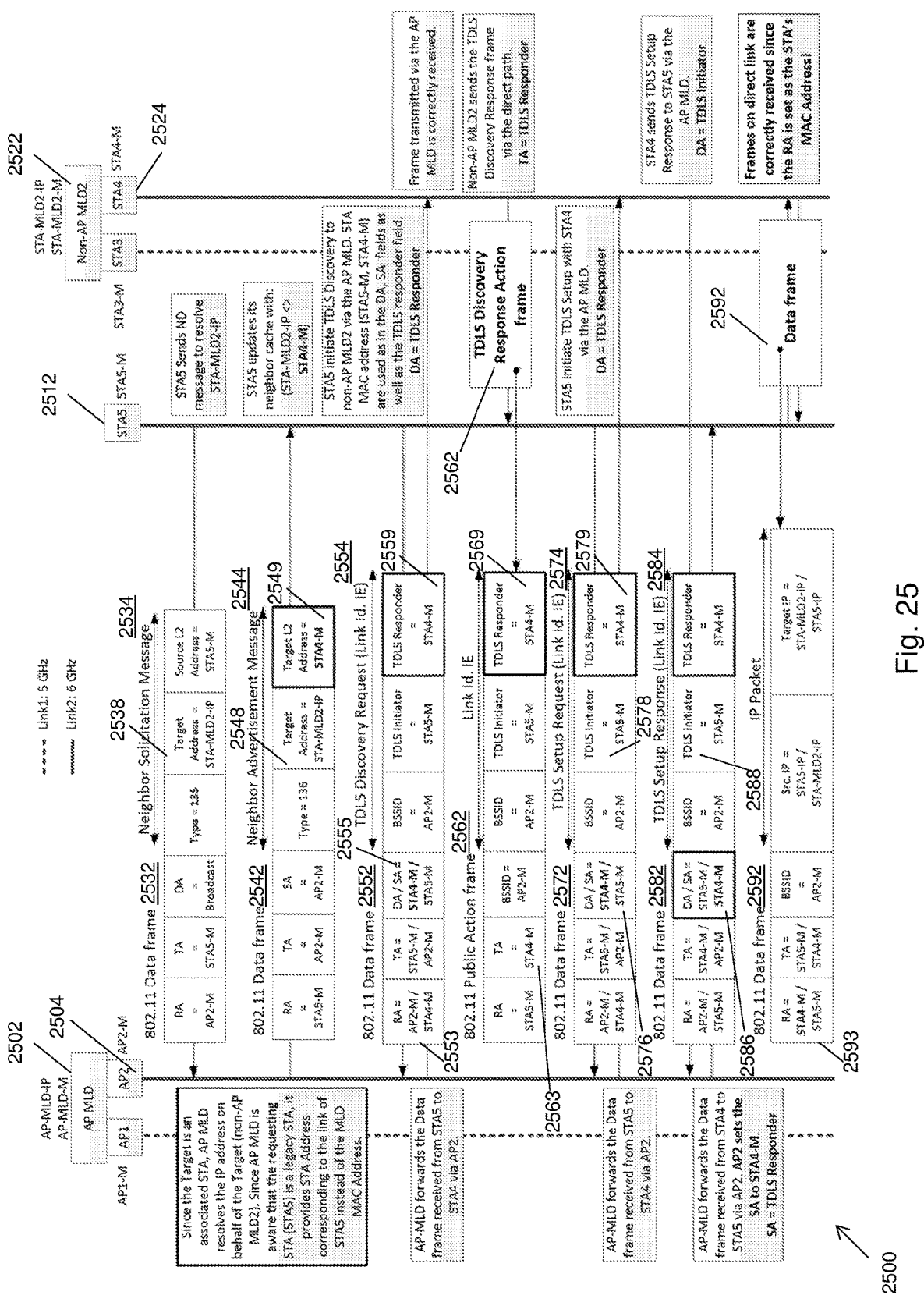
FIG. 25 shows a flow chart illustrating communications between a non-AP MLD and a non-MLD STA via an AP MLD for multi-link address resolution according to the fifth embodiment of the present disclosure.

FIG. 25 shows a flow chart 2500 illustrating communications among an AP MLD 2502, a non-AP MLD 2522 and a non-MLD STA 2512 for multi-link address resolution according to a first example of the fifth embodiment of the present disclosure.

In this first example, an AP MLD resolving a Neighbor Solicitation message from a non-MLD STA (e.g. STA5 2512) on behalf of a non-AP MLD (e.g. non-AP MLD2 2522) is illustrated.

STA5 2512 may initiate an ND query by generating and transmitting a first data frame 2532 carrying a Neighbor Solicitation Message 2534 to AP MLD 2502 on Link 2 (6 GHz frequency band). The Neighbor Solicitation Message 2534 carries the IP address of non-AP MLD2 2522 in the Target Address field 2568 indicating that STA5 2512 is trying to resolve the IP address to obtain the corresponding MAC address of non-AP MLD2 2522.

Next, AP2 2504 of AP MLD 2502, which receives the first data frame 2532 on the 6 GHz link, may identify that the requesting STA (i.e. STA5 2512) is a legacy STA based on Source L2 Address field of the Neighbor Solicitation Message 2534, and the target IP address carried in the Target Address field 2538 of the Neighbor Solicitation Message 2534 matches its associated non-AP MLD1 2522 IP's address. Therefore, AP2 2504 may generate a second data frame 2542 carrying a Neighbor Advertisement Message 2534, and provide the STA MAC address of non-AP MLD2 2522 (STA4-M) corresponding to the link of STA5 (i.e. Link 2) instead of the MLD MAC address as its hardware address in the Target L2 Address 2549 of the Neighbor Advertisement Message 2544, and transmit the second data frame 2542 back to STA5 2512 through AP2 2504 via STA5's operating link.

It is noted that since a non-AP MLD (e.g. non-AP MLD2 2522) contain multiple STA MAC Addresses, as long as there is a common link between the legacy STA (e.g. STA5 2512) requesting the address resolution and the target non-AP MLD, the AP MLD shall return the STA MAC Address of the non-AP MLD's affiliated STA that operates on the common link as the non-AP MLD's hardware address (Target L2 Address). This will ensure that the legacy STA and the non-AP MLD is able to communicate on the direct link (on the common link). However, if there are no common links between the legacy STA and the non-AP MLD, the AP MLD may return the non-AP MLD's MLD MAC Address or any MAC Address of affiliated STAs as the non-AP MLD's hardware address (Target L2 Address).

STA5 2512, which receives the second data frame 2542 sent by AP MLD 2502 on behalf of non-AP MLD2 2522, may process STA MAC address carried in the Target L2 Address 2549 of the Neighbor Advertisement Message 2544, and update its neighbor cache to map the non-AP MLD2's IP address (STA-MLD2-IP) in the Target Address field 2548 to the L2 MAC address (STA4-M) in the Target L2 Address field 2549. As a result, the ND query is resolved without exchanging data frames with non-AP MLD2 2522.

Subsequently, STA5 2512 may initiate a TDLS Discovery by transmitting a subsequent data frame 2552 carrying a TDLS Discovery Request 2554 to non-AP MLD2 2522 via AP MLD 2502. The STA MAC address (STA4-M) of non-AP MLD2 2522 stored in the neighbor cache is used in DA/SA fields 2555 of the data frame 2552 as well as TDLS Responder field 2559 of the TDLS Discovery Request 2554 (DA field=TDLS Responder field).

AP2 2504 of AP MLD 2502, may identify that the subsequent data frame 2552 is directed to STA4 2524 of its associated non-AP MLD2 2522 based on the STA MAC address and forward the data frame 2552 to STA4 2524. The AP MLD 2502 may set the RA field 2553 of the data frame 2552 before forwarding it to STA4 2524. As such, the data frame 2552 is correctly received by non-AP MLD2 2522 via AP MLD 2502.

Non-AP MLD 2522 may, in response, send a TDLS Discovery Response Action frame 2562 on a direct link (Link 2), where the TA field 2563 and the TDLS Responder field 2569 are set to its STA MAC address of the affiliated STA transmitting the TDLS Discovery Response Action frame 2562 (in this case, STA4 2524).

Further, since the TA field 2563 as well as the TDLS Responder field 2569 in the Link Identifier element of the TDLS Discovery Response frame 2562 relayed sent on the direct link are both set as the same STA MAC Address (STA4-M), there will be no confusion at the receiving legacy STA (STA5 2512). This effectively solves the second address mismatch issue when a legacy STA initiates TDLS Setup with a non-AP MLD without the need to change the RA/TA setting rules, or without using the MLD MAC Address in the TDLS Initiator or TDLS Responder fields.

In addition, here since the DA as well as the TDLS Responder fields are all set to the STA MAC Address (STA4-M) of the peer device, AP MLD 2502 can correctly identify the link (Link 2) to be used to forward the TDLS Discovery/Setup request frames to non-AP MLD2 2522 and hence the link cross over issue does not occur.

Subsequently, STA5 2512 may initiate TDLS Setup with STA4 2524 via AP MLD 2502 by transmitting a further data frame 2572 carrying a TDLS Setup Request 2574 to AP MLD 2502. The STA MAC address (STA4-M) of non-AP MLD2 2522 stored in the neighbor cache is used to set DA field 2576 of the data frame 2572 as well as TDLS Responder field 2579 of the TDLS Setup Request 2574 (DA=TDLS Responder).

AP2 2504 of AP MLD 2502, may identify that the further data frame 2572 is directed to STA4 2524 of its associated non-AP MLD2 2522 based on the STA MAC address and forward the further data frame 2572 to STA4 2524. The AP MLD 2502 may set the RA field 2553 of the data frame 2572 to the STA MAC address of non-AP MLD2 2522 (STA4-M) corresponding to the link of STA5 (i.e. Link 2) before forwarding it to STA4 2524. As such, the data frame 2572 is correctly received by non-AP MLD2 2522 via AP MLD 2502.

Non-AP MLD 2522 may, in response, send another data frame 2582 carrying a TDLS Setup Response 2584 on a direct link (Link 2), where the DA field 2586 and the TDLS Initiator field 2588 are set to the MAC address in the TDLS Initiator field 2578 of the TDLS Setup Request 2574. As such, TDLS between STA4 2524 and STA5 2512 is successfully set up and the non-MLD STA (STA5 2512) and the STA of non-AP MLD (STA4 2524 of non-AP MLD2 2522) may transmit and receive data frames 2592 to/from each other on a direct link since the RA field 2593 of the data frames 2592 can be set correctly as the STA MAC addresses (STA4-M and STA5-M) accordingly.

Figure 26:
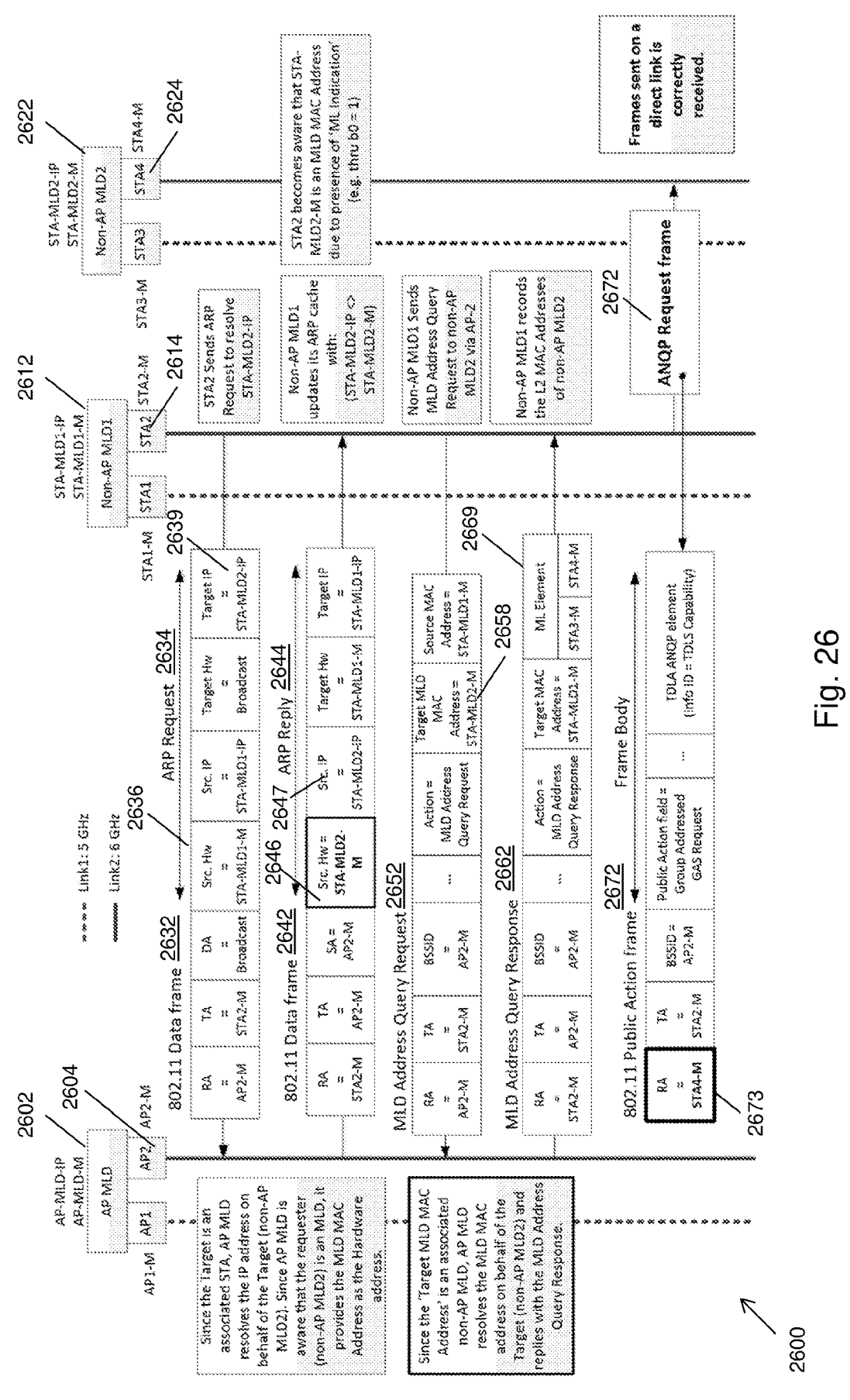
FIG. 26 shows a flow chart illustrating communications between two non-AP MLDs via an AP MLD for multi-link address resolution according to the fifth embodiment of the present disclosure.

FIG. 26 shows a flow chart 2600 illustrating communications among an AP MLD 2602 and two non-AP MLDs 2612, 2622 for multi-link address resolution according to a second example of the fifth embodiment of the present disclosure.

In this second example, an AP MLD 2602 resolving an ARP Request and a MLD Address Query Request from a non-AP MLD (e.g. non-AP MLD1 2612) on behalf of another non-AP MLD (e.g. non-AP MLD2 2622) is illustrated.

STA2 2614 of non-AP MLD1 2612 may initiate an ARP query by generating and transmitting a first data frame 2632 carrying an ARP Request 2634 to non-AP MLD2 2622 via AP MLD 2602 on Link 2 (6 GHz frequency band). The ARP Request 2634 comprises a Source Hardware field 2636 carrying MAC address of non-AP MLD1 (STA-MLD1-M) and a Target IP field 2639 carrying IP address of non-AP MLD2 (STA-MLD2-IP) indicating non-AP MLD1 2612 is trying to resolve the IP address to obtain the corresponding MAC address of non-AP MLD2 2622.

Next, AP2 2604 of AP MLD 2602, which receives the first data frame 2632 on the 6 GHz link, may identify that the requester (i.e. non-AP MLD1 2612) is a MLD based on the Source Hardware field 2636 of the ARP Request 2634, and the target IP address carried in the Target IP field 2639 of the ARP Request 2634 matches its associated non-AP MLD2's IP address. Therefore, AP MLD 2602 may generate a second data frame 2642 carrying an ARP Response 2644, and provide the MLD MAC address of non-AP MLD2 2622 (STA-MLD2-M) as its hardware address in the Source Hardware field 2646 of the ARP Response 2644, and further sets the b0 bit of the MLD MAC address to 1 for ML indication before transmitting the second data frame 2642 back to non-AP MLD1 2612.

Non-AP MLD1 2612, which receives the second data frame 2642, may process the ARP Reply 2642, and become aware that the MAC address carried in the Source Hardware field 2646 is a MLD MAC address due to presence of ML indication in b0 bit. The non-AP MLD1 2612 may then recover the original MLD MAC address by setting b0 bit back to 0 and update its ARP cache to map the non-AP MLD2's IP address (STA-MLD2-IP) in the Source IP field 2647 to the non-AP MLD2's MLD MAC address (STA-MLD2-M) in the Source Hardware field 2646. As a result, the ARP query is resolved and STA2 2614 is now aware that STA-MLD2-M is an MLD MAC address due to presence of ML indication in without exchanging data frames with non-AP MLD2 2622.

Since non-AP MLD1 2612 becomes aware that non-AP MLD2 2622 is a MLD based on ML indication in the b0 bit of its MLD MAC address, non-AP MLD1 2612 initiates MLD Address Query to obtain STA MAC Addresses of non-AP MLD2 2622 by transmitting a MLD Address Query Request frame 2652 to non-AP MLD2 2622 via AP2 2604 of AP MLD 2602.

AP MLD 2602 may identify from the Target MLD MAC Address field corresponds to an associated non-AP MLD (in this case, non-AP MLD2 2622), and resolve the MLD MAC Address on behalf of non-AP MLD2 2622 by generating a MLD Address Query Response carrying an ML Element 2669 comprising L2 MAC Addresses and the identifiers of the operating links of all STAs affiliated with non-AP MLD2 2622 (STA3-M and STA4-M) back to non-AP MLD1 2612.

STA2 2614 of non-AP MLD1 2614 may receive and process the MLD Address Query Response frame 2662, and record the L2 MAC addresses of all STAs affiliated with non-AP MLD2 2622, for example, in its MLD Address cache. Subsequently, STA2 2614 may transmit an ANQP Request frame 2672 to STA4 2624 on a direct link (Link 2). STA2 2614 is able to set the RA field 2673 of the ANQP Request frame 2672 to STA4's L2 MAC address (STA4-M) based on the recorded L2 MAC addresses received in MLD Address Query Response frame 2662. As such, the ANQP Request frame 2672 sent by STA2 2614 to STA4 2624 on a direct link is correctly received.

Figure 27:
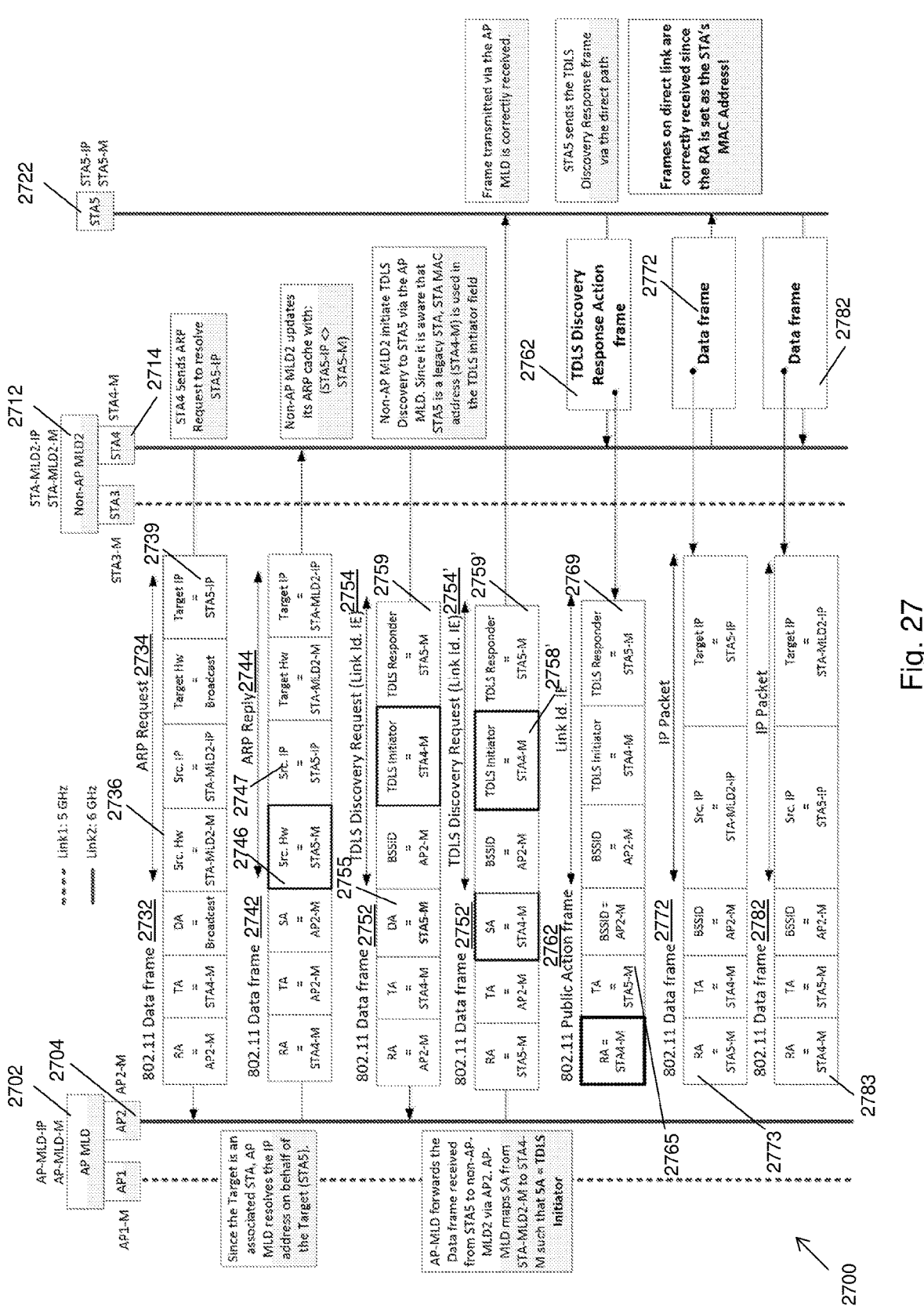
FIGS. 27-30 shows four flow charts illustrating communications between a non-AP MLD and a non-MLD STA via an AP MLD for multi-link address resolution according to the fifth embodiment of the present disclosure.

FIG. 27 shows a flow chart 2700 illustrating communications among an AP MLD 2702, a non-AP MLD 2712 and a non-MLD STA 2722 for multi-link resolution according to a third example of the fifth embodiment of the present disclosure.

In this third example, an AP MLD 2702 resolving an ARP Request from a non-AP MLD (e.g. non-AP MLD2 2712) on behalf of a legacy STA (e.g. STA5 2722) is illustrated.

STA4 2714 of non-AP MLD2 2712 may initiate an ARP query by generating and transmitting a first data frame 2732 carrying an ARP Request 2734 to STA5 2722 via AP MLD 2702 on Link 2 (6 GHz frequency band). The ARP Request 2734 comprises a Source Hardware field 2736 carrying MAC address of non-AP MLD2 (STA-MLD2-M) and a Target IP field 2739 carrying IP address of STA5 (STA5-IP) indicating non-AP MLD2 2712 is trying to resolve the IP address to obtain the corresponding MAC address of STA5 2722.

Next, AP2 2704 of AP MLD 2702, which receives the first data frame 2732 on the 6 GHz link, may identify that the requester (i.e. non-AP MLD2 2712) is a MLD based on the Source Hardware field 2736 of the ARP Request 2734, and the target IP address carried in the Target IP field 2739 of the ARP Request 2734 matches its associated STA5's IP address. Therefore, AP MLD 2702 may generate a second data frame 2742 carrying an ARP Response 2744, and provide the STA5's L2 MAC address (STA5-M) as its hardware address in the Source Hardware field 2746 of the ARP Response 2744 (b0 bit of the MAC address remained 0), and transmit the second data frame 2742 back to non-AP MLD2 2712.

Non-AP MLD2 2712, which receives the second data frame 2742, may process the ARP Reply 2744, and become aware that the MAC address carried in the Source Hardware field 2746 is a STA MAC address and not a MLD MAC address due to a lack of ML indication in b0 bit. The non-AP MLD1 2712 may update its ARP cache to map the STA5's IP address (STA5-IP) in the Source IP field 2747 to the STA5's L2 MAC address (STA5-M) in the Source Hardware field 2746. As a result, the ARP query is resolved and STA4 2714 is now aware that STA5 2722 is a non-MLD or a legacy STA without exchanging data frames with STA5 2722.

Advantageously, since STA5 2722 never receives the ARP Request 2732, it doesn't perform any opportunistic ARP cache update for non-AP MLD2 2712 and hence the address mismatch issue doesn't occur.

Subsequently, non-AP MLD2 2712 may initiate TDLS Discover by generating a subsequent data frame 2752 carrying a TDLS Discovery Request 2754 to STA5 2722 via AP MLD 2702. Since it is aware that STA5 is a non-MLD or legacy STA, STA MAC address of one of its affiliated STAs (STA4-M) is used in TDLS Initiator field 2758.

AP2 2704 of AP MLD 2702, may identify that the subsequent data frame 2752 is directed to STA4 2714 of its associated non-AP MLD2 2712 based on the STA MAC address and forward the data frame 2752' to STA5 2722. The AP MLD 2502 is able to correct the SA field 2755' of the data frame 2752' to STA4's MAC address (STA4-M) before forwarding it to STA5 2722. The data frame 2752 can still be correctly received by STA5 2722.

Further, since the SA field 2755' as well as the TDLS Initiator field 2758' in the Link Identifier element of the TDLS Discovery Request frame 2752' relayed by the AP are both set as STA MAC Addresses, there will be no confusion at the receiving peer STA. This effectively solves the first address mismatch issue raised in the IEEE submission (IEEE 802.11-2/1692r2) when a non-AP MLD initiates TDLS Setup with a legacy STA without the need to change the RA/TA setting rules, or without using the MLD MAC Address in the TDLS Initiator or TDLS Responder fields.

STA5 2722 may, in response, send a TDLS Discovery Response Action frame 2762 on a direct link (Link 2), where the TA field 2765 and the TDLS Responder field 2769 are set to its own STA MAC address. STA5 2722 is able to set the RA field to STA4's L2 MAC address based on the TDLS Initiator field 2758' of the received data frame 2752'.

Subsequently, STA5 and STA4 may perform a TDLS setup (not shown) with TDLS Setup Request/Response frame exchanges in a way similar to that described in FIG. 26. Once TDLS setup has been performed, STA5 2722) STA4 2714 of non-AP MLD2 2712 may transmit/receive respective data frames 2772, 2782 to/from each other on a direct link successfully since the RA field 2773, 2783 of the data frames 2772, 2782 can be set correctly as the STA MAC addresses (STA4-M and STA5-M) accordingly.

According to the present disclosure, when a non-AP MLD resolves the IP address of a legacy STA, even if the address is correctly resolved and even if the non-AP MLD is informed that the target STA is a legacy STA (e.g. due to lack of ML Indication in the ARP Reply), the non-AP MLD cannot know for sure which link the legacy STA operates on. When a non-AP MLD initiates TDLS Discovery with the legacy STA, there are possibilities that it may choose the wrong link and thereby use the wrong STA MAC Address (e.g. STA3-M) in the TDLS Initiator field of the TDLS Discovery frame. Consequently, if the legacy STA uses the TDLS Initiator field to set the RA field of the TDLS Discovery Response frame sent on a direct link, the non-AP MLD2 will fail to receive the frame.

Figure 28:
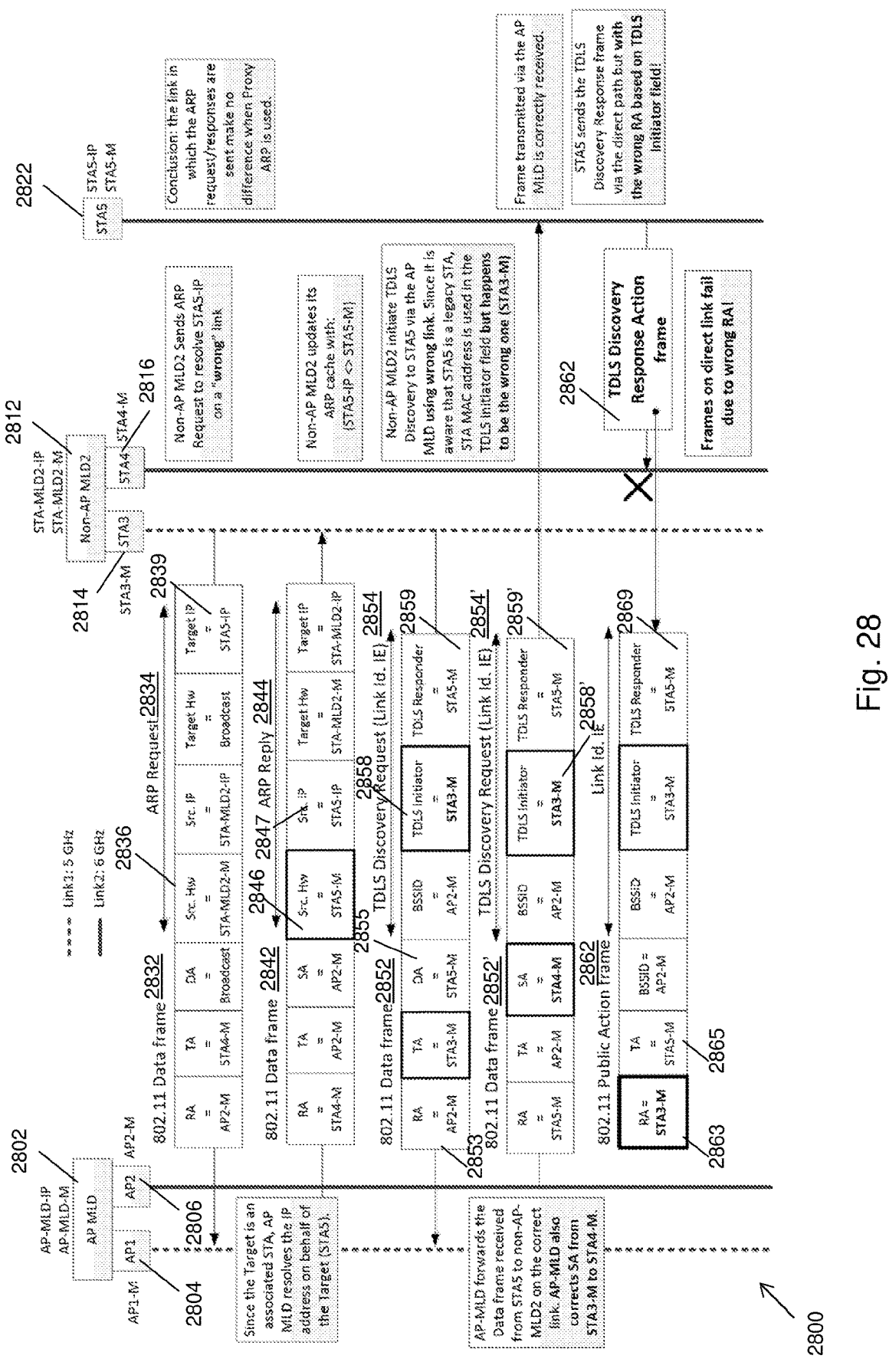

FIG. 28 shows a flow chart 2800 illustrating communications among an AP MLD 2802, a non-AP MLD 2812 and a non-MLD STA 2822 for multi-link resolution according to a fourth example of the fifth embodiment of the present disclosure.

In this fourth example, an AP MLD 2802 resolving an ARP Request from a non-AP MLD (e.g. non-AP MLD2 2812) on behalf of a legacy STA (e.g. STA5 2822) is illustrated.

STA3 2814 of non-AP MLD2 2812 may initiate an ARP query by generating and transmitting a first data frame 2832 carrying an ARP Request 2834 to STA5 2822 via AP MLD 2802 on a link (in this case, Link 1 or 5 GHz frequency band) different from STA5's operating link. The ARP Request 2834 comprises a Source Hardware field 2836 carrying MAC address of non-AP MLD2 (STA-MLD2-M) and a Target IP field 2839 carrying IP address of STA5 (STA5-IP) indicating non-AP MLD2 2812 is trying to resolve the IP address to obtain the corresponding MAC address of STA5 2822.

Next, AP1 2804 of AP MLD 2802, which receives the first data frame 2832 on the 5 GHz link, may identify that the requester (i.e. non-AP MLD2 2812) is a MLD based on the Source Hardware field 2836 of the ARP Request 2834, and the target IP address carried in the Target IP field 2839 of the ARP Request 2834 matches its associated STA5's IP address. Therefore, AP MLD 2802 may generate a second data frame 2842 carrying an ARP Response 2844, and provide the STA5's L2 MAC address (STA5-M) as its hardware address in the Source Hardware field 2846 of the ARP Response 2844 (b0 bit of the MAC address remains 0), and transmit the second data frame 2842 back to non-AP MLD2 2812.

Non-AP MLD2 2812, which receives the second data frame 2842 via STA3 2814 on Link 1, may process the ARP Reply 2844, and become aware that the MAC address carried in the Source Hardware field 2846 is a STA MAC address and not a MLD MAC address due to a lack of ML indication in b0 bit. The non-AP MLD2 2812 may update its ARP cache to map the STA5's IP address (STA5-IP) in the Source IP field 2847 to the STA5's L2 MAC address (STA5-M) in the Source Hardware field 2846. As a result, the ARP query is resolved.

Subsequently, non-AP MLD2 2812 may initiate TDLS Discovery by generating a subsequent data frame 2852 carrying a TDLS Discovery Request 2854 to STA5 2822 via AP MLD 2802 using a wrong link, i.e. a link that STA5 2822 does not operate on. Since it is aware that STA5 is a non-MLD or legacy STA, STA MAC address of STA3 2814 operating on 5 GHz is used in TDLS Initiator field 2858 but the STA MAC address happens to be the wrong one (STA3-M).

AP MLD 2802, may identify that the subsequent data frame 2852 is directed to STA5 2822 based on the STA MAC address, set the SA field 2855' of the data frame 2852' to the TDLS Initiator correct STA MAC address (STA4-M) of STA4 2816 operating on the STA5's operating link and forward the data frame 2852' to STA5 2822 through AP2

2802 on the correct link (6 GHz frequency band). As such, the data frame 2852 is correctly received by STA5 2822.

STA5 2822 may, in response, send a TDLS Discovery Response Action frame 2862 on a direct link (Link 2), where the TA field 2865 and the TDLS Responder field 2869 are set to its own STA MAC address, but the RA field 2863 is set as the MAC address (STA3-M) of a wrong link based on the TDLS Initiator field 2858' of the received data frame 2852'. As such, the data frame 2862 on the direct link between STA5 2822 and STA4 2816 fails due to incorrect RA.

To avoid potential mismatch due to crossover issue, AP MLD can assist non-AP MLDs by ensuring that the ARP Reply sent on behalf of legacy/non-MLD STAs are always sent on the link in which the legacy/non-MLD STA operates, as long as the non-AP MLD also operates on that link. The non-AP MLD is informed that a peer STA is a legacy/non-MLD STA due to the lack of 'ML Indication' in the Data frame carrying the ARP Reply. The non-AP MLD is implicitly informed of the legacy/non-MLD STA's operating link based on the link in which the ARP Reply is received and thereby avoids the crossover issue caused due to the wrong TDLS Initiator address.

Figure 29:
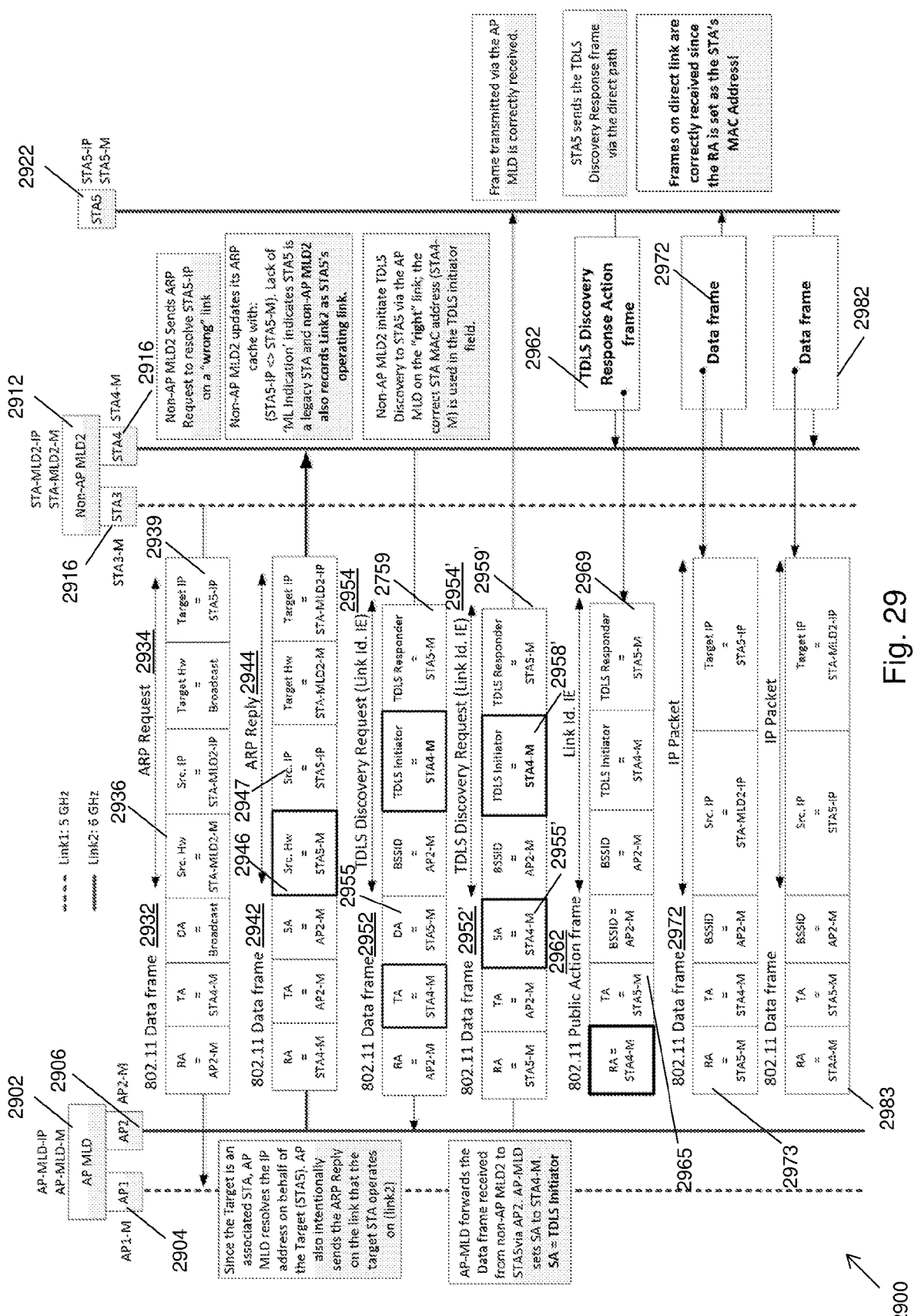

FIG. 29 shows a flow chart 2900 illustrating communications among an AP MLD 2902, a non-AP MLD 2912 and a non-MLD STA 2922 for multi-link resolution according to a fifth example of the fifth embodiment of the present disclosure.

In this fifth example, an AP MLD 2902 resolving an ARP Request from a non-AP MLD (e.g. non-AP MLD2 2912) on behalf of a legacy STA (e.g. STA5 2922) is illustrated.

STA3 2914 of non-AP MLD2 2912 may initiate an ARP query by generating and transmitting a first data frame 2932 carrying an ARP Request 2934 to STA5 2922 via AP MLD 2902 on a link (in this case, Link 1 or 5 GHz frequency band) different from STA5's operating link. The ARP Request 2934 comprises a Source Hardware field 2936 carrying MAC address of non-AP MLD2 (STA-MLD2-M) and a Target IP field 2939 carrying IP address of STA5 (STA5-IP) indicating non-AP MLD2 2912 is trying to resolve the IP address to obtain the corresponding MAC address of STA5 2922.

Even though the ARP Request 2934 is received on a link different from the legacy STA's operating link (Link 2), AP MLD 2902, which receives the first data frame 2932, may identify that the requester (i.e. non-AP MLD2 2912) is a MLD based on the Source Hardware field 2936 of the ARP Request 2934, and the target IP address carried in the Target IP field 2939 of the ARP Request 2934 matches its associated STA5's IP address. Therefore, AP MLD 2902 may generate a second data frame 2942 and intentionally transmits the ARP Response 2944 back to non-AP MLD2 2912 via AP2 2906 on the link that the target STA (STA5 2922) operates on (i.e. Link 2), and provide the STA5's L2 MAC address (STA5-M) as its hardware address in the Source Hardware field 2946 of the ARP Response 2944.

Non-AP MLD2 2912, which receives the second data frame 2942 via STA4 2816 on Link 2, may process the ARP Reply 2944, and become aware that the MAC address carried in the Source Hardware field 2946 is a STA MAC address and not a MLD MAC address due to a lack of ML indication in b0 bit. Non-AP MLD2 2912 may update its ARP cache to map the STA5's IP address (STA5-IP) in the Source IP field 2947 to the STA5's L2 MAC address (STA5-M) in the Source Hardware field 2946. As a result, the ARP query is resolved. Further, non-AP MLD2 2912 also records link 2 as STA5's operating link based on the link in which the ARP Reply 2944 is received.

Subsequently, non-AP MLD2 2912 may initiate TDLS Discovery by generating a subsequent data frame 2952 carrying a TDLS Discovery Request 2954 to STA5 2922 via AP MLD 2902 on the right link (link 2), i.e. STA5's operating link. Since it is aware that STA5 is a non-MLD or legacy STA, the correct STA MAC address (STA4-M) of non-AP MLD 2912 is used as TDLS Initiator field 2958 of the TDLS Discovery Request 2954 of the subsequent data frame 2952.

AP MLD 2902, may identify that the subsequent data frame 2952 is directed to STA5 2922 based on the STA MAC address and forward the data frame 2952 to STA5 2922. AP MLD 2902 will set the SA field 2955' of the data frame 2952' to STA4's MAC address (STA4-M) and forward the data frame 2952 to STA5 2922 on the correct link. As such, the data frame 2952 can still be correctly received by STA5 2922.

STA5 2922 may, in response, send a TDLS Discovery Response Action frame 2962 on a direct link (Link 2), where the TA field 2965 and the TDLS Responder field 2969 are set to its own STA MAC address. STA5 2822 is able to set the RA field 2863 the MAC address (STA4-M) of a correct link based on the TDLS Initiator field 2958' of the received data frame 2952', and the TDLS Discovery Response Action frame 2962 is correctly received by STA4 2916.

As a result, STA5 2922 and STA4 2916 of non-AP MLD2 2912 may transmit/receive respective data frames 2972, 2982 to/from each other on a direct link since the RA field 2973, 2983 of the data frames 2972, 2982 can be set correctly as the STA MAC addresses (STA5-M and STA4-M) accordingly.

Figure 30:
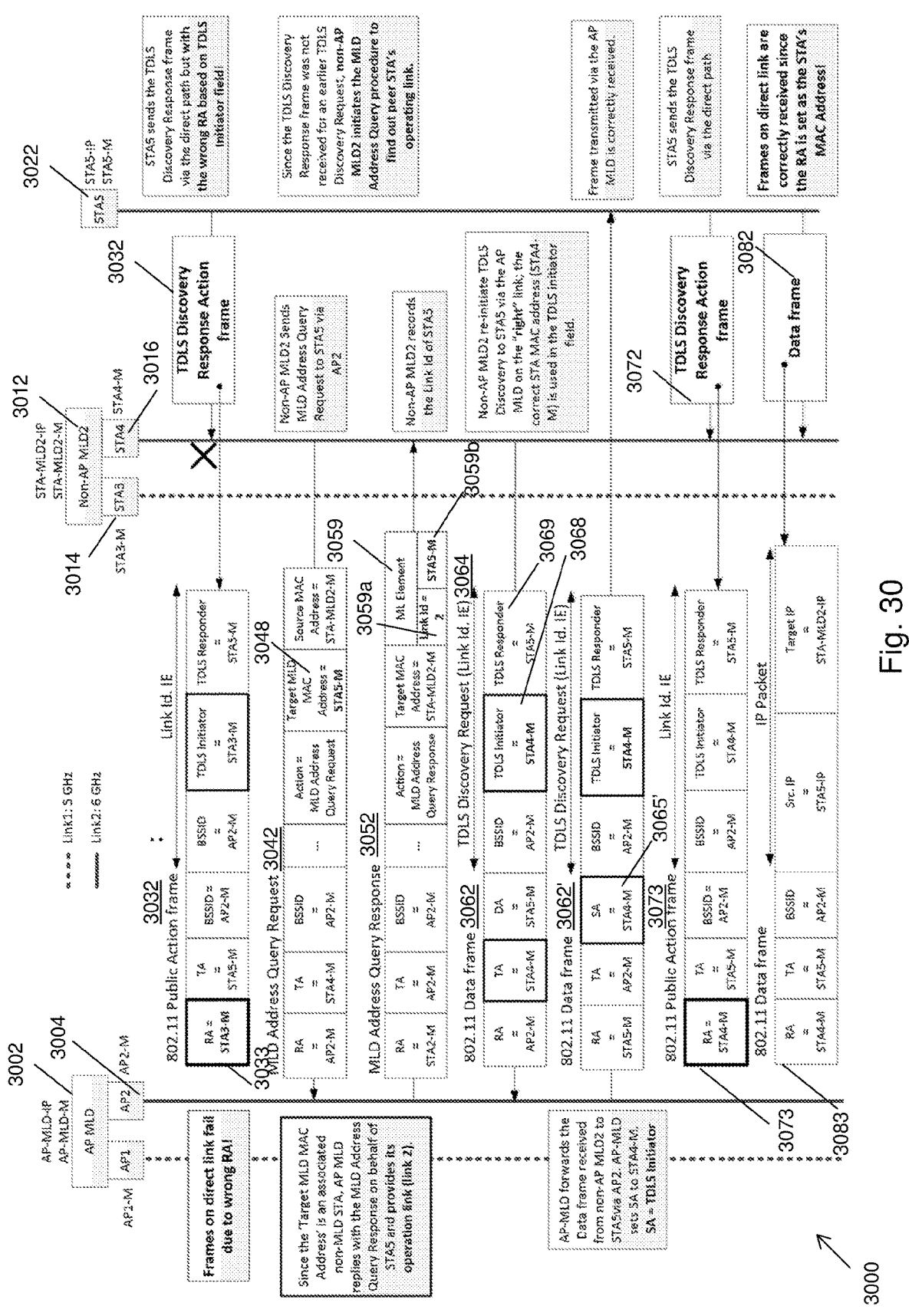

FIG. 30 shows a flow chart 3000 illustrating communications among an AP MLD 3002, a non-AP MLD 3012 and a non-MLD STA 3022 for multi-link resolution according to a sixth example of the fifth embodiment of the present disclosure. The sixth example is a continuation of the fourth example shown in FIG. 28 where the original TDLS Discovery Request frame is sent on the wrong link with the wrong TDLS Initiator address. In this sixth example, an explicit solution to the Crossover issued in the fifth example of the fifth embodiment of the present disclosure is illustrated through the use of MLD Address Query mechanism to discover a non-MLD STA's operating link in reference to an AP MLD 3002, a non-AP MLD (e.g. non-AP MLD2 3012) and a legacy STA (e.g. STA5 3022). In this sixth example, MLD Address Query mechanism is not used to resolve the STA MAC Addresses of an MLD, but rather to discover the operating link of a non-MLD STA. Alternatively, the non-AP MLD, upon failing to receive the TDLS Discovery Response frame, could also reattempt the TDLS Discovery Requests on the other links blindly.

Following the APR query and transmission of a subsequent data frame carrying a TDLS Discovery Request, STA5 3022 may send a TDLS Discovery Response Action frame on a direct link to STA4 3016 carrying a wrong RA field 3033 (e.g. set to STA MAC address (STA3-M) of STA3 3014) based on a TDLS Initiator field in the TDLS Discovery Request (not shown in FIG. 30). As a result, all frames on the direct link will fail due to the wrong RA.

Due to the failure to receive the TDLS Discovery Response frame 3032 from STA5 3022 on the direct link, non-AP MLD2 3012 can guess that the TDLS Discovery Request frame may have been sent on a wrong link. Non-AP MLD2 3012 may the send a MLD Address Query Request frame 3042 to STA5 3022 via AP2 3004 of non-AP MLD 3002. AP MLD 2902, which receives the MLD Address Query Request frame 3042, may identify that the MAC address carried in the Target MLD MAC Address field 3048 of the MLD Address Query Request 3042 matches its associated STA5's MAC address indicating that the non-AP MLD2 is trying to resolve the IP address to obtain the corresponding MAC address and the operating link of STA5 3022. Therefore, AP MLD 3002 may generate a MLD Address Query Response frame 3052 to provide such information to non-AP MLD2 3012 on behalf of STA5 3022. In particular, the MLD Address Query Response frame 3052 comprises a ML Element carrying a single Link Info field with a Link ID subfield 3059a with a value of 2 indicating the target STA's operating link is Link 2 and an address field 3059b indicating the MAC address of the target STA, i.e. STA5 3022.

Subsequent to receiving the information regarding the correct link to transmit a data frame, non-AP MLD2 may re-initiate a TDLS Discovery by transmitting a data frame 3062 carrying a TDLS Discovery Request 3064 to STA5 3022 via AP MLD 3002 on the right (given) link received in the MLD Address Query Response frame 3052. The correct link (STA MAC address), i.e. STA4-M, is used in TDLS Initiator field 3068 of the TDLS Discovery Request 3064.

AP MLD 3002, may identify that the data frame 3062 is directed to STA5 3022 based on the STA MAC address in the TDLS Responder field 3069 and forward it to STA5 3022. AP MLD 2902 will set the SA field 3065' of the data frame 3062' to STA4's MAC address (STA4-M) to indicate the source of the data frame 3062'. As such, the data frame 2952 is correctly received by STA5 2922 via AP MLD 3002.

Next, STA5 3022 may, in response, send a TDLS Discovery Response action frame 3072 via a direct link (Link 2) to STA4 3016 of non-AP MLD 3012. STA5 3022 is able to correctly set the STA4's MAC address in the RA field 3073. As such, the TDLS Discovery Response Action frame 3072 and any subsequent data frame 3072 from STA5 3022 to STA4 3016 on the direct link are correctly received by STA4 since the RA fields 3073, 3083 are set correctly as the STA's MAC address.

The present disclosure illustrates: (i) an MLD's IP address is dynamically mapped to either the MLD MAC Address or one of the L2 MAC Address of the MLD. If the requesting station is an MLD, the MLD MAC Address is returned as the MLD's hardware MAC Address, else if the requesting station is a non-MLD (either EHT or legacy STA), the MAC Address of the affiliated AP/STA operating on the link in which the ARP Request or the Neighbor Solicitation is received, is returned as the MLD's hardware MAC Address; (ii) Frames transmitted by MLDs carry an "ML indication" to indicate that it is transmitted by (or originates from) an MLD; (iii) An MLD Address Query mechanism is proposed to perform MLD MAC Address to L2 MAC Address resolution; (iv) Proxy ARP dynamically maps the IP address of an associated station's MAC Address to either the MLD MAC Address or one of the L2 MAC Address of the MLD depending on whether the requesting station is an MLD or a non-MLD where Proxy ARP also responds to the MLD Address Query requests on behalf of associated non-AP MLD and also sets the "ML indication" in the ARP/ND Responses; and (v) AP MLD only forwarding ARP/ND Responses received from associated MLDs in the same BSS in which the non-MLD STA addressed in the DA is operating.

Figure 31:
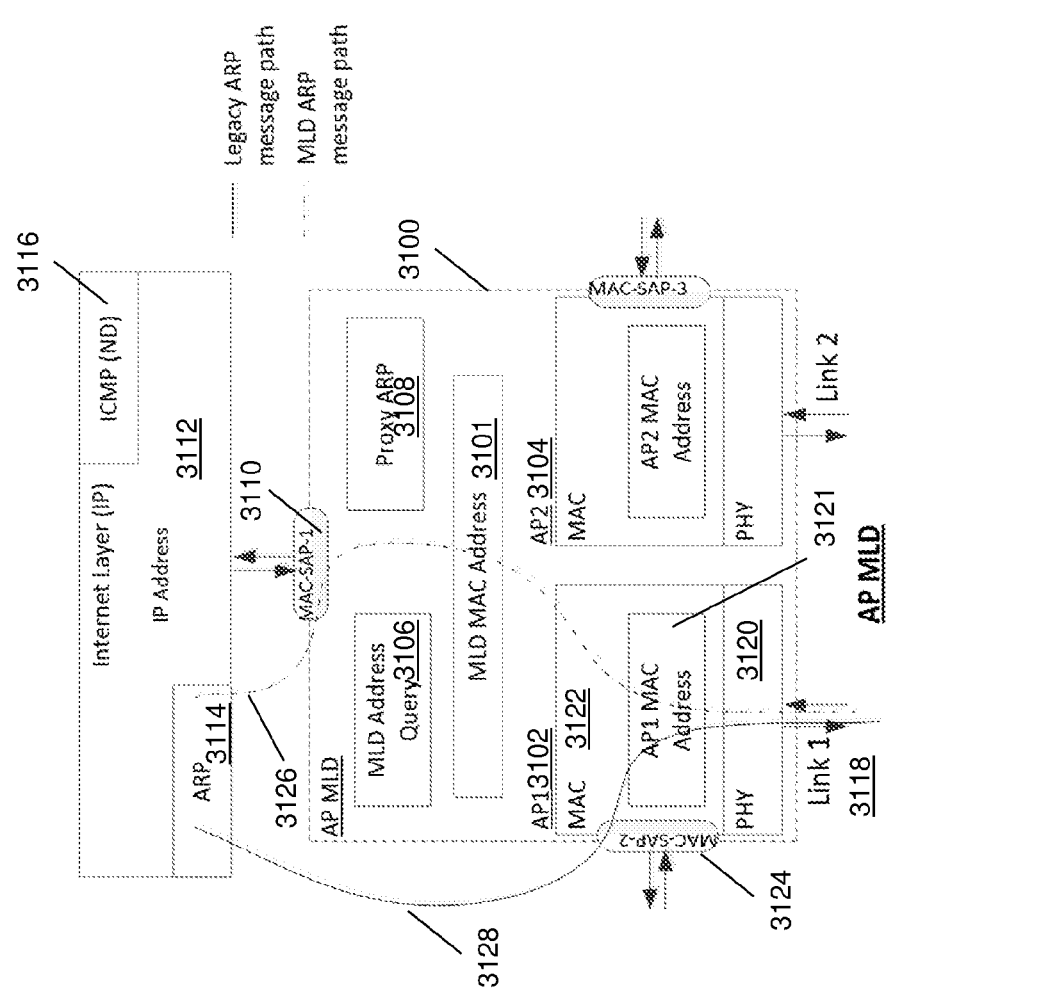
FIG. 31 shows an example configuration of a communication device and two communication apparatuses affiliated with the communication device. The communication device is implemented as an AP MLD and each of the affiliated communication apparatuses may be implemented as an AP configured for multi-link address resolution in accordance with the present disclosure.

FIG. 31 shows an example configuration of a communication device 3100 and two communication apparatuses 3102, 3104 affiliated with the communication device 3100. The communication device 3100 is implemented as an AP MLD and each of the affiliated communication apparatuses 3102, 3104 may be implemented as an AP configured for multi-link address resolution in accordance with the present disclosure. The communication device 3100 further comprises a storage module 3101 storing its MLD MAC Address, a first functional module 3106 for generating and processing MLD Address Query related services and a second function module 3108 for generating and processing frames for Proxy ARP related services. The communication device 3100 further comprises a MLD MAC SAP 3110 used for communicating with an Internet layer comprising an ARP module 3114 and ICMP module 3116 for generating and processing frames for ARP and ND queries, respectively. Each of the communication apparatuses 3102, 3104 affiliated with the communication device offering a link to associated with and capable of transmitting/receiving signals to/from other external communication apparatuses/devices and/or a distribution system (DS). Each affiliated communication apparatus 3102, 3104 comprises a MAC layer 3120 and a PHY (physical) layer 3122, the MAC layer comprising a storage module 3121 storing its AP MAC address and an optional AP MAC SAP 3124 for direct communication with the Internet layer for traffic to/from legacy STAs, the PHY layer connecting with a radio transmitter, a radio receiver and an antenna used for transmitting/receiving signal to/from other communication apparatuses/devices through a corresponding link 3118.

According to the present disclosure, Traffic to/from DS (including ARP and ND messages) from/to MLDs are routed through the MLD MAC SAP 3110 as indicated by line 3126, and while traffic to/from DS (including ARP and ND messages) from/to non-MLDs are routed through the AP MAC SAP 3124, as indicated by line 3128. ARP/ND returns the MAC address of the corresponding MAC SAP through which the ARP/ND request was received.

Figure 32:
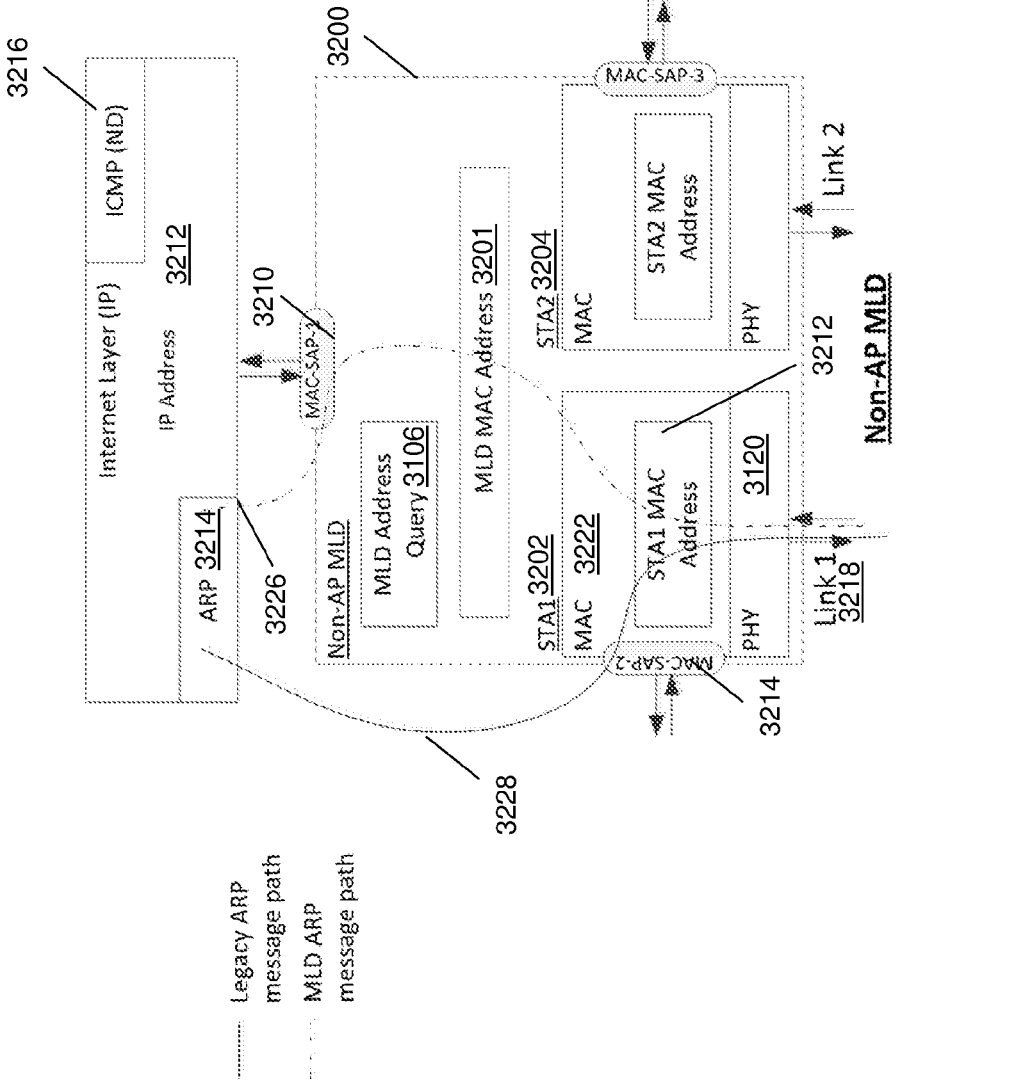
FIG. 32 shows an example configuration of a communication device and two communication apparatuses affiliated with the communication device. The communication device is implemented as a non-AP MLD and each of the affiliated communication apparatuses may be implemented as a STA configured for multi-link address resolution in according with the present disclosure.

FIG. 32 shows an example configuration of a communication device 3200 and two communication apparatuses 3202, 3204 affiliated with the communication device 3200. The communication device 3200 is implemented as a non-AP MLD and each of the affiliated communication apparatuses 3202, 3204 may be implemented as a STA configured for multi-link address resolution in according with the present disclosure. The communication device 3200 further comprises a storage module 3201 storing its MLD MAC Address, a functional module 3206 for generating and processing MLD Address Query related services. The communication device 3100 further comprises a MLD MAC SAP 3210 used for communicating with an Internet layer comprising an ARP module 3214 and ICMP module 3216 for generating and processing frames for ARP and ND queries, respectively. Each of the communication apparatuses 3202, 3204 affiliated with the communication device offering a link to associated with and capable of transmitting/receiving signals to/from other external communication apparatuses/devices. Each affiliated communication apparatus 3202, 3204 comprises a MAC layer 3220 and a PHY (physical) layer 3222, the MAC layer comprising a storage module 3221 storing its STA MAC address and an optional STA MAC SAP 3224 for direct communication with the Internet layer for traffic to/from legacy STAs, the PHY layer connecting with a radio transmitter, a radio receiver and an antenna used for transmitting/receiving signal to/from other communication apparatuses/devices through a corresponding link 3218.

According to the present disclosure, Traffic to/from DS (including ARP and ND messages) from/to MLDs are routed through the MLD MAC SAP 3210 as indicated by line 3226, and while traffic to/from DS (including ARP and ND messages) from/to non-MLDs are routed through the STA MAC SAP 3224, as indicated by line 3228. ARP/ND returns the MAC address of the corresponding MAC SAP through which the ARP/ND request was received.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication device.

Some non-limiting examples of such communication device include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication device is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication device may comprise an apparatus such as a controller or a sensor which is coupled to a communication apparatus performing a function of communication described in the present disclosure. For example, the communication device may comprise a controller or a sensor that generates control signals or data signals which are used by a communication apparatus performing a communication function of the communication device.

The communication device also may include an infrastructure facility, such as a base station, an access point, and any other apparatus, device or system that communicates with or controls apparatuses such as those in the above non-limiting examples.

A non-limiting example of a station may be one included in a first plurality of stations affiliated with a multi-link station logical entity (i.e. such as an MLD), wherein as a part of the first plurality of stations affiliated with the multi-link station logical entity, stations of the first plurality of stations share a common medium access control (MAC) data service interface to an upper layer, wherein the common MAC data service interface is associated with a common MAC address or a Traffic Identifier (TID). Thus, it can be seen that the present embodiments provide communication devices and methods for operation over multiple links in order to fully realize the throughput gains of multi-link communication, in particular for multi-link secured retransmissions.

While exemplary embodiments have been presented in the foregoing detailed description of the present embodiments, it should be appreciated that a vast number of variations exist. It should further be appreciated that the exemplary embodiments are examples, and are not intended to limit the scope, applicability, operation, or configuration of this disclosure in any way. Rather, the foregoing detailed description will provide those skilled in the art with a convenient road map for implementing exemplary embodiments, it being understood that various changes may be made in the function and arrangement of steps and method of operation described in the exemplary embodiments and modules and structures of devices described in the exemplary embodiments without departing from the scope of the subject matter as set forth in the appended claims.

According to the present disclosure, the following examples have been illustrated:

1. A communication apparatus of a plurality of communication apparatuses affiliated with a first multi-link device (MLD), the communication apparatus comprising:
a receiver, which in operation, receives, from a requesting communication apparatus, a first data frame carrying an address resolution request, the address resolution request carrying an internet protocol (IP) address of the first MLD;
circuitry, which in operation, determines whether or not the requesting communication apparatus is affiliated with a second MLD; and generates a second data frame carrying an address resolution response, the address resolution response carrying a media access control (MAC) address of the communication apparatus in response to determining that the requesting communication apparatus is not affiliated with the second MLD, or a MLD MAC address of the first MLD in response to determining that the requesting communication apparatus is affiliated with the second MLD.

2. The communication apparatus according to example 1, wherein the address resolution request is one of an Address Resolution Protocol (ARP) Request packet and a Neighbor Solicitation Message; and the address resolution response is one of an ARP Response packet and a Neighbor Advertisement Message.

3. The communication apparatus according example 1, wherein the first data frame carries an indication that indicates whether or not the requesting communication apparatus is affiliated with the second MLD and the determination is based on the indication; and, in response to the determination, the second data frame carries the indication that indicates whether or not the communication apparatus is affiliated with the first MLD.

4. The communication apparatus according to example 3, wherein the indication is carried in a Protocol Version subfield of a Frame Control field of the first data frame and the second data frame respectively.

5. The communication apparatus according to example 3, wherein the indication is carried in a least significant bit of a MAC address relating to the requesting communication apparatus carried in the first data frame and the second data frame.

6. The communication apparatus according to example 1, wherein the receiver further receives an MLD address query request frame carrying the MLD MAC address of the first MLD; and the circuitry is further configured to:
generate an MLD address query response frame carrying a MAC address and an identifier of an operating link of each of the plurality of communication apparatuses.

7. The communication apparatus according to example 6, wherein the MLD address query request frame and the MLD address query response frame are pre-configured action frames or being encapsulated in pre-configured data frames.

8. The communication apparatus according to example 7, wherein the MLD address query request frame is received from another communication apparatus that either is or is not affiliated with an MLD.

9. The communication apparatus according to example 3, wherein, the circuitry is further configured to:
set a least significant bit of at least one of: (i) a sender address field in the address resolution request comprising a MAC address relating to the requesting communication apparatus to carry the indication, and (ii) a sender address field in the address resolution response comprising the MLD MAC address of the first MLD to carry the indication.

10. The communication apparatus according to example 1, wherein, in response to determining the requesting communication apparatus is affiliated with the second MLD, the circuitry is further configured to:
set a least significant bit of a MAC address of a tunneled direct link setup (TDLS) initiator communication apparatus in a TDLS request frame transmitted to a TDLS responder communication apparatus, the TDLS initiator communication apparatus being one of the communication apparatus and the requesting communication apparatus, the TDLS responder communication apparatus being the remaining one of the communication apparatus and the requesting communication apparatus, the least significant bit indicating an association of the TDLS initiator communication with a MLD.

11. The communication apparatus of example 1, wherein the communication apparatus is an access point (AP) and the first MLD is an AP MLD.

12. The communication apparatus of example 11, wherein, in response to determining the requesting communication apparatus is not affiliated with the second MLD and a destination address field of the first data frame carries one of a broadcast address or a MLD MAC address of a MLD associated with the AP MLD, the circuitry is further configured to:
forward the first data frame only to one or more communication apparatuses of a basic service set in which the requesting communication apparatus is associated with.

13. The communication apparatus of example 11, wherein, in response to determining the requesting communication apparatus is associated with the second MLD and a destination field of the first data frame carries a MAC address of another communication apparatus that is not affiliated with an MLD but is associated with one of the plurality of communication apparatus affiliated with the AP MLD, the circuitry is further configured to:

forward the first data frame only to one or more communication apparatuses of a basic service set in which the requesting communication apparatus is associated with.

14. The communication apparatus of example 1, wherein the communication apparatus is a station and the first MLD is a non-AP MLD.

15. An Access Point (AP) of a plurality of APs affiliated with an AP MLD, the AP comprising:

a receiver, which in operation, receives, from a requesting communication apparatus, a first data frame carrying an address resolution request, the address resolution request carrying an IP address of a first MLD associated with the AP MLD, the first MLD comprising a plurality of communication apparatuses;

circuitry, which in operation, determines whether or not the requesting communication apparatus is affiliated with a second MLD associated with the AP MLD; and generates a second data frame carrying an address resolution response, the address resolution response carrying a MAC address of a communication apparatus of the plurality of communication apparatuses affiliated with the first MLD in response to determining that the requesting communication apparatus is not affiliated with the second MLD, or a MLD MAC address of the first MLD in response to determining that the requesting communication apparatus is affiliated with the second MLD.

16. The AP according to example 15, wherein the address resolution request is one of an ARP Request packet and a Neighbor Solicitation Message; and the address resolution response is one of an ARP Response packet and a Neighbor Advertisement Message.

17. The AP according to example 15, wherein the receiver further receives an MLD address query request frame carrying the MLD MAC address of the first MLD; and the circuitry is further configured to:

generate an MLD address query response frame carrying a MAC address and an identifier of an operating link of each of the plurality of communication apparatuses affiliated with the first MLD.

18. The AP according to example 15, wherein the receiver further receives an MLD address query request frame carrying a MAC Address of an associated communication apparatus; and the circuitry is further configured to:

generate an MLD address query response frame carrying the MAC address and an identifier of an operating link of the associated communication apparatus.

19. The AP according to example 15, wherein, in response to determining the requesting communication apparatus is not affiliated with the second MLD and a destination address field of the first data frame carries one of a broadcast address or a MLD MAC address of a MLD associated with the AP MLD including the first MLD, the circuitry is further configured to:

forward the first data frame only to one or more communication apparatuses of a basic service set in which the requesting communication apparatus is associated with.

20. The AP according to example 15, wherein, in response to determining the requesting communication apparatus is associated with the second MLD and a destination field of the first data frame carries a MAC address of another communication apparatus that is not affiliated with an MLD but is associated with one of the APs affiliated with the AP MLD, the circuitry is further configured to:

forward the first data frame only to one or more communication apparatuses of a basic service set in which the requesting communication apparatus is associated with.

21. The AP according to example 15, wherein the circuitry is further configured to: set a least significant bit of a sender address field in the address resolution response comprising the MLD MAC address of the first MLD to indicate the communication apparatus is associated with the first MLD.

22. The AP according to example 19 or 30, wherein prior to forward the first data frame, the circuitry is further configured to:

set a least significant bit of a sender address field comprising a MAC address relating to the requesting communication apparatus carried in the address resolution request carried in the first data frame, the least significant bit indicating whether or not the requesting communication apparatus is associated with the second MLD.

23. A communication method comprising:

receiving, from a requesting communication apparatus, a first data frame carrying an address resolution request, the address resolution request carrying an IP address of a first MLD;

determining whether or not the requesting communication apparatus is affiliated with a second MLD; and generating a second data frame carrying an address resolution response, the address resolution response carrying a MAC address of a communication apparatus of a plurality of communication apparatuses affiliated with the first MLD in response to determining that the requesting communication apparatus is not affiliated with the second MLD, or a MLD MAC address of the first MLD in response to determining that the requesting communication apparatus is affiliated with the second MLD.

The invention claimed is:

1. An Access Point multi-link device (AP MLD) including a plurality of affiliated APs, the AP MLD comprising:

a receiver, which, in operation, receives, from a requesting communication apparatus, an Address Resolution Protocol (ARP) request with a target internet protocol (IP) address to be resolved, wherein the ARP request includes an MLD indication that is carried in a least significant bit (LSB) of a MAC address of the requesting communication apparatus, the MLD indication indicating whether the MAC address of the requesting communication apparatus is an MLD MAC address; and circuitry, which, in operation, if the target IP address corresponds to a non-AP MLD, determines to generate an ARP response and inserts an MLD media access control (MAC) address of the non-AP MLD as a Sender's MAC address in the ARP response.

2. The AP MLD according to claim 1, wherein if the target IP address corresponds to a station (STA), the circuitry inserts a MAC address of the STA as the Sender's MAC address in the ARP response.

3. The AP MLD according claim 1, wherein the requesting communication apparatus is a STA associated with one of the plurality of affiliated APs, another non-AP MLD that is different from the non-AP MLD corresponding to the target IP address, or a Distribution System (DS).

4. The AP MLD according to claim 1, wherein the circuitry, in operation, maintains an MLD MAC address to IP address mapping for each associated non-AP MLD and for each IP address of the non-AP MLD, and updates the MLD MAC address to IP address mapping when one of the IP addresses of the non-AP MLD changes.

5. The AP MLD according to claim 1, wherein the circuitry, in operation, responds to the ARP request on behalf of the non-AP MLD.

6. The AP MLD according to claim 1, comprising a transmitter, which, in operation, transmits the generated ARP response to the requesting communication apparatus.

7. The AP MLD according to claim 1, wherein the MAC address of the requesting communication apparatus is included in the ARP request frame as a Sender's address, and the MAC address of the requesting communication apparatus in the ARP request frame comprises six octets, and a LSB of a first octet of the six octets carries the MLD indication.

8. The AP MLD according to claim 7, wherein the ARP request is for finding a MAC address of a device having the target IP address.

9. A communication method for an Access Point multi-link device (AP MLD), the communication method comprising:

receiving, from a requesting communication apparatus, an Address Resolution Protocol (ARP) request with a target internet protocol (IP) address to be resolved, wherein the ARP request includes an MLD indication that is carried in a least significant bit (LSB) of a MAC address of the requesting communication apparatus, the MLD indication indicating whether the MAC address of the requesting communication apparatus is an MLD MAC address; and if the target IP address corresponds to a non-AP MLD, determining to generate an ARP response and inserting an MLD media access control (MAC) address of the non-AP MLD as a Sender's MAC address in the ARP response.

10. The communication method according to claim 9, wherein if the target IP address corresponds to a station (STA), the communication method comprises:

inserting a MAC address of the STA as the Sender's MAC address in the ARP response.

11. The communication method according claim 9, wherein the requesting communication apparatus is a STA associated with one of the plurality of affiliated APs, another non-AP MLD that is different from the non-AP MLD corresponding to the target IP address, or a Distribution System (DS).

12. The communication method according to claim 9, wherein the communication method comprises:

maintaining an MLD MAC address to IP address mapping for each associated non-AP MLD and for each IP address of the non-AP MLD; and updating the MLD MAC address to IP address mapping when one of the IP addresses of the non-AP MLD changes.

13. The communication method according to claim 9, wherein the communication method comprises responding to the ARP request on behalf of the non-AP MLD.

14. The communication method according to claim 9, wherein the communication method comprising transmitting the generated ARP response to the requesting communication apparatus.

15. The communication method according to claim 9, wherein the MAC address of the requesting communication apparatus is included in the ARP request frame as a Sender's address, and the MAC address of the requesting communication apparatus in the ARP request frame comprises six octets, and a LSB of a first octet of the six octets carries the MLD indication.

16. The communication method according to claim 15, wherein the ARP request is for finding a MAC address of a device having the target IP address.

* * * * *